United States Patent [19]
Garlock et al.

[11] Patent Number: 5,999,744
[45] Date of Patent: Dec. 7, 1999

[54] ROTATING HOOK FILM LOADER AND METHOD

[75] Inventors: Mark D. Garlock; Joseph A. Watkins, both of Rochester, N.Y.

[73] Assignee: Eastman Kodak Company, Rochester, N.Y.

[21] Appl. No.: 09/094,965

[22] Filed: Jun. 12, 1998

[51] Int. Cl.$^6$ .............................. G03B 17/02; G03B 1/00
[52] U.S. Cl. .............................. 396/6; 396/388; 396/411; 396/429; 396/440
[58] Field of Search ................................. 396/6, 388, 429, 396/440, 514, 411, 413, 415; 242/348, 348.4, 548, 595, 615

[56] References Cited

U.S. PATENT DOCUMENTS

| | | |
|---|---|---|
| 651,118 | 6/1900 | Pascal et al. . |
| 1,921,559 | 8/1933 | Case . |
| 1,921,560 | 8/1933 | Case . |
| 2,484,248 | 10/1949 | Roehrl . |
| 3,057,573 | 10/1962 | Kindig et al. . |
| 3,288,389 | 11/1966 | Gersch et al. . |
| 3,383,064 | 5/1968 | Daly et al. . |
| 3,567,147 | 3/1971 | Eagelsmann et al. . |
| 3,643,889 | 2/1972 | Krause . |
| 3,748,715 | 7/1973 | Hoover et al. . |
| 3,850,381 | 11/1974 | Moore . |
| 3,925,798 | 12/1975 | Sanada et al. . |
| 3,930,296 | 1/1976 | Hoover . |
| 3,999,197 | 12/1976 | Iwashita et al. . |
| 4,102,512 | 7/1978 | Lewallyn . |
| 4,171,892 | 10/1979 | Kozuki et al. . |
| 4,205,436 | 6/1980 | Klotz et al. . |
| 4,228,579 | 10/1980 | Dunkel et al. . |
| 4,251,148 | 2/1981 | Stemme et al. . |
| 4,256,269 | 3/1981 | Feighery et al. . |
| 4,274,726 | 6/1981 | Yoneyama et al. . |
| 4,303,325 | 12/1981 | Seely . |
| 4,342,509 | 8/1982 | Wakabayashi et al. . |
| 4,451,011 | 5/1984 | Engelsmann et al. . |
| 4,455,074 | 6/1984 | Wong et al. . |

(List continued on next page.)

FOREIGN PATENT DOCUMENTS

| | | |
|---|---|---|
| 0743546A1 | 11/1996 | European Pat. Off. . |
| 0750216A1 | 12/1996 | European Pat. Off. . |
| 38-20424 | 10/1963 | Japan . |
| 48-59832 | 8/1973 | Japan . |
| 63-271325 | 11/1988 | Japan . |
| 64-544 | 1/1989 | Japan . |
| 2-52340 | 2/1990 | Japan . |
| 2-52341 | 2/1990 | Japan . |
| 3-2741 | 1/1991 | Japan . |
| 3-2751 | 1/1991 | Japan . |
| 3-2752 | 1/1991 | Japan . |
| 4-251250 | 9/1992 | Japan . |
| 5-134361 | 5/1993 | Japan . |
| 5-32317 | 12/1993 | Japan . |
| 6-130568A | 5/1994 | Japan . |
| 6-289541 | 10/1994 | Japan . |
| 6-295020 | 10/1994 | Japan . |
| 6-295022 | 10/1994 | Japan . |
| 6-332118 | 12/1994 | Japan . |
| 7-13279 | 1/1995 | Japan . |
| 7-5526 | 1/1995 | Japan . |
| 7-209721 | 8/1995 | Japan . |
| 7-219156 | 8/1995 | Japan . |
| 7-219157 | 8/1995 | Japan . |

(List continued on next page.)

*Primary Examiner*—Eddie C. Lee
*Attorney, Agent, or Firm*—Robert Luke Walker

[57] ABSTRACT

Method and apparatus for loading a filmstrip. The method includes the steps of: propelling the filmstrip into a cylindrical film space; curling the filmstrip into a film roll within the film space; during the curling, constraining the roll between a pair of opposed contact surfaces; and during the constraining, rotating the contact surfaces about a pivot axis transverse to a film roll axis.

40 Claims, 63 Drawing Sheets

U.S. PATENT DOCUMENTS

| | | |
|---|---|---|
| 4,687,311 | 8/1987 | Desormeaux . |
| 4,699,489 | 10/1987 | Nii . |
| 4,833,495 | 5/1989 | Ohmura et al. . |
| 4,838,497 | 6/1989 | Kramer et al. . |
| 4,884,087 | 11/1989 | Mochida et al. . |
| 4,890,130 | 12/1989 | Takei et al. . |
| 4,954,857 | 9/1990 | Mochida et al. . |
| 4,965,616 | 10/1990 | Horiuchi . |
| 4,972,649 | 11/1990 | Mochida et al. . |
| 5,016,833 | 5/1991 | Hamlin . |
| 5,049,908 | 9/1991 | Murakami . |
| 5,063,400 | 11/1991 | Takei et al. . |
| 5,125,630 | 6/1992 | Hoyt et al. . |
| 5,131,592 | 7/1992 | Shibata et al. . |
| 5,257,748 | 11/1993 | Morizzo . |
| 5,301,892 | 4/1994 | Merz et al. . |
| 5,311,231 | 5/1994 | Suzuki et al. . |
| 5,385,317 | 1/1995 | Yamamoto et al. ............... 242/595 |
| 5,544,833 | 8/1996 | Zander . |
| 5,608,482 | 3/1997 | Watkins et al. . |
| 5,659,802 | 8/1997 | Watkins et al. . |
| 5,689,733 | 11/1997 | Zawodny et al. . |
| 5,745,797 | 4/1998 | Watkins et al. . |
| 5,746,388 | 5/1998 | Raimondi, Jr. ..................... 242/595 |

FOREIGN PATENT DOCUMENTS

| | | |
|---|---|---|
| 8-171180 | 7/1996 | Japan . |
| 8-171181 | 7/1996 | Japan . |
| 9-211796 | 8/1996 | Japan . |
| 8-262633 | 10/1996 | Japan . |
| 8-262636 | 10/1996 | Japan . |
| 8-262647 | 10/1996 | Japan . |
| 8-286324 | 11/1996 | Japan . |
| 8-314071 | 11/1996 | Japan . |
| 9-43777 | 2/1997 | Japan . |
| 9-43778 | 2/1997 | Japan . |
| 9-43779 | 2/1997 | Japan . |
| 558515 | 1/1944 | United Kingdom . |
| 1060937 | 3/1967 | United Kingdom . |

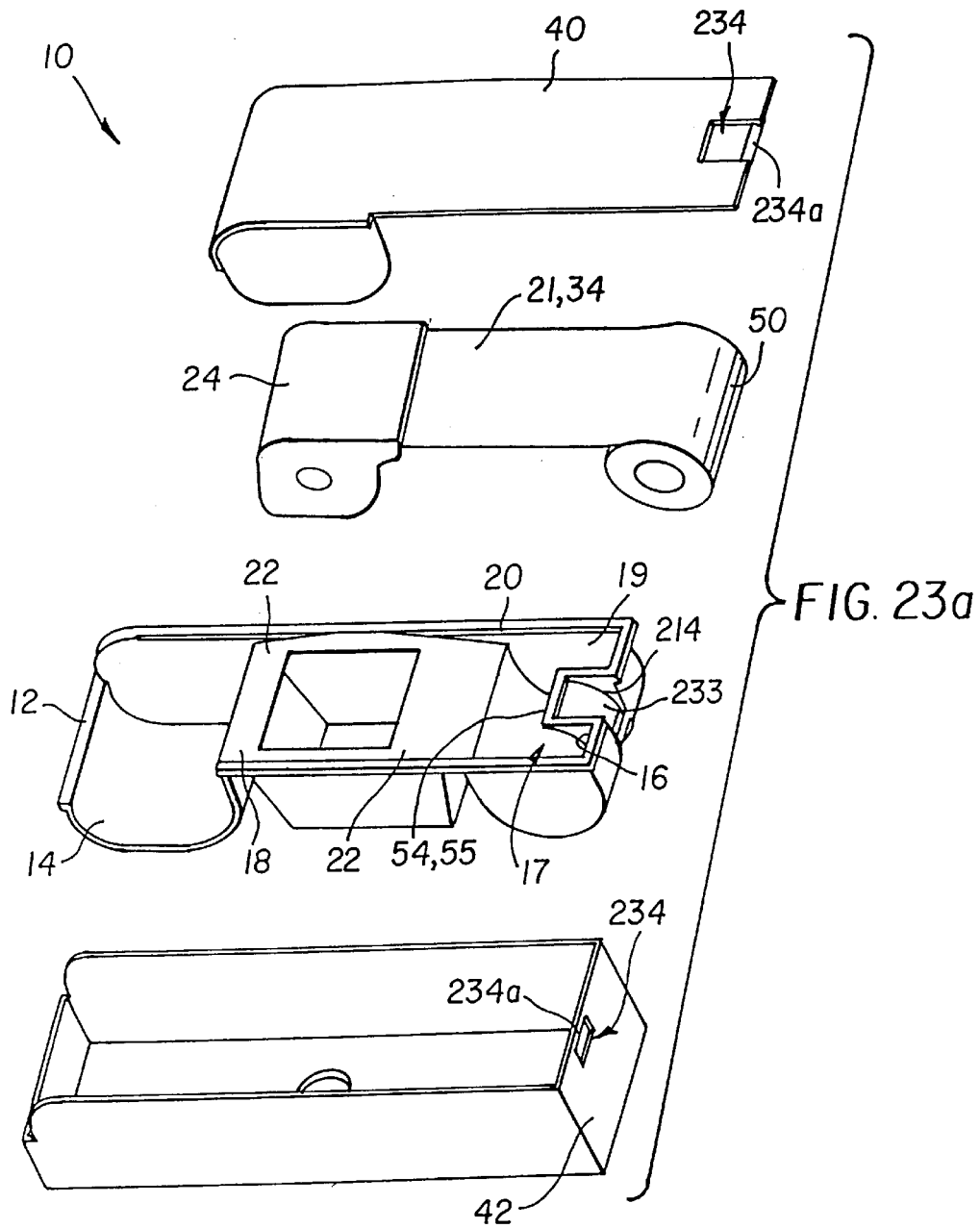
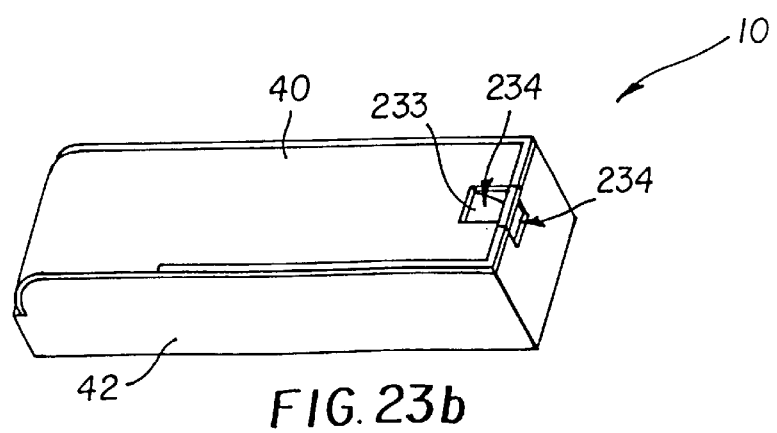

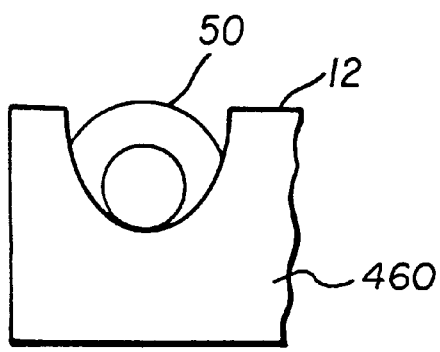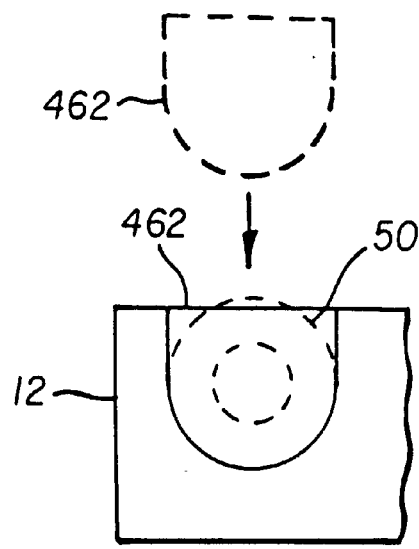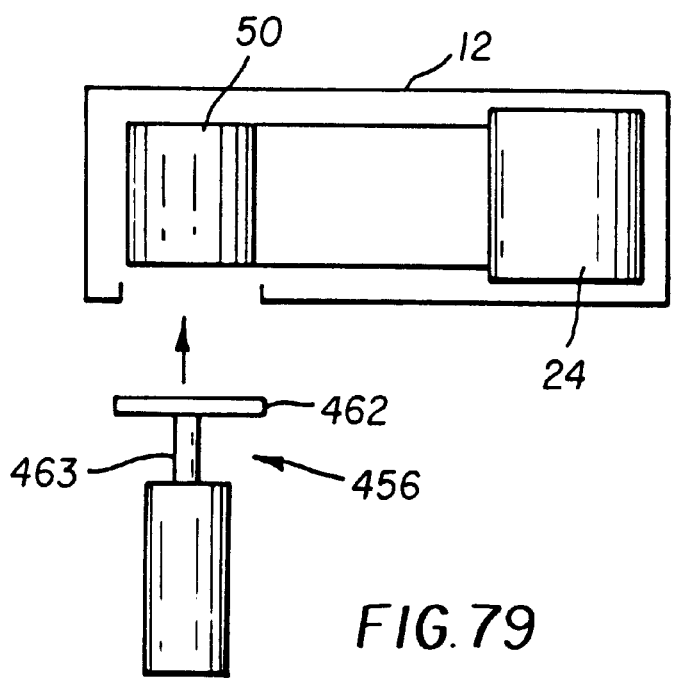
FIG. 77
FIG. 78
FIG. 79

ROTATING HOOK FILM LOADER AND METHOD

CROSS REFERENCE TO RELATED APPLICATIONS

Reference is made to commonly assigned, co-pending U.S. patent application Ser. No. 08/837632, now U.S. Pat. No. 5,815,739, entitled CAMERA ASSEMBLY WITH QUILL DRIVEKEY FOR ENGAGING FILM CARTRIDGE, filed Apr. 21, 1997, in the names of Marra et al.

Reference is made to commonly assigned, co-pending U.S. patent application Ser. No. 08/997,567 entitled SPOOL REPOSITIONING APPARATUS FOR CAMERA ASSEMBLING AND METHODS, filed Dec. 23, 1997, in the names of Joseph A. Watkins et al.

Reference is made to commonly assigned, co-pending U.S. patent application Ser. No. 08/997,014, now U.S. Pat. No. 5,873,002 entitled CARTRIDGE LOADING APPARATUS AND METHODS, filed Dec. 23, 1997, in the names of Thomas W. Glanville, et al.

Reference is made to commonly assigned, co-pending U.S. patent application Ser. No. 08/997,566, now U.S. Pat. No. 5,895,126 entitled APPARATUS AND METHODS OF CAMERA ASSEMBLY, filed Dec. 23, 1997, in the names of Joseph A. Watkins et al.

Reference is made to commonly assigned, co-pending U.S. patent application Ser. No. 09/097,135, entitled FILM EDGE DRIVING FILM LOADER, FILM LOADING METHOD AND CAMERA FRAME ASSEMBLY, and filed in the names of Michael R. Allen, et al.

Reference is made to commonly assigned, co-pending U.S. patent application Ser. No. 09/096,831, entitled CAMERA FRAME ASSEMBLY HAVING MONOLITHIC SUBENCLOSURES, and filed in the names of Joseph A. Watkins, et al.

Reference is made to commonly assigned, co-pending U.S. patent application Ser. No. 09/097,200, entitled ONE-TIME USE CAMERA HAVING GUARD FILM ROLL CHAMBER, and filed in the names of Joseph A. Watkins, et al.

FIELD OF THE INVENTION

The invention relates to photography and photographic equipment and more particularly relates to a rotating hook film loader and film loading method.

BACKGROUND OF THE INVENTION

A wide variety of cameras, film cassettes, bulk film containers and the like store a long, relatively narrow filmstrip as a cylindrical film roll. (The terms "film" and "filmstrip" are used herein to refer to the same physical article. "Film" is used as the more general term. "Filmstrip" is used where it is desired to emphasize that the film, when unrolled, has the form of a long, narrow rectangle.) The roll of film is, in many cases, wound around a central spool or core. In other cases, the core is deleted in an effort to reduce expense, complexity, and weight and the film is in the form of a coreless roll or "roll".

Rolls can be formed by simply transporting a filmstrip into a cylindrical or similarly shaped storage container or camera film chamber. For example, a variety of cameras are known in which a film roll is formed by prewinding unexposed film from a cartridge or spool. U.S. Pat. No. 1,921,559 and U.S. Pat. No. 1,921,560 teach thrust cartridge cameras which prewind to an empty roll chamber having generally concave walls. This approach has the advantage that handling of the roll is minimized, since the roll is formed in situ. This approach has the problem that it tends to require the use of a filmstrip having specific curling properties and becomes problematic when the length of the filmstrip is increased.

A solution to this problem is using an appliance to help shape the roll as it is formed and then removing the appliance. A limitation of such appliances is that the appliance itself requires a certain amount of free space in a specific shape and position or range of positions. This constrains the design of the camera body or film container. A variety of different loading methods and appliances have been used in an attempt to optimize characteristics within these constraints.

Roll forming methods using appliances can be roughly categorized into methods using appliances acting external to the roll, methods using appliances acting internal to the roll, and methods using a combination of internal and external appliances.

External-acting appliances have the advantage that the film does not need to be attached to the appliance during film rolling. The following references teach methods and apparatus in which an external-acting appliance is used.

U.S. Pat. No. 3,057,573 teaches a camera having roll chamber defined by three opposed rollers, which resiliently move apart as the roll diameter is increased. One of the rollers is fixed. The other two are mounted in a movable carrier. U.S. Pat. No. 4,440,483 teaches a camera having a roll chamber defined by curved walls and an arcuate lever. The lever is spring biased to bear against a film roll within the chamber. U.S. Pat. No. 3,288,389 teaches the formation of a roll in a film cartridge within a resilient band of rubber of the like. The band may be lined by foil or other flexible material. U.S. Pat. No. 2,484,248 teaches a similar cartridge having a metal spring. In each of these approaches, the film roll is subject to the compressive force of the springs or resilient band during film use. This compressive force is undesirable, since it puts the rolled filmstrip at risk of scratching. U.S. Pat. No. 5,016,833 teaches a document roll-up system in which media sheets are rolled in a space defined by a pair of external guides and a "C ring".

These various methods either resiliently compress the film roll as it is wound, presenting a risk of scuffing; or rely on cumbersome devices that require access from multiple directions and are thus impractical to use to wind film within an enclosure smaller than the devices themselves; or both.

It would thus be desirable to provide a relatively simple film loader and film loading method which require access to the interior of the chamber from only one direction.

SUMMARY OF THE INVENTION

The invention is defined by the claims. The invention, in its broader aspects, provides method and apparatus for loading a filmstrip. The method includes the steps of: propelling the filmstrip into a cylindrical film space; curling the filmstrip into a film roll within the film space; during the curling, constraining the roll between a pair of opposed contact surfaces; and during the constraining, rotating the contact surfaces about a pivot axis transverse to a film roll axis.

It is an advantageous effect of at least some of the embodiments of the invention that a film loader and film loading method are provided which require access to the interior of the chamber from only one direction.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 21a shows the hooks and film roll in the same state as in FIG. 19. FIG. 21b shows the hooks in a final position and the completed film roll. FIG. 21c shows the hooks in a withdrawal position in the two accessways.

FIG. 22a shows the embodiment of FIG. 19. FIGS. 22b–22h show other embodiments.

FIGS. 23a and 23b are an exploded semi-diagrammatical view and an assembled view, respectively, of the camera frame assembly of FIGS. 21.

FIG. 77 is a semi-diagrammatical partial side view of a camera frame assembly which includes a prepositioned partial wall.

FIG. 78 is a semi-diagrammatical partial side view of another camera frame assembly which includes a post-loading wall. The post-loading wall is installed on the frame in a direction radial to the film roll chamber axis (indicated by a cross).

FIG. 79 is a semi-diagrammatical top view of another camera frame assembly which includes an opening at one end of the film roll chamber, which receives a post-loading wall during axial lodging.

DETAILED DESCRIPTION OF THE INVENTION

Figure 1:
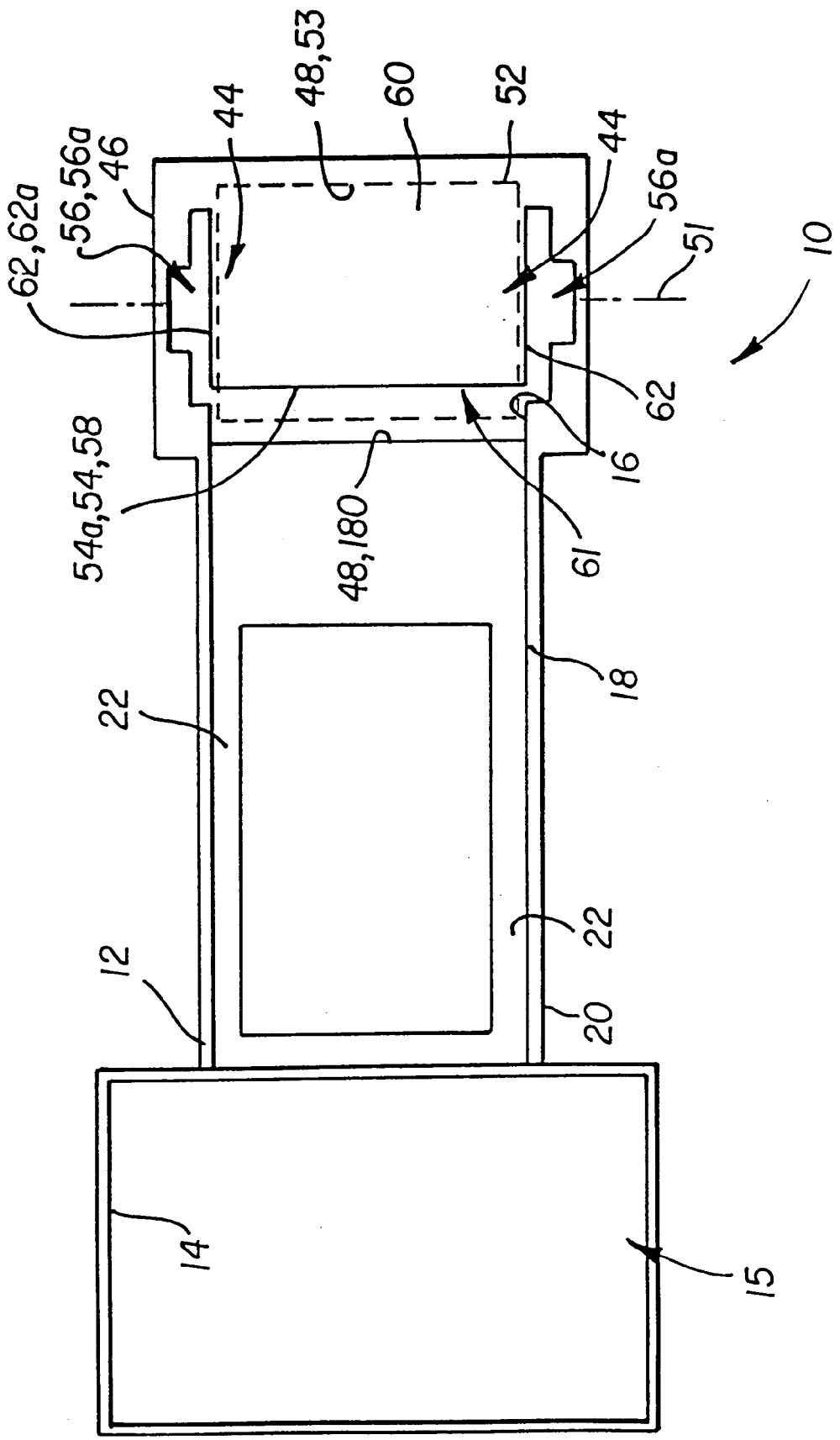
FIG. 1 is a simplified rear view of an embodiment of the camera frame assembly.

Referring initially particularly to FIGS. 1, 13, 23–27, and 42–51; the camera frame assembly 10 includes a frame 12 having a take-up chamber 14 and a film roll chamber 16. The term "camera frame assembly", except where the context indicates otherwise, is used here to refer to a complete camera or an incomplete subunit of a camera that will later be assembled with other parts to form a complete camera. The invention is particularly advantageous in relation to a camera frame assembly that is a completed or incomplete one-time use camera.

The camera frame 12 has an intermediate section or exposure frame 18 between the chambers 14,16. The intermediate section 18, preferably has a pair of parallel margins 20 that are separated by a width dimension that is only slightly larger than the width dimension of the filmstrip 21. At the margins 20, the intermediate section 18 has a pair of opposed, parallel bearing surfaces or rails 22 positioned to support the edges of the filmstrip 21. The chambers 14,16 have rearwardly facing openings 15,17. The portion of the film roll chamber 16 bounding the opening is referred to herein as throat 19. The frame assembly 10 defines a rear opening or rear clearance (located as indicated by dashed line 29 in FIG. 13) over the film roll chamber 16 and, preferably over both chambers 14,16 and the intermediate section 18.

A film cartridge 24 is loaded into the frame assembly 10. The cartridge 24 includes a canister 26, a spool 27, and the filmstrip 21. The filmstrip 21 has a leading portion 28 having a free end 30, a main portion 32, a trailing portion or trailer 34, and a terminus 36 at the end of the trailer 34. The terminus 36 is attached to the spool 27 in the canister 26. The main portion 32 is between the leading and tail portions 28,34. In a transverse direction, the filmstrip 21 has a central region 37 and a pair of opposed lateral edges 38. Prior to film loading, the main and trailing portions 32,34 of the filmstrip 21 are wound around the spool 27 in the canister 26. For thrust cartridges 24, such as Advanced Photo System™ (APS™) cartridges, the leading portion 28 is also wound around the spool 27.

The camera frame assembly 10 can also include other camera components which have been previously installed on the camera frame 12. For example, the camera frame assembly 10 can include an exposure system 39, including one or more sub-components such as a baffle 39a, a lens system 39b, and a shutter (not separately illustrated). The frame assembly 10 can include a camera film drive 43 having a film engagement member (indicated diagrammatically in FIG. 25 by a semicircle 41) which adjoins the intermediate section 18 and engages film perforations (not shown) for film metering or both film metering and film transport. A variety of such camera film drives are well known to those of skill in the art. In such drives, the film engagement member can be a linearly reciprocated pawl; however, a continuously or intermittently toothed sprocket is more commonly used as the film engagement member. With some film transport mechanisms, such as conventional sprocket types, it is necessary to lift film above the sprocket or other film engagement member during prewinding. With other film transport mechanisms, such as some intermittently toothed sprocket types, the film can move past the sprocket or other film engagement member without causing it to rotate or otherwise actuate. The film loading apparatus and methods discussed herein, can accommodate either type of film transport mechanism. In one-time use cameras, a one-way film transport is typically used, which moves the film from a film roll chamber 16 to a take-up chamber 14, on a frame-by-frame basis. Such film transports do not provide for film rewinding, since the film is prewound when the film is initially loaded and is returned to the cartridge or the like as the film exposed.

A completed camera, shown, for example, in FIGS. 23a–23b, and 25–27, includes loaded film, a light-tight back cover 40 over the chambers 14,16 and intermediate section 18, and a front cover 42 over the camera frame assembly 10. In addition to the features already discussed, the camera can also include other conventional camera features well known to those of skill in the art. For example, as discussed below in relation to a particular film loading method and apparatus, a thumbwheel can be attached to the camera frame assembly prior to film loading.

The film roll chamber 16 has opposed ends 44 and a sidewall 48 that extends between the ends 44. The film roll chamber 16 may have an end wall 46 joined to the sidewall 48 at one or both ends 44. The shape of the sidewall 48 is not critical, as long as the film roll 50 can be accommodated without gross deformation and any film contact with the sidewall 48 during camera usage does not cause excessive scuffing. The film roll chamber 16 defines a cylindrical film space 52 having an axis 5 1. The film space 52 is interior to part or all of the throat 19. The film roll chamber 16 lacks a film spool or other axial film support, thus the film space 52 is empty before loading and, after loading, only contains the film roll 50. The axis of the cylindrical film space 52 is the same length and is aligned with the width dimension of the intermediate section 18. In particular embodiments, the film roll chamber 16, including any end wall 46 or end walls 46 and sidewall 48, is a unitary plastic casting.

The camera frame assembly 10 in preferred embodiments, has a guard 54 that shields the film roll chamber 16. The guard 54 partially occludes the throat 19 to limit access to the film space 52 and provide protection even when the back cover 40 is not in place, but also allow film loading. As discussed in greater detail below, the extent of shielding provided by the film guard, some features of the film guard, and related features of the film roll chamber are subject to the spatial requirements of a selected film loading method and apparatus.

Different embodiments of the guard 54 have a number of common features. The guard is fixed to the frame 12 and is as rigid as the rest of the frame 12. The guard 54 extends across the film roll chamber 16, preferably at least halfway so as to overlap the film space axis 5 1. The guard can be cantilevered from the outer edge 53 of the sidewall 48 or can be joined to the outer edge 53 and to other parts of the frame 12. The guard 54 has a gate portion 58 that faces and adjoins the intermediate section 18. The gate portion 58 can overlap the end of the intermediate section 18 or part of the film roll chamber 16. The guard 54 also has a stem portion or guard stem 60 that is continuous with the gate portion 58 and is fixed to the throat 19 of the film roll chamber 16. The gate portion 58 together with the intermediate section 18, defines a film slot 61, through which the film enters the film roll chamber 16 during film loading. The film slot 61 is aligned with the film space axis 5 1. The stem portion 60 has a pair of opposed lateral margins 62, which extend in a direction outward from the gate portion 58. The margins 62 are inset from the ends 44 of the film roll chamber 16. In preferred embodiments, the margins 62 and the film roll chamber 16 define at least one accessway 56 extending through the throat 19 and communicating with said film space 52. The margins 62 of the stem portion 60 and the film roll chamber 16 preferably define two accessways 56 and, at least one of the two is, at least in part, axial to the film space 52. The guard 54 and film roll chamber 16 define at least one accessway 56, which is, at least in part axial to the film space 52. In a non-preferred embodiment, discussed below, the film roll chamber defines the only accessway 56 and the guard 54 blocks the throat 19 except at the film slot 61.

Within these limitations and the limitations of a selected film loading method and apparatus, it is preferred that the guard 54 extends across at least half of the throat 19 of the film roll chamber 16 and overlies the film space axis 51 and that the accessways 56 are of a minimum size necessary for film loading. The size of accessways 56 can be increased and the size of the guard 54 reduced, but the result is less effective shielding of the film roll chamber 16. Similarly, guards 54 are generally described herein as having one or two accessways 56, depending upon the particular film loading method. Additional accessways 56 can be provided as necessary for particular film loading methods and apparatus. If optional, the additional accessways 56 are undesirable to the extent that they open the interior of the film roll chamber 16 to a greater risk of contamination and damage.

Figure 24:
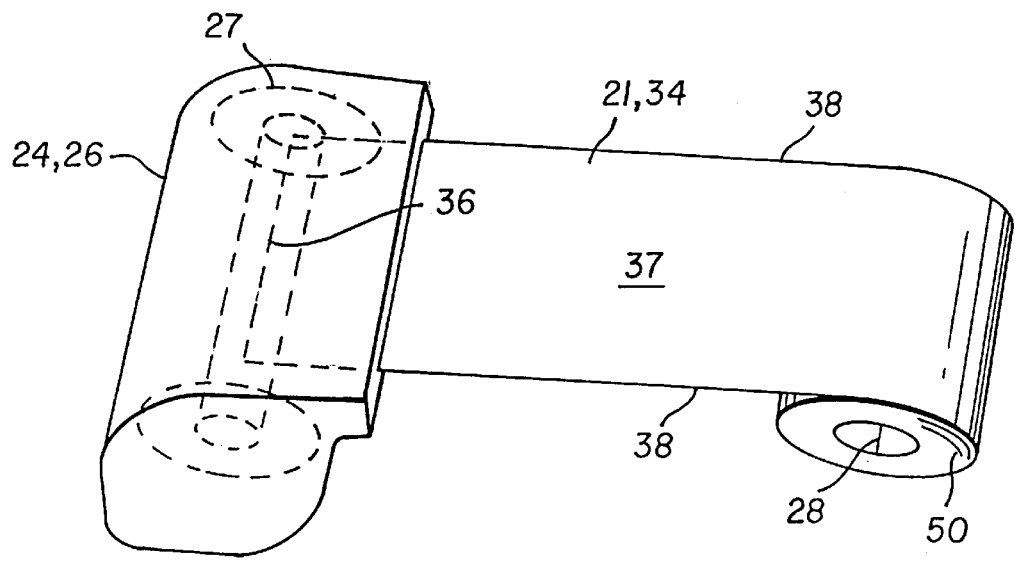
FIG. 24 is a semi-diagrammatical enlargement of the film cassette and film roll of the camera frame assembly of FIG. 23.
Figure 25:
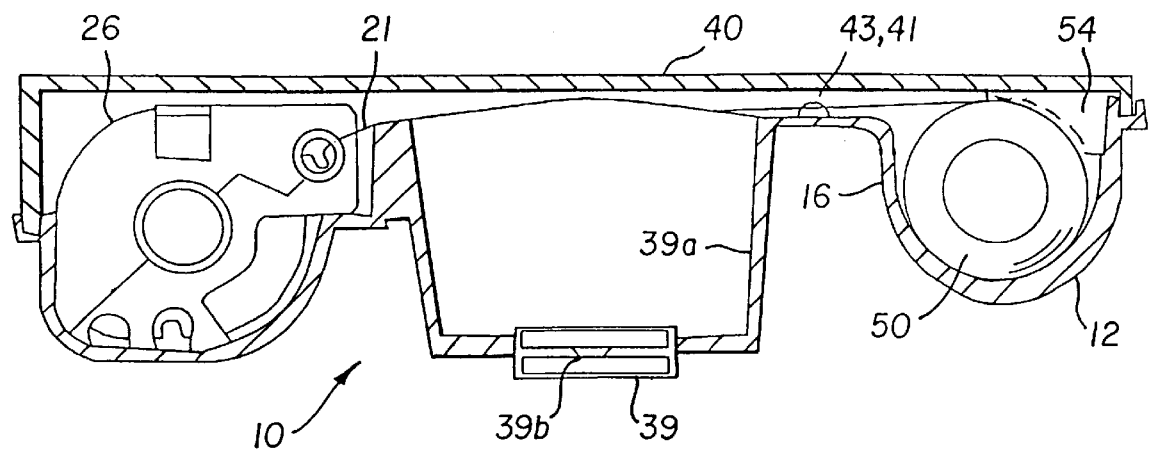
FIG. 25 is a semi-diagrammatical side cross-sectional view of the camera frame assembly of FIG. 23.
Figure 26:
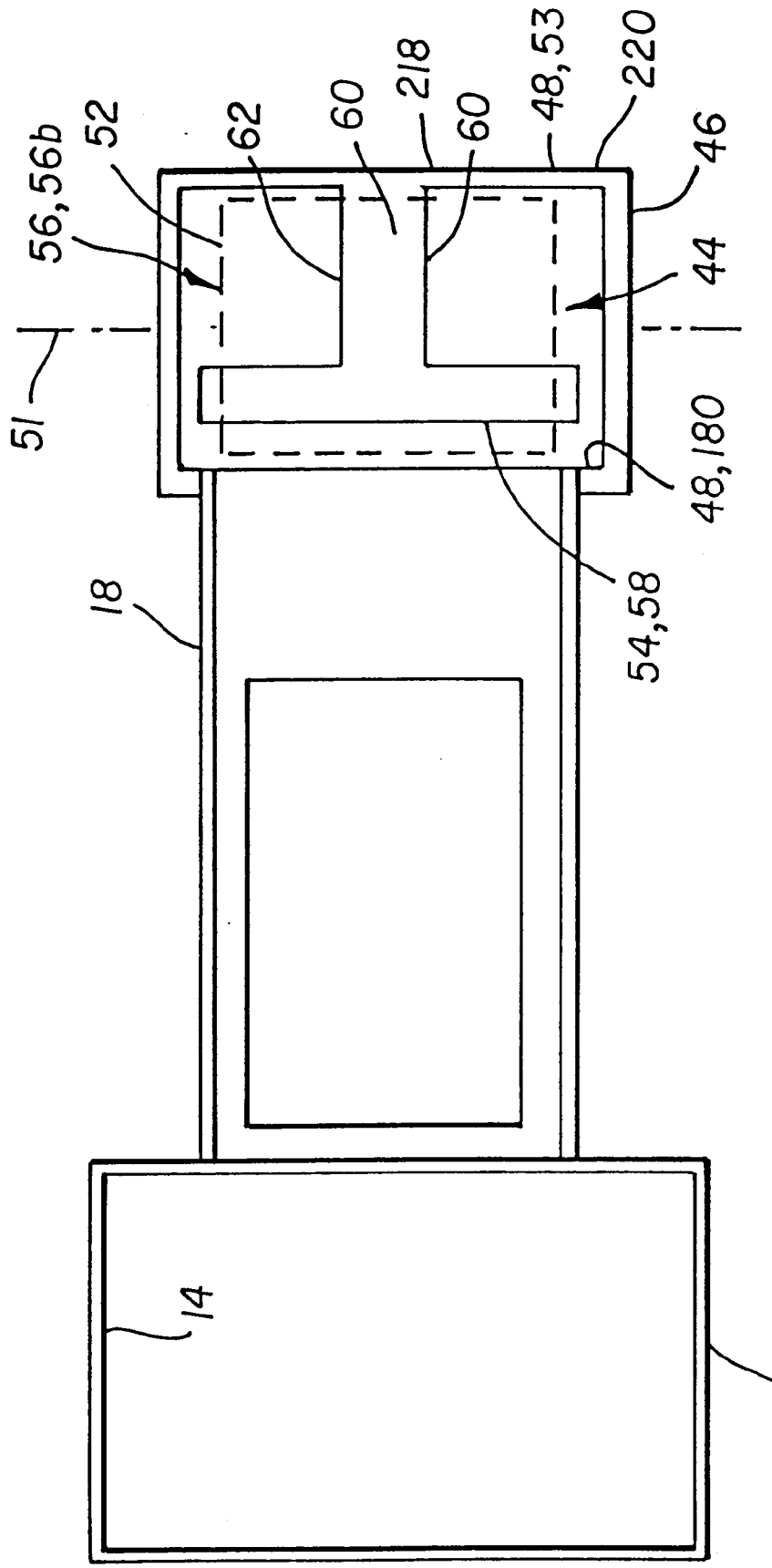
FIG. 26 is an semi-diagrammatical top view of another embodiment of the camera frame assembly.
Figure 42:
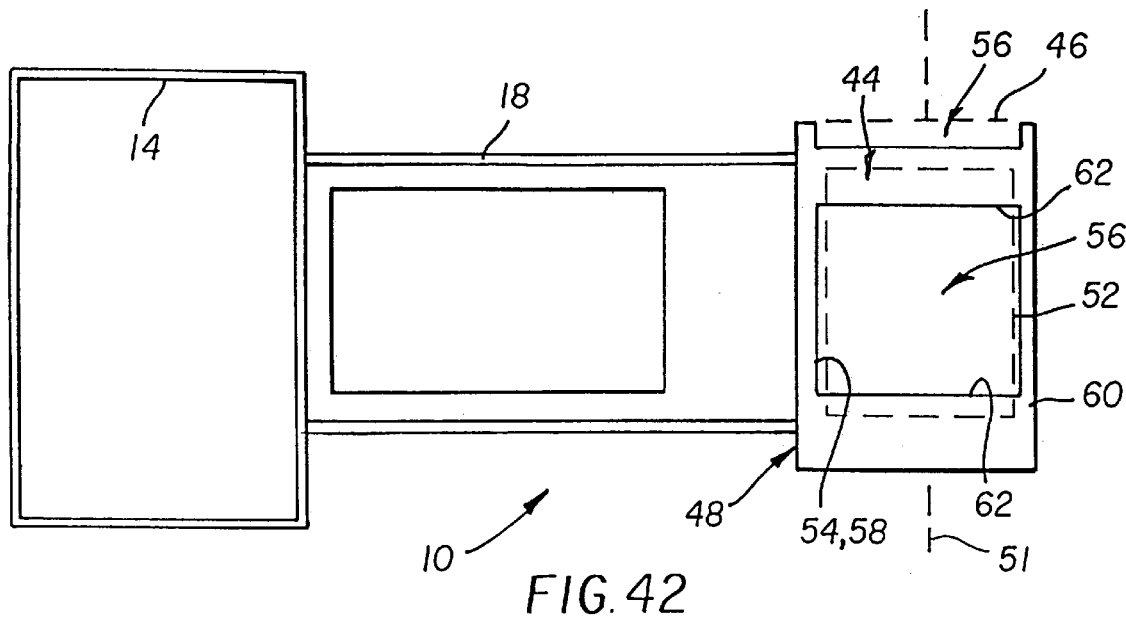
FIG. 42 is a simplified rear view of another embodiment of the camera frame assembly.
Figure 43:
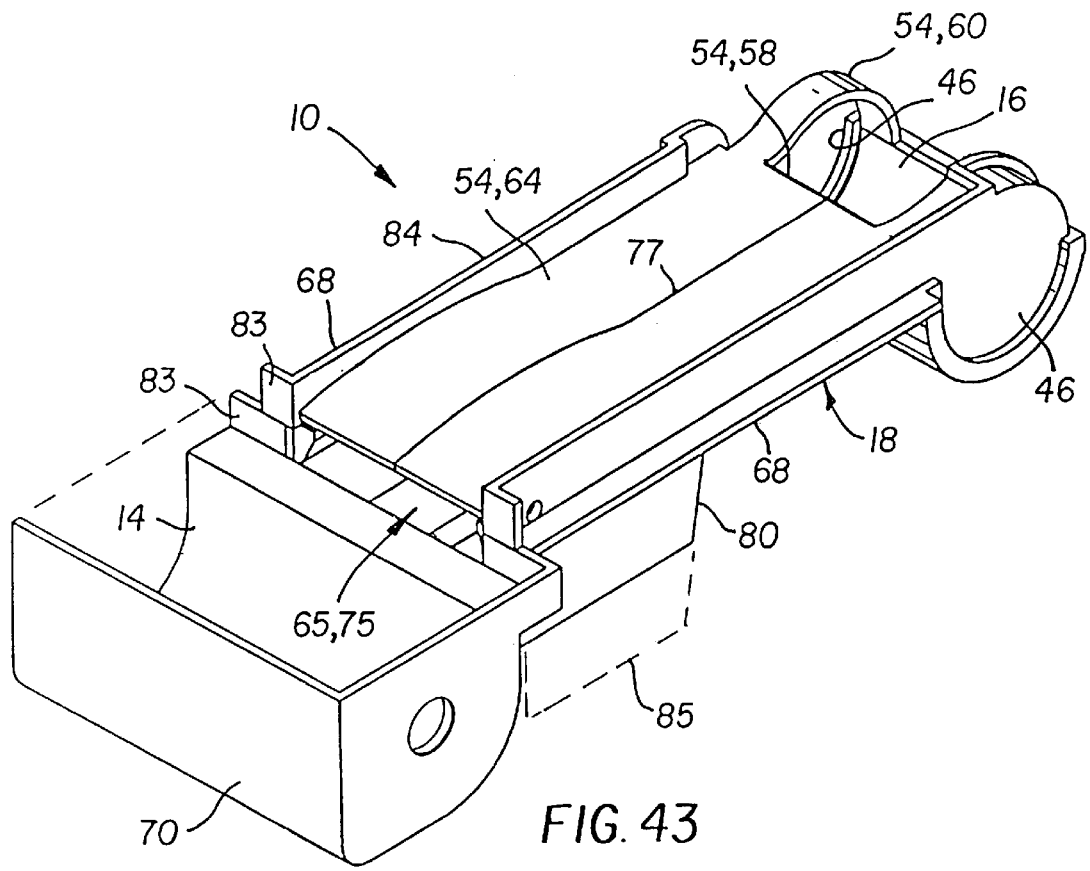
FIG. 43 is a top, rear perspective view of another embodiment of the camera frame assembly.
Figure 44:
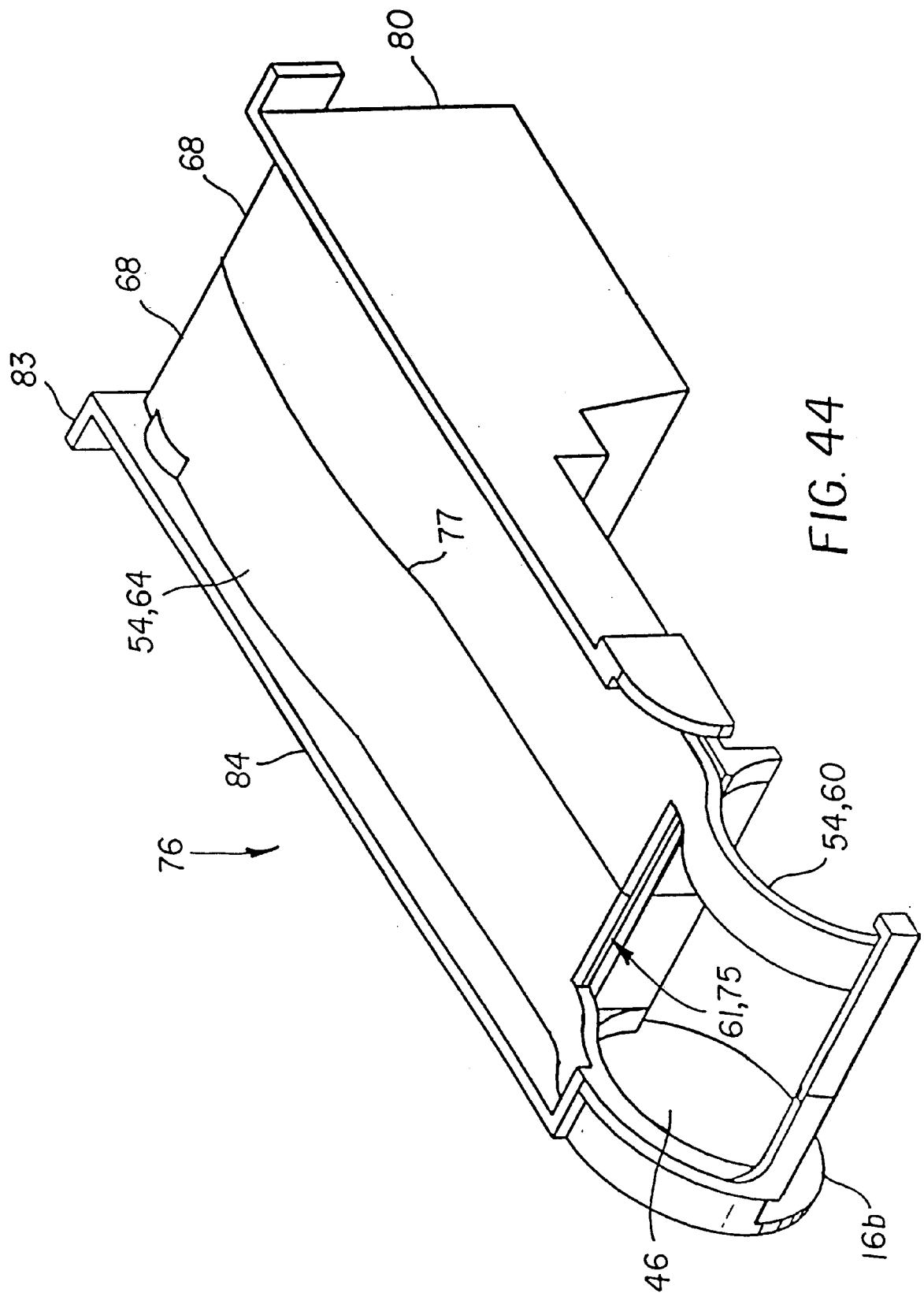
FIG. 44 is a bottom, rear perspective view of the path enclosure of the camera frame assembly of FIG. 43.

The gate portion 58 can be an inner edge of the guard 54, as shown in FIGS. 1, 24, and 26. The guard 54 can also have an extension 64 extending beyond the gate portion 58, so as to overlap all or part of the intermediate section 18. For example, FIGS. 43-51 show a camera frame assembly having a guard 54 that overlies across the entire intermediate section 18. In this case, the guard 54 and intermediate section 18 together define a closed or partially closed film portal 63, having the film slot 61 at one end and a film entryway 65 at the other. The film entryway 65 is positioned and configured so as to allow easy movement of the film without undue friction. FIG. 42 shows an extension 64 that partially overlies the intermediate section 18. The extensions 64 are shown in FIGS. 42–51 with a guard having a particular configuration of stem portion 60; however, an extension 64 can also be included with other guards 54, such as those shown in FIGS. 1 and 24–27.

In addition to extending over the intermediate section 18, the guard 54 can also partially or fully overlie the take-up chamber 14 (indicated by a dashed line in FIG. 43), unless this would interfere with film loading. A guard 54 used with Type 135 film must allow for placement of the protruding film leader. If APS™ film or other thrust cartridge film is used, then the film cartridge 24 can be easily lodged axially, and the guard 54 can extend all or part way across the take-up chamber 14. It is highly desirable that the take-up chamber allow the exposed film to be easily removed after use, without damage to the guard 54. For example, a thrust type film cartridge 24 can be loaded and unloaded axially, from the frame assembly 10 shown in FIG. 43, since the take-up chamber 14 has an open end.

Figure 45:
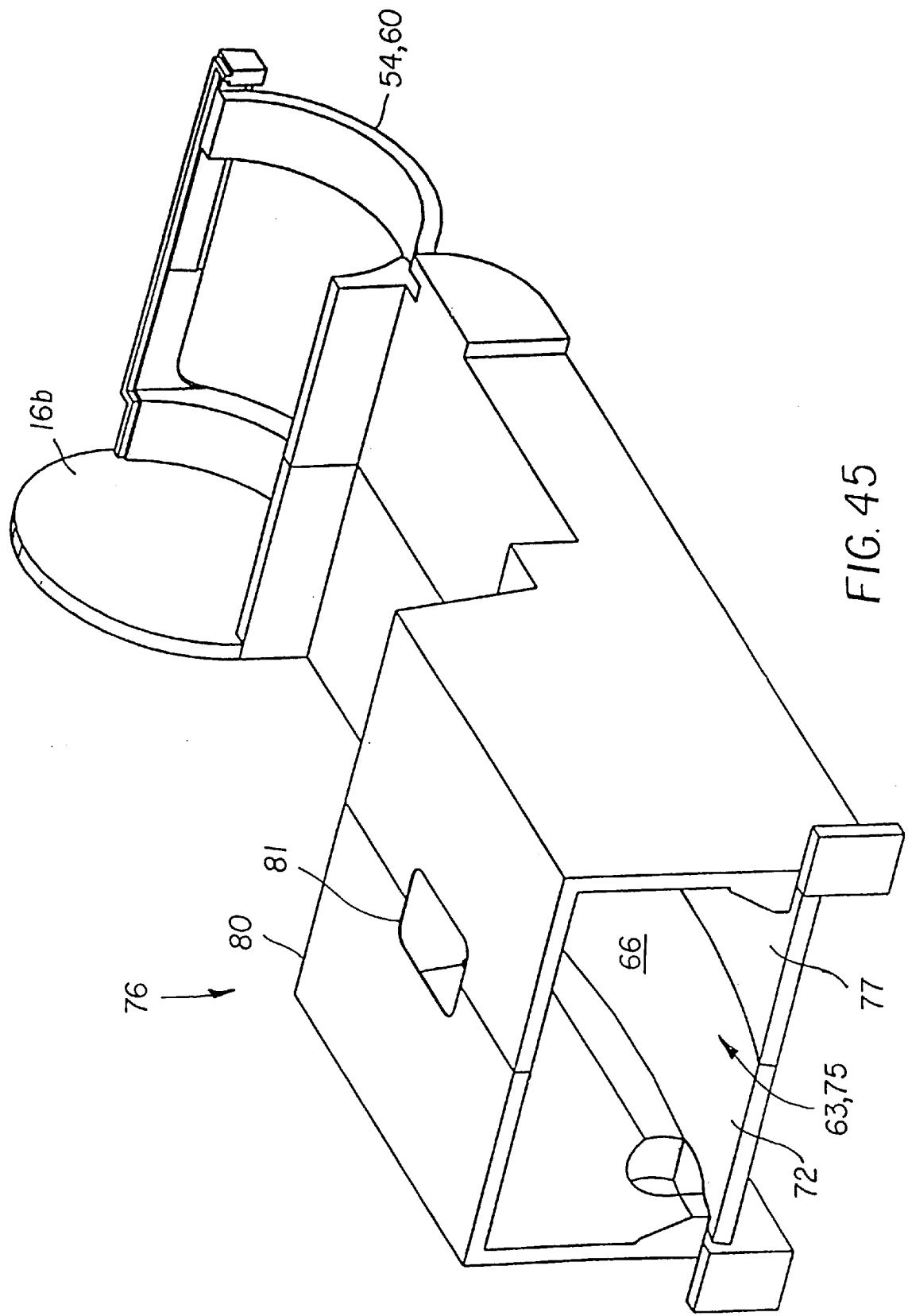
FIG. 45 is a bottom, front perspective view of the path enclosure of FIG. 44.
Figure 46:
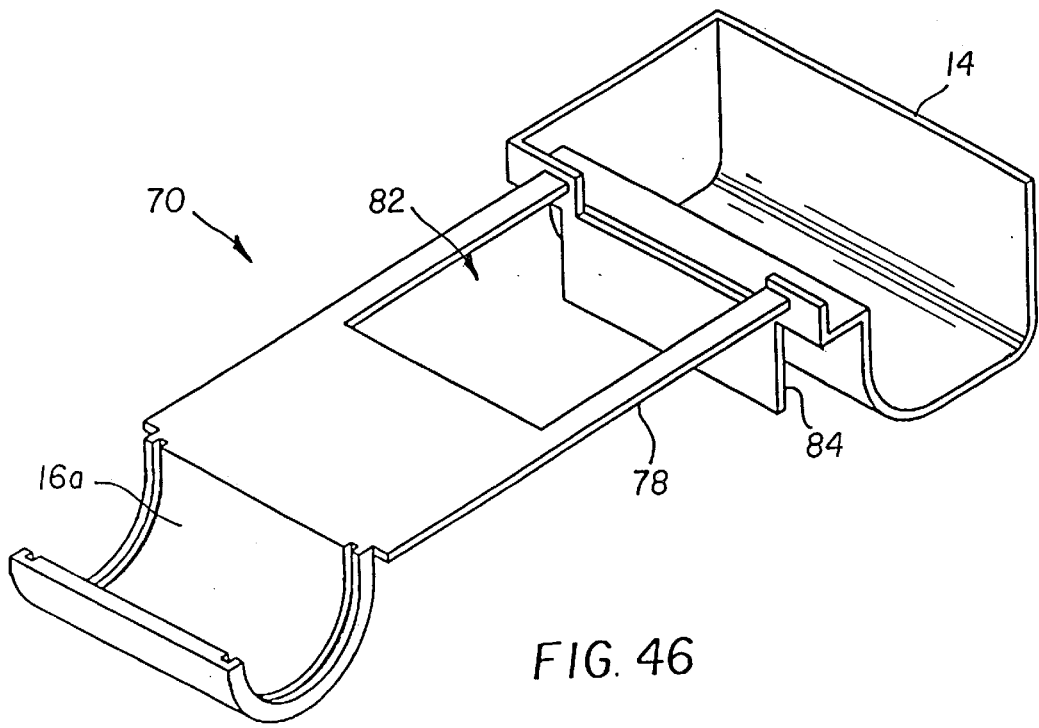
FIG. 46 is a bottom, rear perspective view of the backbone of the camera frame assembly of FIG. 43.
Figure 47:
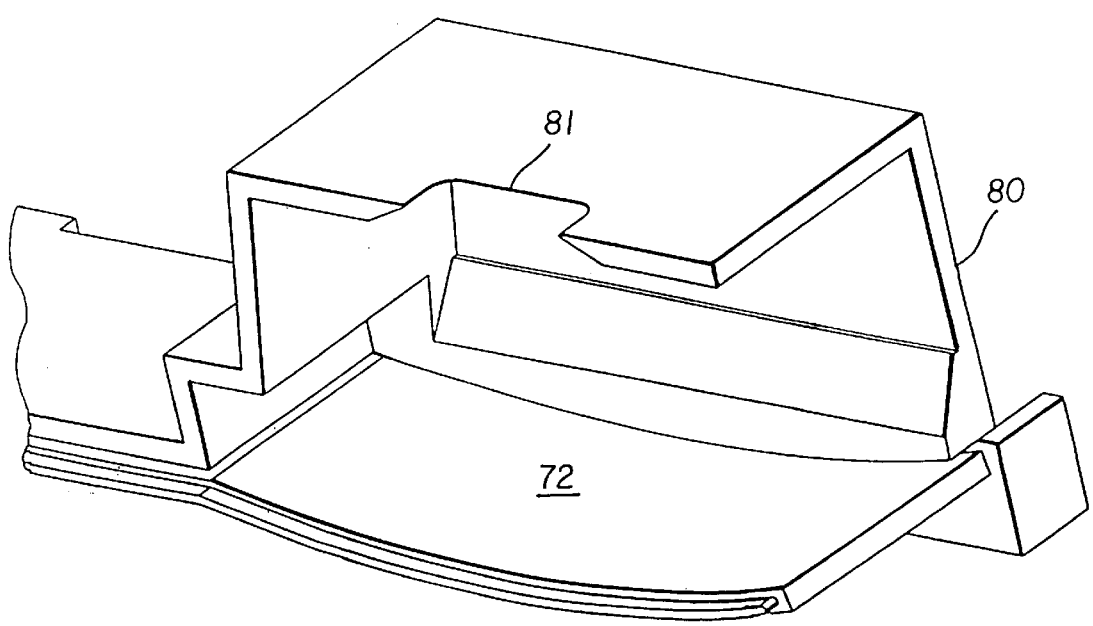
FIG. 47 is a top, front perspective view of one of the path subenclosures of the camera frame assembly of FIG. 44.
Figure 48:
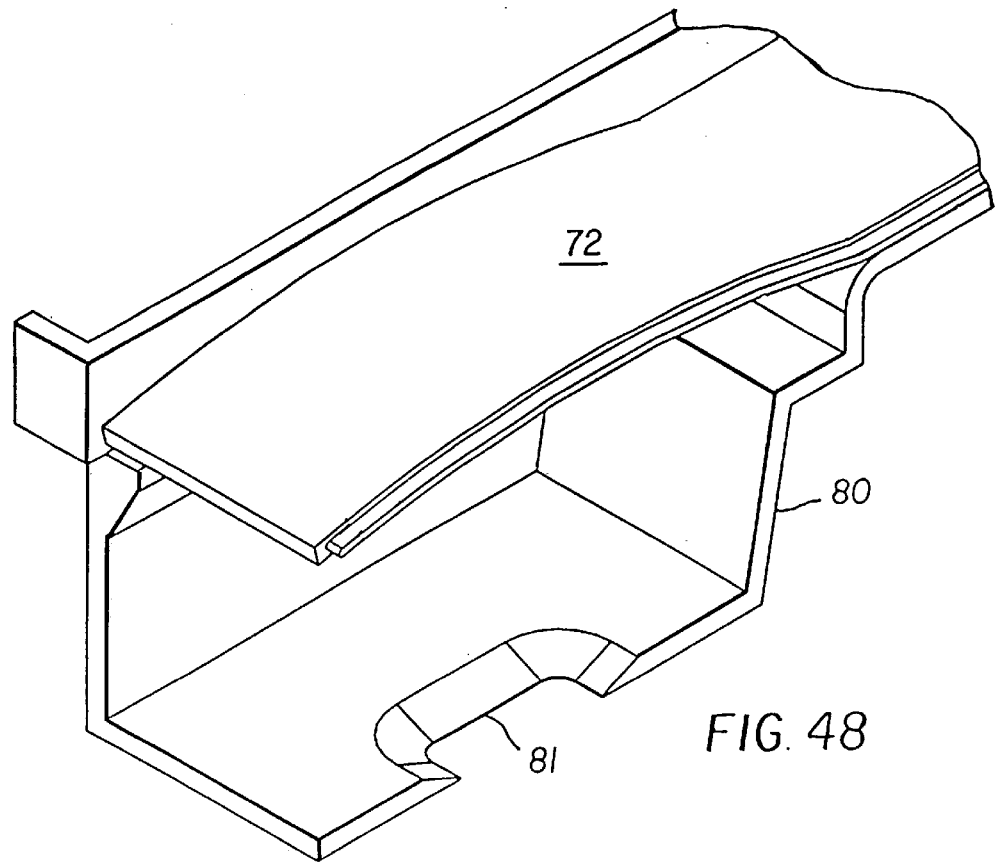
FIG. 48 is a top, rear perspective view of the lower path subenclosure of the camera frame assembly of FIG. 44.
Figure 49:
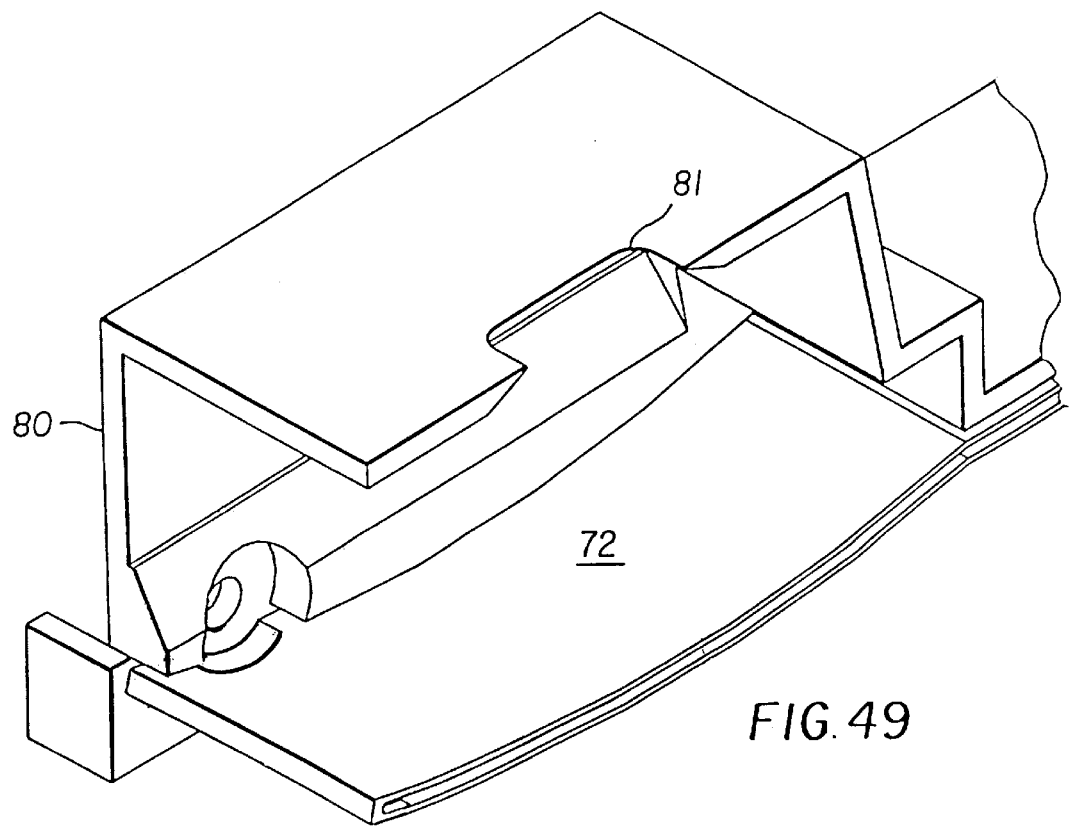
FIG. 49 is a bottom, front perspective view of the upper path subenclosure of the camera frame assembly of FIG 44.
Figure 50:
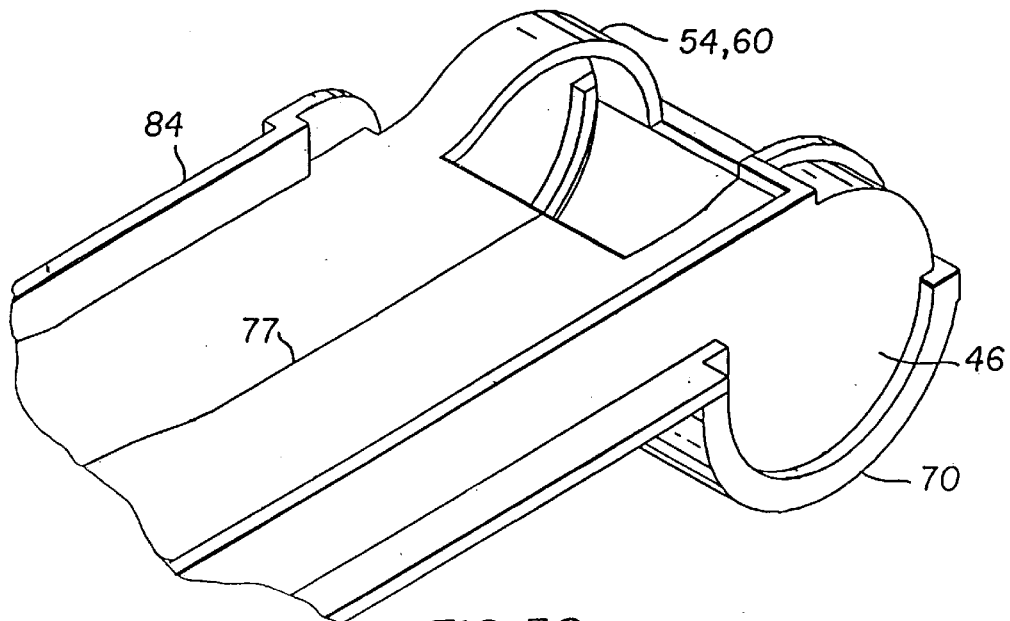
FIG. 50 is a partial enlargement of the view of FIG. 43, showing the film roll chamber and part of the guard.
Figure 51:
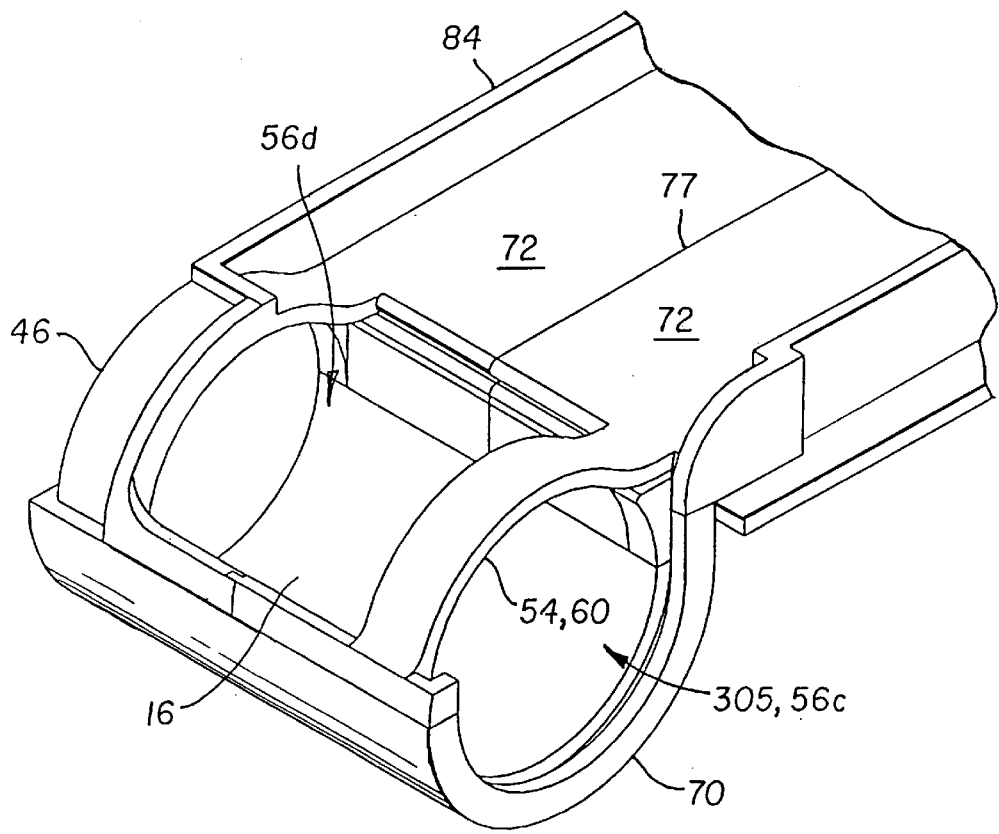
FIG. 51 is a partial, bottom, rear perspective view of the camera frame assembly of FIG. 43 showing the film roll chamber and part of the guard.
Figure 52:
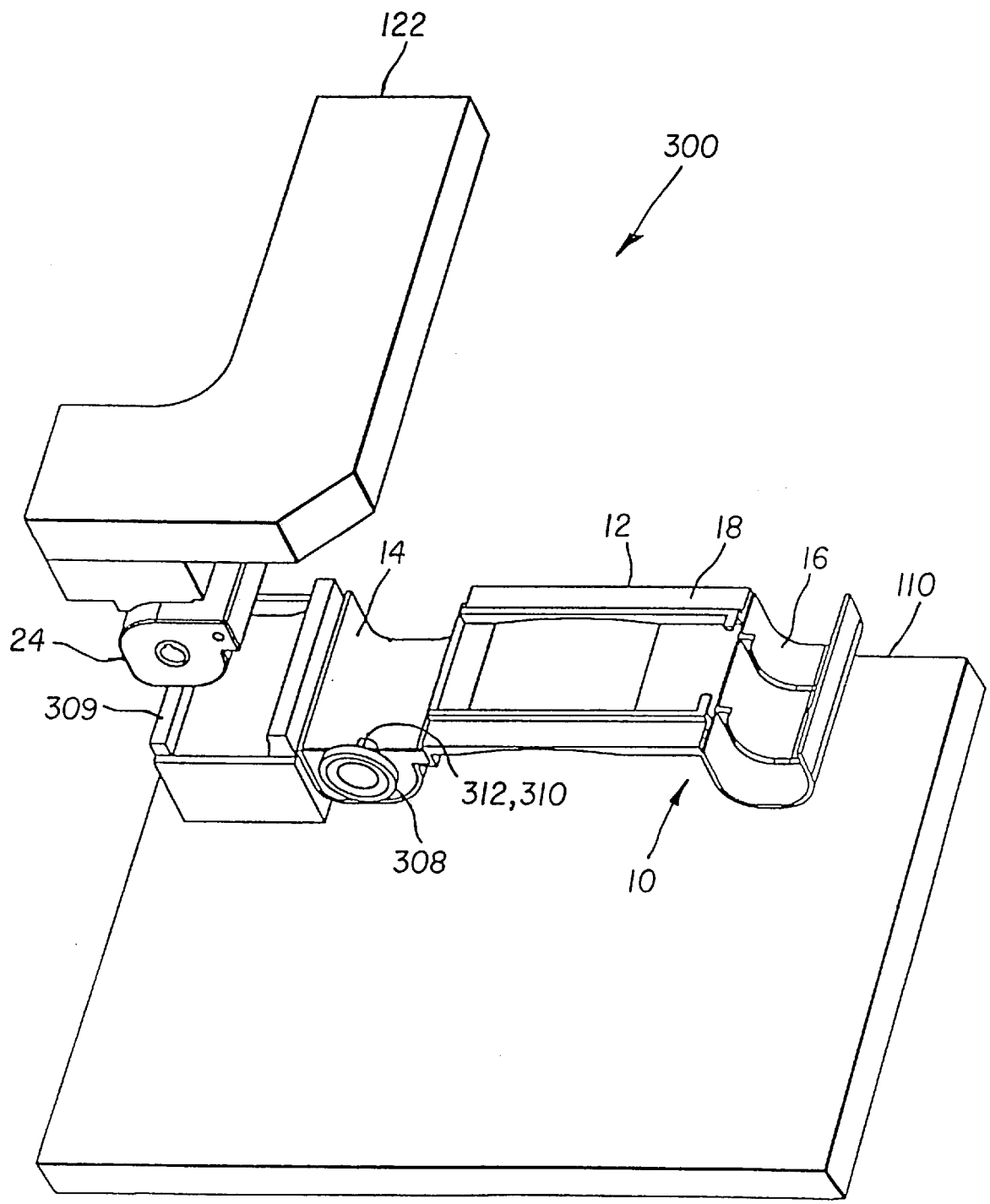
FIG. 52 is a semi-diagrammatical perspective view of a cartridge moving station of an embodiment of the apparatus.

The extension 64 can include a film platen 66 (shown in FIG. 45). The platen 66 can be a fixed portion of the extension 64 or a separate, spring-loaded support or the like (not shown). The platen 66 can be flat or curved so as to match a particular lens system. The platen 66 can extend across the full width of the intermediate section 18 or can be limited to one or more longitudinal or transverse ribs or a series of bumps or some combination of such features. A wide variety of platens are well known to those of skill in the art. The platen 66 can protrude inward from the remainder of the extension 64 (not shown) or the extension 64 can follow the shape of the platen 66.

In the completed camera, the guard 54 overlies the film roll chamber 16 and separates the back cover 40 from the film space 52. The configuration of the back cover 40 overlying the film roll chamber 16 is not critical, except as to features of the back cover 40 that cooperate with other parts of the camera to provide a light-lock. The requirements of a light-tight fit between camera parts and suitable design and manufacturing considerations are well known to those of skill in the art. In addition to separating the back cover 40 from the film space 52, a guard 54 having an extension 64 over part or all of the intermediate section 18 also, in turn, partially or fully separates the back cover 40 from the intermediate section 18.

The inclusion of the film platen 66 in the extension 64 allows the film plane of the completed camera to be independent of the camera back cover 40. This can allow the use of closer tolerances for the film platen 66 than would be practical with a platen 66 formed as part of a back cover 40. With the film platen 66 function removed, the back cover 40 can be simplified, without increasing a risk of film damage during use, such as film pinching due to flexing of the back cover.

In the camera frame assembly 10 in FIGS. 43–51, the frame assembly 10 has two path subenclosures 68 and a backbone 70. The path subenclosures 68 each include a platen subunit 72 and an intermediate section subunit 74, and are permanently joined together. It is highly preferred, for accuracy, that each path subenclosure 68 be monolithic; that is, a single plastic casting. For example, the path subenclosures 68 shown in FIGS. 43–51 can be prepared by injection molding using two-part molds.

The subenclosures 68 are joined together, in alignment, to form the platen 66 and intermediate section 18 from respective pairs of subunits 72,74. As in other camera frame assemblies 10, the platen 66 and intermediate section 18 define a film path 75. Since, in preferred embodiments, each subenclosure 68 is made as a single part, the dimensions of the film path 75 in each subenclosure 68 can be controlled with precision. The two subenclosures 68 are fitted together along a longitudinally extending suture 77, preferably, using tongue and groove portions or other interlocking features all along the contacting edges (shown in FIGS. 47–49 for the platen unit edges). Since the contacting edges are quite long, any imperfections in the fit of the two subenclosures 68 tend to either preclude assembly or cause gross deformations in the shape of the resulting enclosure 76. In either case, defective subenclosures 68 can be readily discarded, ensuring that production camera frame assemblies 10 have film paths 75 with precise tolerances throughout the enclosure 76. This approach also accommodates differences in platen subunits; the film tends to ride on the better platen subunit, that is, the innermost platen subunit. Film pinching can be avoided by selection of appropriate tolerances or pinching units can be culled after assembly.

In the enclosure of FIGS. 43–51, the two subenclosures 68 are roughly mirror images and the suture 77 forms a longitudinal midline between the two subenclosures 68. The position and configuration of the suture 77 can be varied. The longitudinal midline suture shown is convenient from the viewpoints of injection molding and assembly.

The subenclosures 68 are, preferably, permanently joined together to form the enclosure 76 by solvent welding, adhesive welding, sonic welding or the like. Permanently joining the path subenclosures 68 together prevents any risk of misalignment of the subenclosures during use and prevents possible damage to the separated units during camera recycling. It is highly preferred that the subenclosures 68 are assembled empty, to avoid the risk of damage to the film during assembly.

The backbone 70 includes an attachment portion 78, and part or all, of one or both film chambers 14,16. The remaining parts of the film chamber or chambers 14,16 can be provided by the enclosure 76. In the embodiment shown in FIGS. 43–51, the backbone 70 includes the take-up chamber 14 and a front portion 16a of the film roll chamber 16. The enclosure 76 includes a back portion 16b of the film roll chamber 16. The front and back portions 16a,16b join together along tongue and groove features.

The enclosure 76 also includes the guard 54 and a baffle 80 that directs light from a lens system 81 (illustrated only as an aperture) to a film plane (part of the film path 75 defined by an opening (not shown) in the intermediate section 18). The subenclosures 68 can divide the guard 54 and baffle 80 into subunits in the same manner as the platen 66 and intermediate section 18. The baffle 80 extends through an opening 82 in the backbone 70. The baffle 80 can alternatively be provided as part of the backbone 70.

The enclosure 76 and backbone 70 can each include one or more locators 83 to help in alignment during assembly. The enclosure 76 and backbone 70 can also each include one or more support structures 84 which increase stiffness, aid in attachment to other parts and the like. Other camera parts (represented by dashed line box 85 in FIG. 43) can be attached to one or more of the units, at any time during assembly.

Various features of the camera frame assembly 10 can be varied to meet the needs of different apparatus and methods for winding the film into the film roll chamber 16.

Referring now particularly to FIGS. 1–18 a film edge driving film loader 100 is illustrated, which is particularly useful with the camera frame assembly 10 of FIG. 1. In the apparatus 100, a filmstrip 21 is transported to a film winder 101, cinched on a pair of spaced apart, opposed rims 102, and then wound into a coil on the rims 102 by synchronous rotation of both rims 102. Since the filmstrip 21 is wound onto the rims 102 after cinching, the film roll 50 has a constant internal diameter during winding. The apparatus 100 and method are useful with both guarded and unguarded camera frame assemblies 10. A suitable frame assembly 10 having a guarded film roll chamber 16 is shown in FIG. 1.

Like the other film loading methods discussed below, this film loading method is particularly suitable for use with a camera frame assembly 10 having a guarded film roll chamber 16; but is also suitable for unguarded frame assemblies and non-camera film housings, and can even be used to wind a filmstrip fully or partially outside a housing for subsequent loading into the housing. The latter is not preferred; however, because the subsequent loading into a film roll chamber of a housing adds an additional risk of film damage when the film roll is moved into the chamber. Non-camera housings include film containers and cassettes and other articles for storing photographic film.

The film source for the loading method can be a bulk roll or a shorter film roll or a film cartridge 24, but is generally discussed below in terms of prewinding a filmstrip 21 from a cartridge 24 into the film roll chamber 16 of the camera frame assembly 10. It will be understood, however, that a bulk or shorter film roll can be substituted for the cartridge 24.

Referring now to the camera frame assembly 10 of FIG. 1, the film roll chamber 16 has a pair of opposed end walls 46 and a sidewall 48 extending between the end walls 46. Each end wall 46 preferably closes the respective end 44 of the film roll chamber 16, but one or both end walls 46 can be partially cut away. The end walls 46 are separated by a distance that is about the same as the width dimension of the intermediate section 18 in a direction parallel to the film space axis 51.

The end walls 46 each have an inwardly facing film roll restraint 104 and a recess 106 that adjoins the film roll restraint 104. Each recess defines an accessway 56a. In the embodiment shown in FIG. 1, each film roll restraint 104 is a continuous, C-shaped ledge; however, one or both film roll restraints 104 can be differently shaped or discontinuous. The sidewall 48 and film roll restraints 104 together define cylindrical external boundaries of the film space 52. The recesses 106 are axially outboard from respective film roll restraints 104. The shape of the recesses 106 is not critical, other than it is desirable to configure the recesses 106 to barely clear the film loading equipment. The recesses 106, in the frame assembly 10 of FIG. 1, thus each have the shape of a trough bordered by a C-shaped ledge and joined to the respective film roll restraint 104.

The guard 54a shown in FIG. 1 extends across the film roll chamber 16 from the outer edge of the sidewall 48 and has a gate portion 58 in the form of a front margin facing the intermediate section 18, but the guard 54 can also include an extension 64 overlying the intermediate section 18. The guard 54a has a pair of opposed lateral margins 62a facing respective end walls 46. The lateral margins 62a and respective recesses 106 of the film roll chamber 16 define a pair of accessways 56a. Each accessway 56a is contiguous with a respective axial end of the film space 52. The accessways 56a each extend radially outward relative to the film space axis 51 and each accessway 56a has an accessway opening 108 that forms part of the throat 19 of the film roll chamber 16. In the embodiment shown in FIG. 1, unnecessary space within the accessways 56a is minimized. The recesses 106 are stepped toward the axis 51 and outward from the film roll restraints 104 and the maximum axial dimension of each recess 106 is limited to a small fraction of the axial dimension of the film space 52, preferably about 3–4 mm. In that embodiment, the stem portion 60 of guard 54a is rectangular in shape and extends axially across most or all of the film space 52. The film space 52 is accessible only through the film slot 61, and the accessways 56a.

Figure 2:
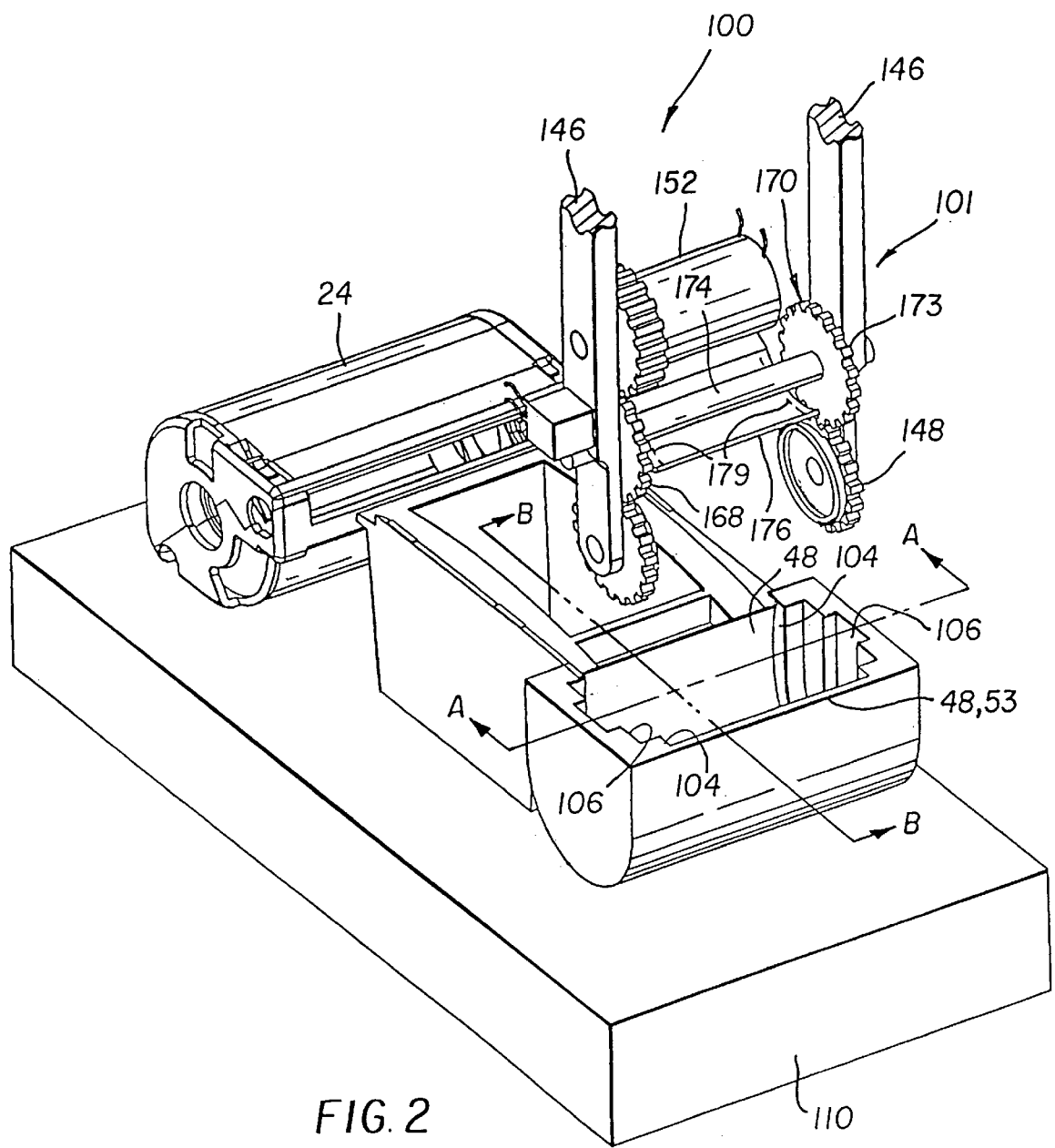
FIG. 2 is perspective view of a film edge driving film loader. A camera frame assembly is also shown. For clarity, only the receiver, and winding mechanism of the apparatus are shown. The arms of the winding mechanism are cut-away below where the arms would connect to an actuation mechanism of the apparatus. Conductors of the film sensor and winder drive are also cut-away. The camera frame assembly is simplified and the take-up chamber is not shown.
Figure 3:
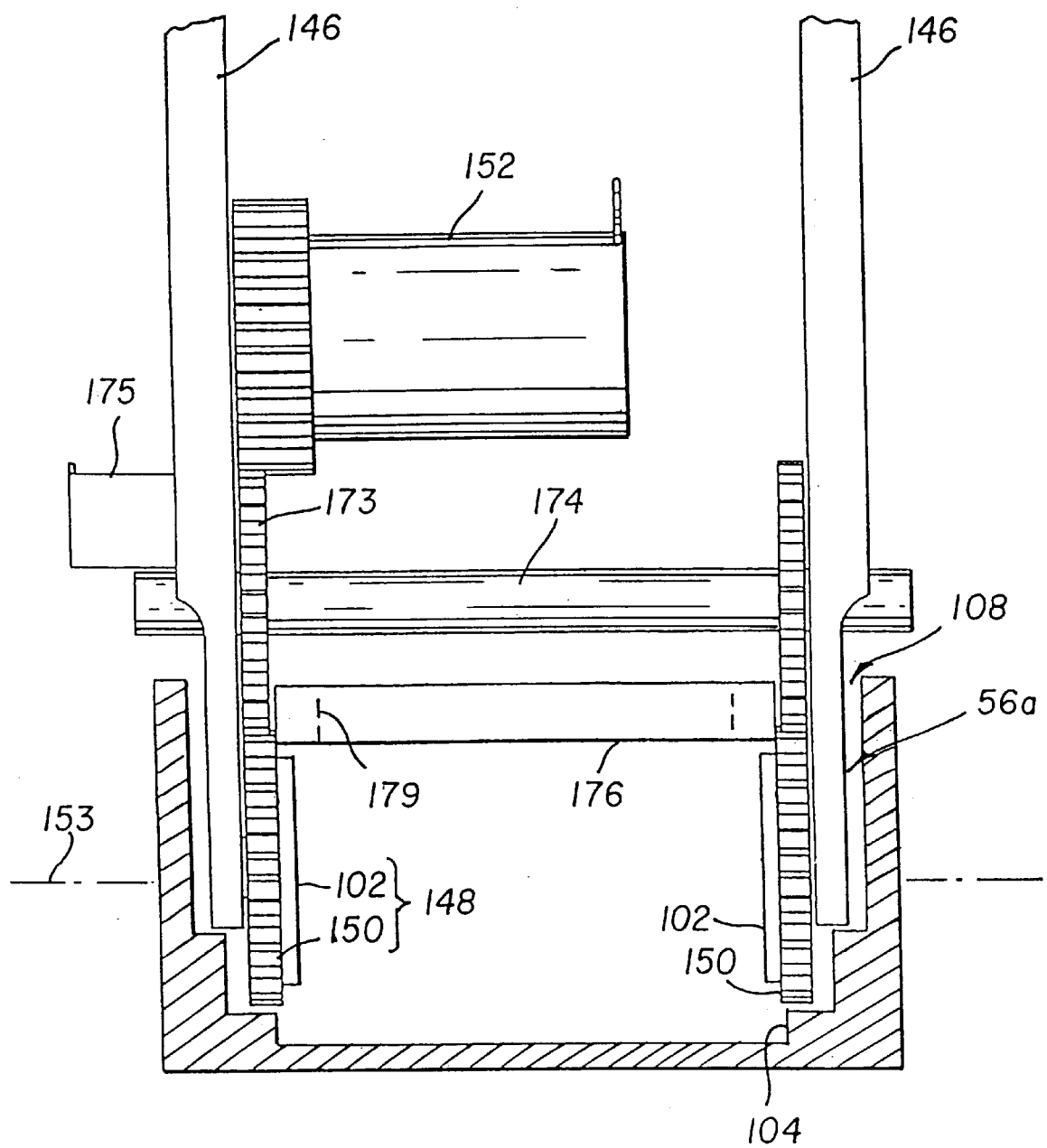
FIG. 3 is a cross-sectional end view of the apparatus and camera frame assembly, as shown in FIG. 2, taken substantially along line A—A of FIG. 2.
Figure 15:
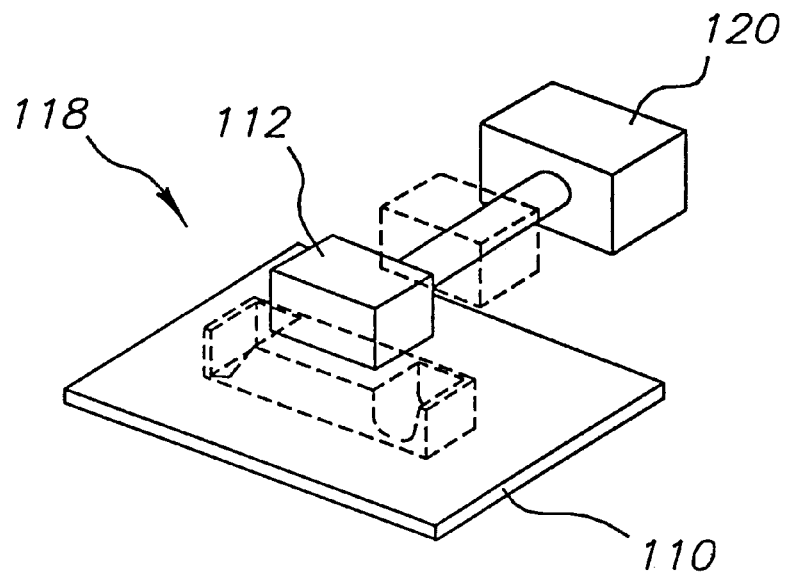
FIG. 15 is a semi-diagrammatical view of an embodiment of a film edge driving film loader showing the receiver and an actuation mechanism. The location of a site for the camera frame assembly is shown in dashed lines. A component is illustrated in active and inactive positions in solid and dashed lines.
Figure 16:
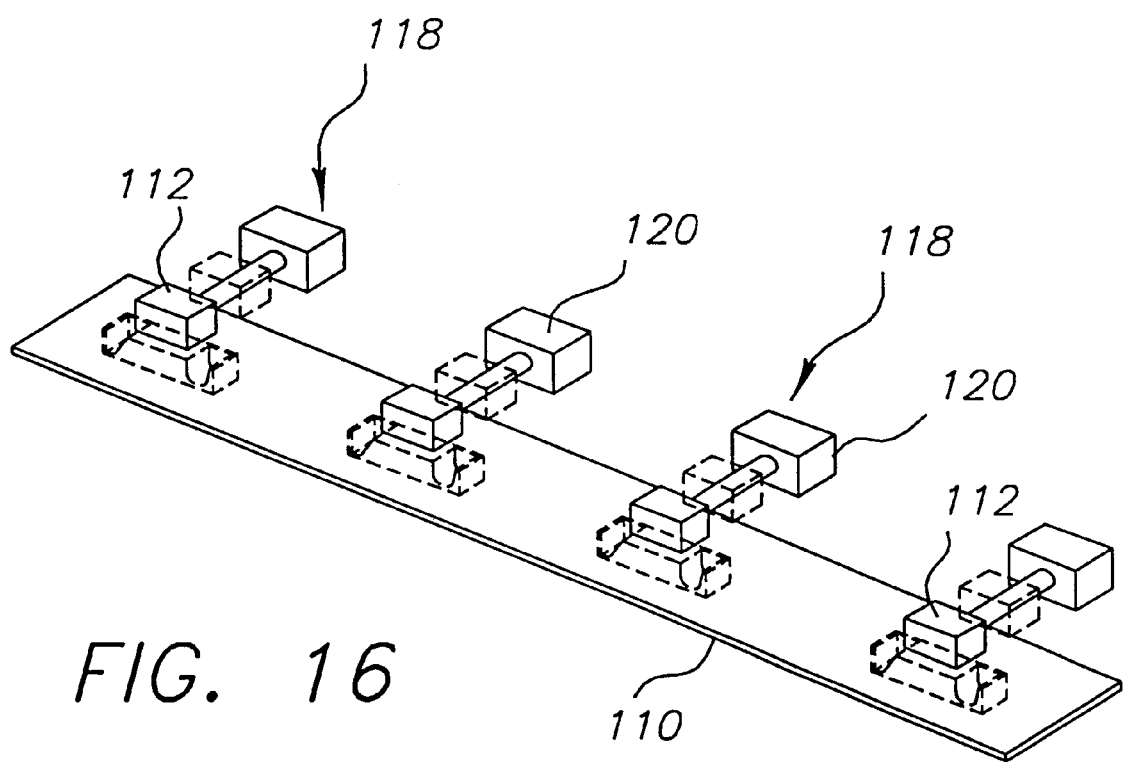
FIG. 16 is a semi-diagrammatical view of another embodiment of a film edge driving film loader showing the receiver and a series of components and actuation mechanisms. The location of sites for the camera frame assembly are shown in dashed lines. The components are illustrated in active and inactive positions in solid and dashed lines.

Referring now particularly to FIGS. 2 and 15–16, the film edge driving film loader 100 prewinds a filmstrip 21, in a darkroom, into a film roll 50 in the camera frame assembly 10. The film edge driving film loader 100 includes a receiver 110, and active components 112 for cartridge loading, film transporting, and film winding. The receiver 110 supports the camera frame assembly 10 or other housing in a predetermined loading position or series of positions relative to the active components 112. The receiver 110 has a predetermined relationship to other components 112 and thus, during assembly, defines a predetermined relative location or site for each of the features of the camera frame assemblies 10. (Sites corresponding to individual features of the frame assembly 10 and are necessarily predetermined for a particular frame assembly 10 by adjusting physical constraints such as relative positions of the receiver 110 and other components 112 of the apparatus 10.) The receiver 110 can accept the camera frame assembly 10 directly or can be adapted to accept a pallet or nest 66 or the like. In that case, the camera frame assembly 10 is held in a predetermined relation to the pallet 67, which in turn, is held in a predetermined loading orientation by the receiver 110. Indexing features 114 can be provided on the pallet 67 to permit the camera frame assembly 10 and the receiver 110 to be readily aligned. The frame assembly 10 can be provided to the receiver 110 premounted on a pallet 67 or the pallet 67 and frame assembly 10 can combined on the receiver 110.

The receiver 110 can have a variety of features for supporting automated assembly operations. For example, the receiver 110 can include a movement system 116, for moving a camera frame assembly 10 between the apparatus 100 and one or more other assembly stations or between stations 118 having different components 112 of the apparatus 100. For example, in FIG. 13, the movement system 116 (illustrated schematically) can be a conveyor or track for moving the camera frame assembly 10 in directions perpendicular to the plane of the figure. The apparatus components 112 can each include an actuation mechanism 120 such as a retraction-extension unit to allow the component 112 to extend to an active position for use and to retract to a store or inactive position clear of the movement system 116 between actuations. (Examples of active and inactive positions for various components 112 are indicated in FIGS. 15–16 in solid and dashed lines.) The actuation mechanism 120 can also include other parts for imparting motion to component 112, such as rotary or linear drives. As a matter of convenience, the discussion herein generally treats the receiver 110 as being static relative to other components 112 of the apparatus 10.

Figure 18:
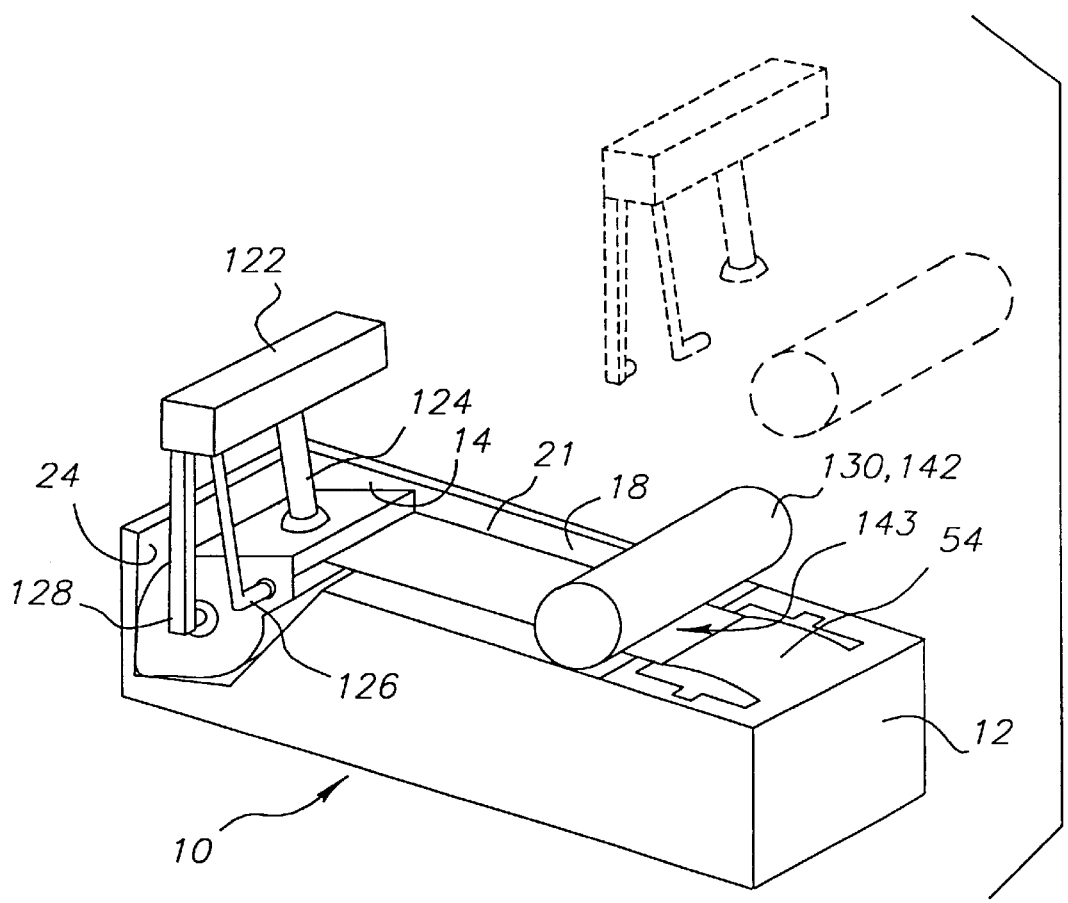
FIG. 18 is a semi-diagrammatical perspective view of still another film edge driving film loader and camera frame assembly. For clarity, the receiver is not shown and the camera frame assembly is shown in simplified form. The film bridge and cartridge mover are shown in a use position in solid lines and in a non-use or rest position in dashed lines.

The apparatus 100 can include a cartridge mover 122, shown in FIG. 18, for positioning the cartridge 24 in the site of the take-up chamber 14. The cartridge mover 122 can be simply a pick and place mechanism or can provide additional functions. In the embodiment shown in FIG. 18, the cartridge mover 122 has a vacuum gripper 124 which allows the cartridge mover 122 to position the cartridge 24 in the take-up chamber 14. The vacuum gripper 124 or a holddown (not shown) can be used to retain the cartridge 24 in the take-up chamber 14 during film winding, if the camera frame assembly 10 lacks features to prevent oscillation or other movement. In this embodiment, the cartridge mover 122 also supports an active light lock opener 126 and a spool rotator 128. The active light lock opener 126 pivots to open the active light lock of a suitable film cartridge 24, such as an Advanced Photo System™ (APS™) cartridge 24, prior to placement of the cartridge 24 in the take-up chamber 14. This allows the camera frame assembly 10 to include a detent (not shown) which retains the active light lock in the open position prior to cartridge removal for processing. The spool rotator 128 engages the spool 27 of the APS cartridge 24 and rotates the spool 27 to thrust film from the cartridge 24.

Figure 13:
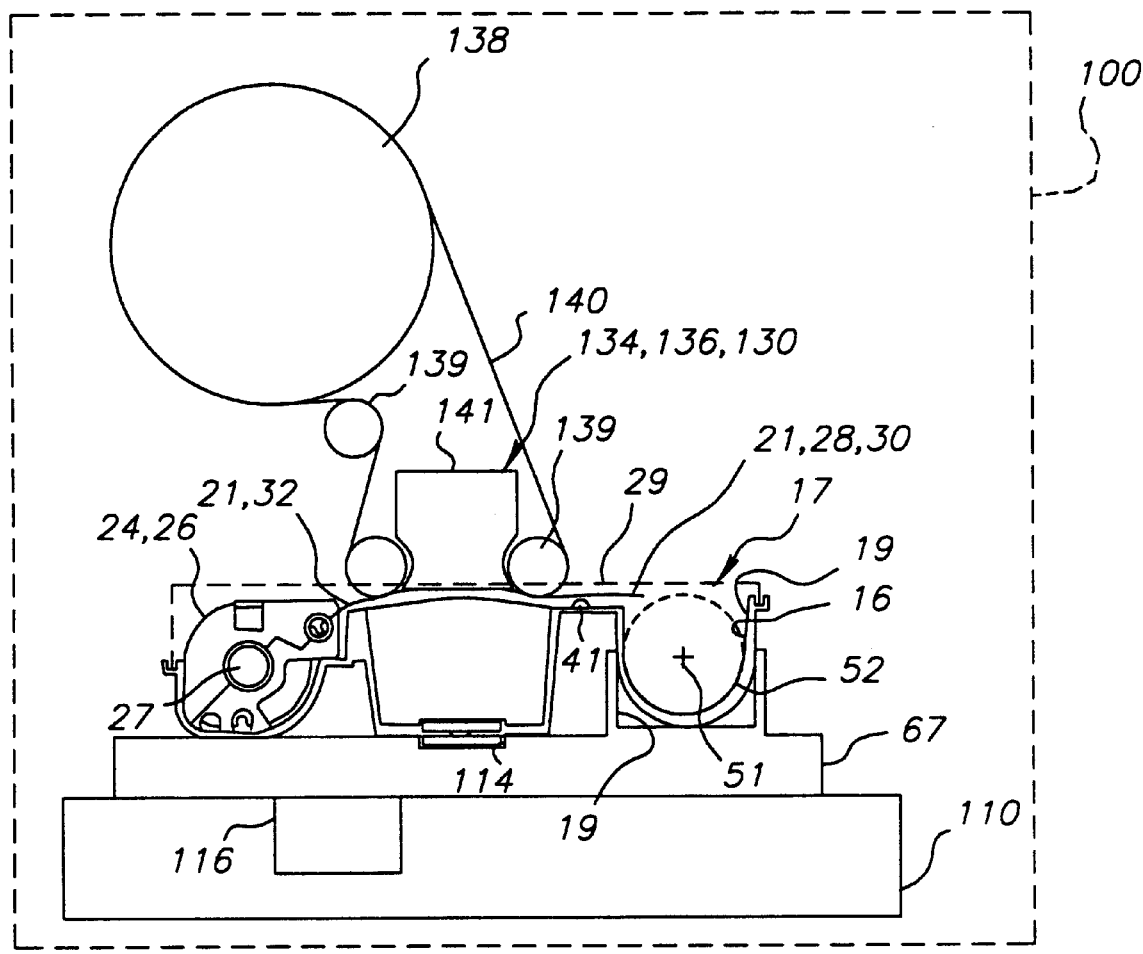
FIG. 13 is a semi-diagrammatical view of an embodiment of a film edge driving film loader, showing a receiver and film bridge. The film winder is not shown. A pallet rests on the receiver. The pallet bears a camera frame assembly (shown in simplified form in cross-section).

Referring now particularly to FIG. 13, the apparatus 100 has a film transporter 130; which, in an active position, propels the filmstrip 21 along a course of film travel 132 to the throat 19 of the film roll chamber 16. The film transporter 130 can use a driven roller, or belt, or other conventional film transport device to move the film along the film course 132. With a thrust-type film cartridge 24, a spool rotator 128, like that previously discussed, can also be utilized.

The film transporter 130 can use a film bridge 134. This is preferred in embodiments in which the camera film drive 43 has a film engagement member 41, such as a conventional sprocket, that continually extends into the intermediate section 18. The film bridge 134 causes the film course or route to be spaced apart from the intermediate section 18 and separates the filmstrip 21 from the engagement member 41 of the camera film drive 43, which thus does not need to be disabled or the like during roll formation. In some other embodiments, the film engagement member 41, is an intermittent toothed sprocket or the like and can be positioned so as to not extend into the intermediate section 18 during film winding. In these embodiments the use of a film bridge 134 is not mandatory, since film winding through the intermediate section 18 will pass freely over the film engagement member 41.

The film bridge 134 can take a variety of forms. The film bridge 134 can include the film transporter 130, or the bridge 134 can be separate from the film transporter 130, or the film transporter 130 can have multiple drive elements with one or more incorporated in the film bridge 134 and one or more separate from the film bridge 134. The figures illustrate some different film transports 88 and film bridges 134.

In FIG. 13, a film bridge 134 in the form of an endless-belt mechanism 136 is positioned over the intermediate section 18 of the camera frame assembly 10. The mechanism 136 includes a belt drive 138 and idlers 139 which position and tension the belt 140. The endless belt 140 can be disposed between the filmstrip 21 and the intermediate section 18 of the camera frame assembly 10 or, as shown in FIG. 13 can overlie the filmstrip 21. An endless belt 140 overlying the filmstrip 21 can have holes (not shown) and include a vacuum-compressed gas unit 141 which provides a vacuum to pull the filmstrip 21 against the belt 140 for transport, and directs compressed gas against the filmstrip 21, or uses gravity to release the filmstrip 21 from the belt 140. The film drive 43 can include a separate capstan 142, shown in FIG. 18, adjoining the film roll chamber 16, supplementing or replacing the belt drive 140. The capstan 142 adjoins the film roll chamber 16 and defines a nip 143 between first and second capstan rollers (not shown) or between a single roller and the intermediate section 18 of the camera frame 12. Capstan rollers can be centrally relieved or divided into two sub-rollers (not shown) in order to contact only the edges of the filmstrip 21.

Figure 14:
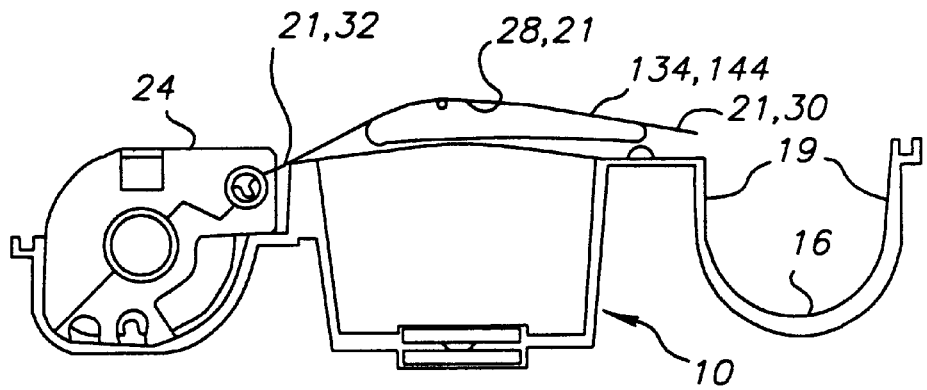
FIG. 14 is a simplified semi-diagrammatical view of another a film edge driving film loader, in which the film transport is a turtleback. The film winder and other feature of the apparatus are not shown. The camera frame assembly is shown in simplified form in cross-section.

A similar embodiment is shown in FIG. 14, but in this case the endless belt mechanism is replaced by a turtleback 144. It is preferred that the turtleback 144 present minimal friction to the filmstrip 21. The turtleback 144 can provide one or more friction reducing features (not shown); such as holes and a pressurized gas connection to create an air cushion, or rotary bearings. Another example of a suitable film bridge is a vacuum shuttle, such as that disclosed in U.S. Pat. No. 5,125,630.

The film bridge 134 can be permanently positioned relative to the receiver 110 or an actuation mechanism 120 can be provided for moving the film bridge 134 relative to the receiver 110, between a use position over the intermediate section site and a rest position spaced apart from the use position. Other components 112 can be repositioned in the same manner between active and rest positions. (FIG. 18 shows active positions in solid lines and rest or inactive positions in dashed lines for a pair of components 112.)

The film transporter 130 can include one or more deflectors (not shown) positioned to direct the filmstrip 21 into the film roll chamber 16. The deflectors are preferably centrally relieved or otherwise configured to eliminate or minimize contact with the image area of the filmstrip 21.

In the film edge driving film loader 100, a film cartridge 24 is first gripped and placed in the take-up chamber 14 of the camera frame assembly 10. The cartridge mover 122 can simply place a film cartridge 24 in the take-up chamber 14 or can pick up a cartridge 24 from a supply (not shown), move the cartridge 24 to the take-up chamber 14, and then continue to grip or otherwise retain the cartridge 24 in position until film winding is completed. This is convenient if the camera frame assembly 10 lacks features to prevent oscillation or other movement of the film cartridge 24 during film winding. An active light lock opener 126 can be pivoted to open the active light lock of a suitable film cartridge 24, such as an Advanced Photo System™ (APS™) cartridge 24, prior to placement of the cartridge 24 in the take-up chamber 14. This allows the camera frame assembly 10 to include a detent (not shown) which retains the active light lock in the open position during film use.

The filmstrip 21 is advanced by the film transporter 130 from the cartridge 24 along the film course, and the free end 30 of the filmstrip 21 enters the film roll chamber 16. (For clarity, the film transporter 130 is diagrammatically illustrated in some figures as a single capstan roller.) The manner in which the film transporter 130 propels the filmstrip 21 varies with the film type and the characteristics of the camera frame assembly 10. With a thrust type film cartridge 24, such as an APS cartridge 24, the spool rotator 128 engages the spool 27 of the cartridge 24 and rotates the spool 27 to thrust the filmstrip 21 from the cartridge 24. The film transporter 130 can be limited to the spool rotator or can include another mechanism, such as a capstan, that takes over for or operates with the spool rotator 128. Depending upon the film drive 43 of the camera frame assembly 10, as discussed above, a film bridge 134 can be positioned over the intermediate section 18 of the frame 12. Friction reduction can be provided. For example, air can be blown through holes in the vacuum/air belt 98 of a film bridge 134 to provide an air cushion.

At this time, or earlier, a film winder 101 is moved, in a direction generally perpendicular to the film space axis 51, from an inactive position to an active position within the film roll chamber 16. The film winder 101 has a pair of opposed arms 146. A rim-unit 148 is rotatably mounted to each arm 146. Each rim-unit 148 has a drive portion 150 that is adapted for rotation by a rim driver 152. United to and continuous with the drive portion 150 is a rim or rim portion 102. The rim-units 148 are positioned such that the rims 102 rotate about a common rim axis 153.

The rim-units 148 are each mounted to the respective arms 146 such that the rims 102 face each other and extend inward and the drive portions 150 are to the outside. The rims 102 each extend axially inward to a distance substantially equal to or less than the non-image margin of the filmstrip 21. In APS™ and Type 135 (35 mm.) films, one or both opposed non-image margins of the film are perforated and include optical or magnetic information regions. It is therefore currently preferred that the rims 102 not extend inward so far as to contact the optical and magnetic information regions or the image area. In a particular embodiment, the rims 102 each extend radially inward from the respective drive portions 150 to an axial distance of about 30 thousandths of an inch.

Each rim portion 102 includes a cinching feature 154 for gripping the leading portion 28 of the filmstrip 21. The cinching feature 154 can be a conventional film attachment structure adapted to the size of the rims 102, such as, miniature hooks or other fasteners matched to holes or other appropriate structures in the film.

A currently preferred cinching feature 154 is shown in FIGS. 4–8 and 11–12. The rims 102 each include a complete inner ring 156 and a partial outer ring 158 circumscribing and located radially outward from the inner ring 156. It is preferred that the axial dimension of both rings 156,158, on each rim 102, is the same and that the inner and outer rings 158, respectively, have an outer surface having the shape of a complete or interrupted circular cylinder. The interruption 157 in the outer ring 158 and corresponding uncircumscribed portion 159 of the inner ring 156, extend over an angle of from about 15 to about 45 degrees or, preferably, over an angle of about 30 degrees. The rings 156,158 are separated by a gallery 160 which receives the leading portion 28 of the filmstrip 21. The interruption 157 in the outer ring 158 and uncircumscribed portion 159 of the inner ring 156 define an leader entry 161 to the gallery 160. The gallery 160 has a size insufficient to receive more than two turns of filmstrip 21, or preferably more than a single turn of filmstrip 21. The gallery 160 can be tapered inward from an entrance end 162 adjoining the leader entry 161 or can have a uniform dimension radial to the film space axis 51. The gallery 160 can be blind or effectively blind, or can be opened ended. During cinching, the leading portion 28 of the filmstrip 21 is guided into and curled around the gallery 160. It is preferred that the rims 102 are stopped while this occurs. The leading portion 28 of the film can become cinched, that is, caught, in various different ways. For example, the film can be wedged in a tapered gallery 160. The film can be overlapped at the uncircumscribed portion 159. In the embodiment shown in the figures, cumulative friction in the 300 degree gallery is sufficient, by itself, to provide cinching before the leading portion 28 completes a circuit of the gallery 160. Cinching can be provided by the provision of a gallery 160 in only one of the two rims 102, but this is undesirable since the resulting film roll is likely to have a greater risk of being distorted.

Figure 4:
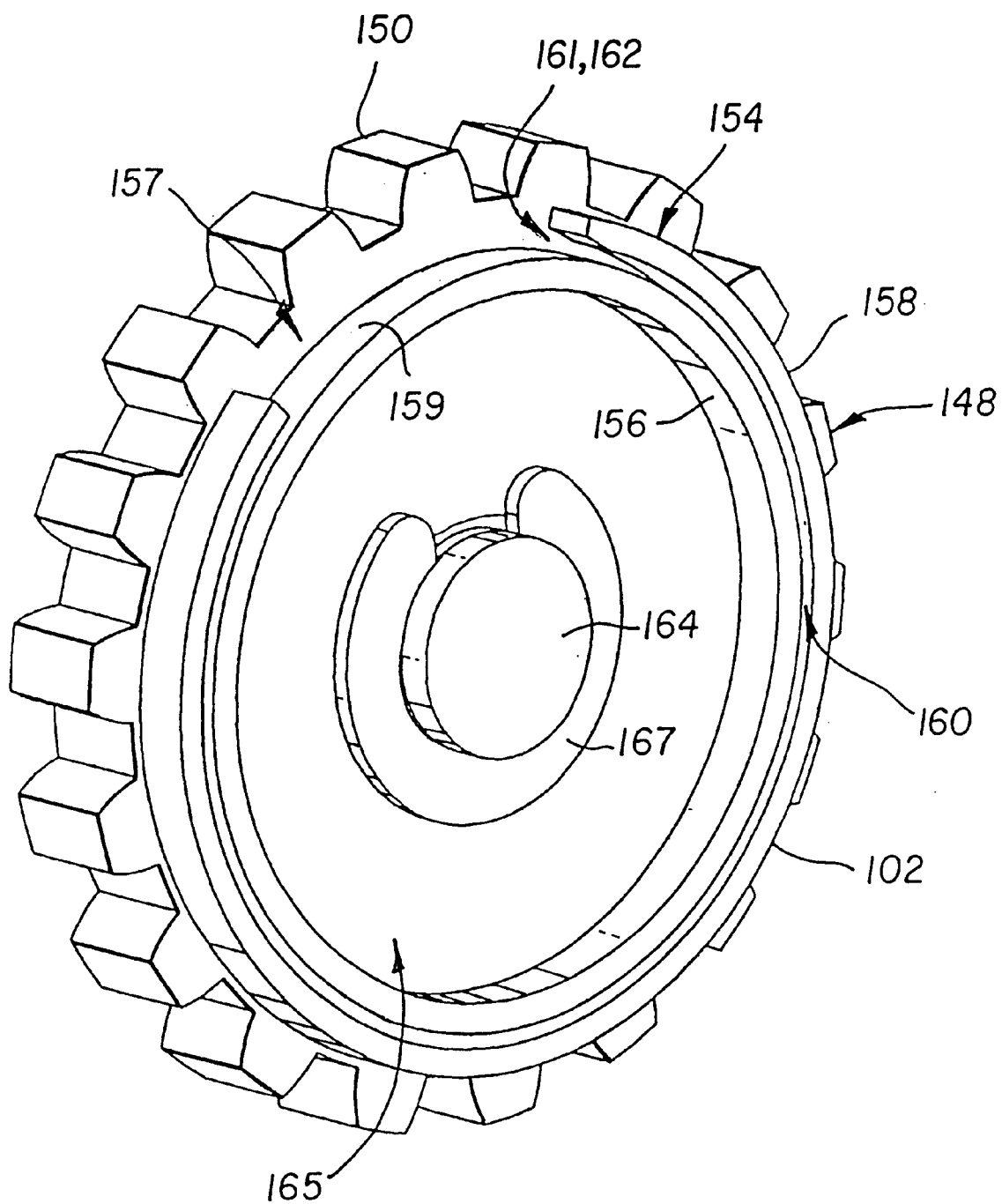
FIG. 4 is a perspective view of a gear-type rim-unit of the apparatus of FIG. 2. Also shown are a clasp and the hub of the respective arm of the film loader.
Figure 5:
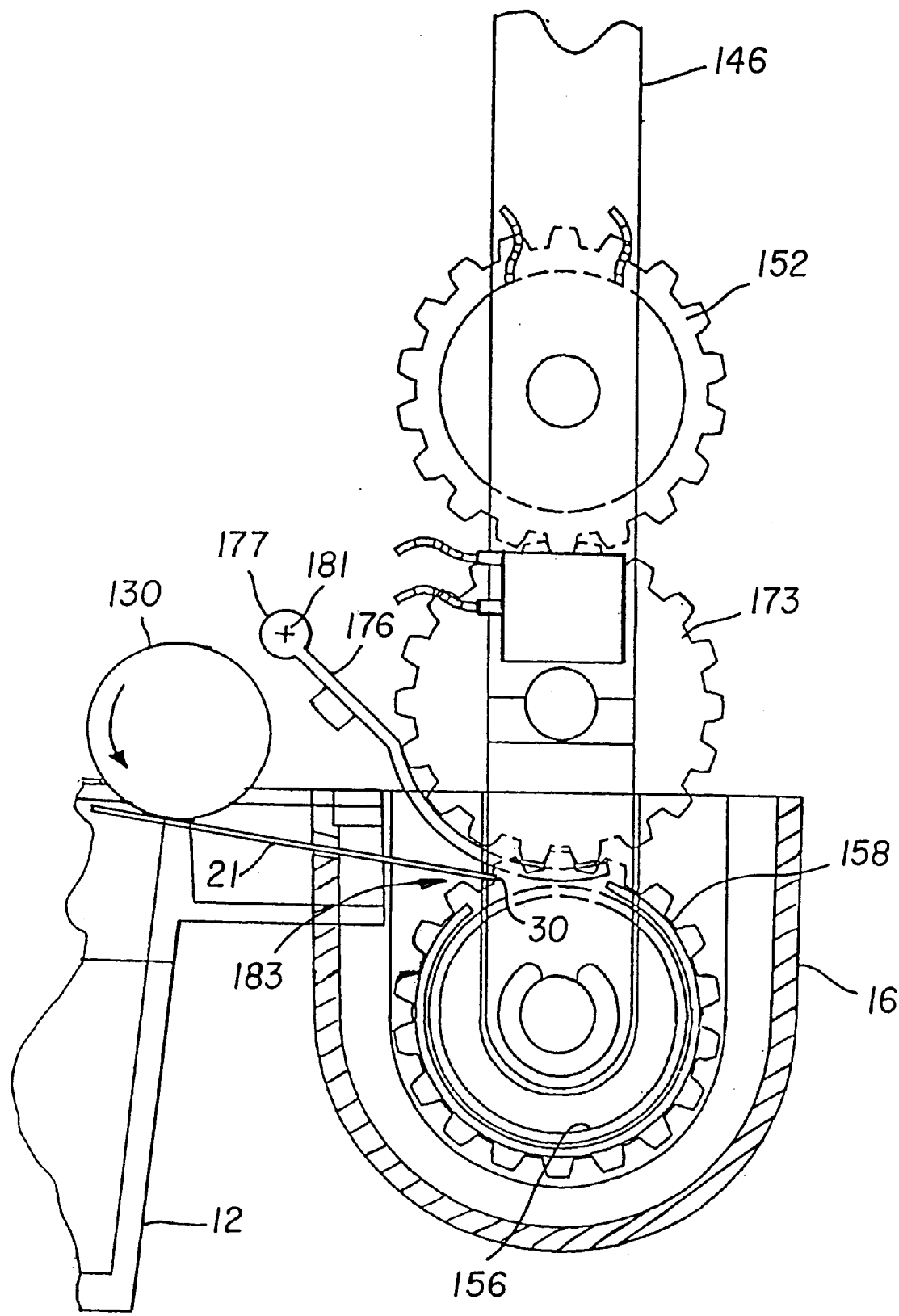
FIG. 5 is a cross-sectional side view of the apparatus and camera frame assembly, as shown in FIG. 2, taken substantially along line B—B of FIG. 2. The apparatus is shown at the start of cinching when the rims are in a static cinching configuration and the film guide is biased against the rims. Also shown are the leading portion of a filmstrip and a capstan of the film transport.
Figure 6:
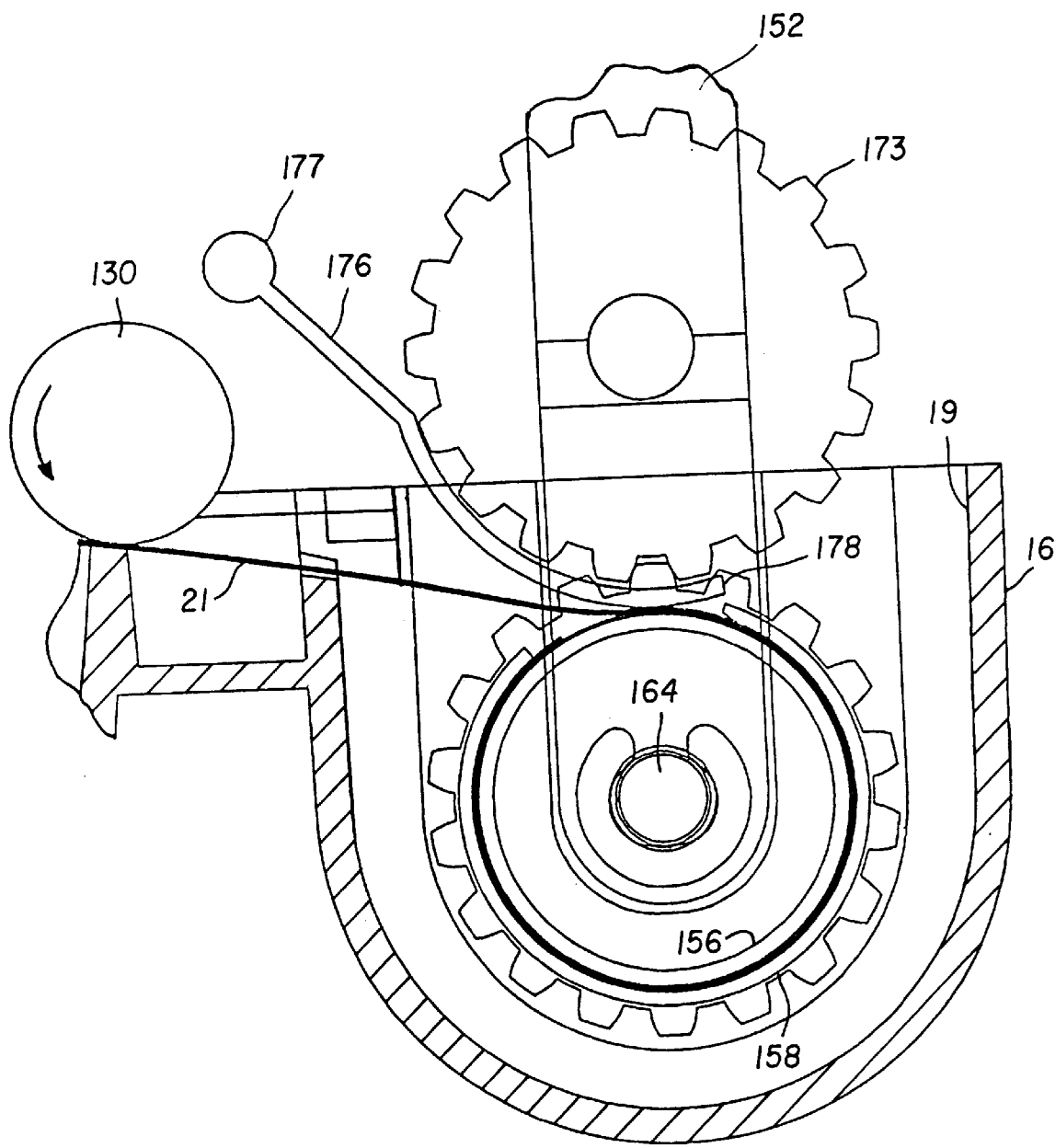
FIG. 6 is a partial enlargement of the same view as FIG. 5, but the apparatus is shown at the end of cinching.
Figure 7:
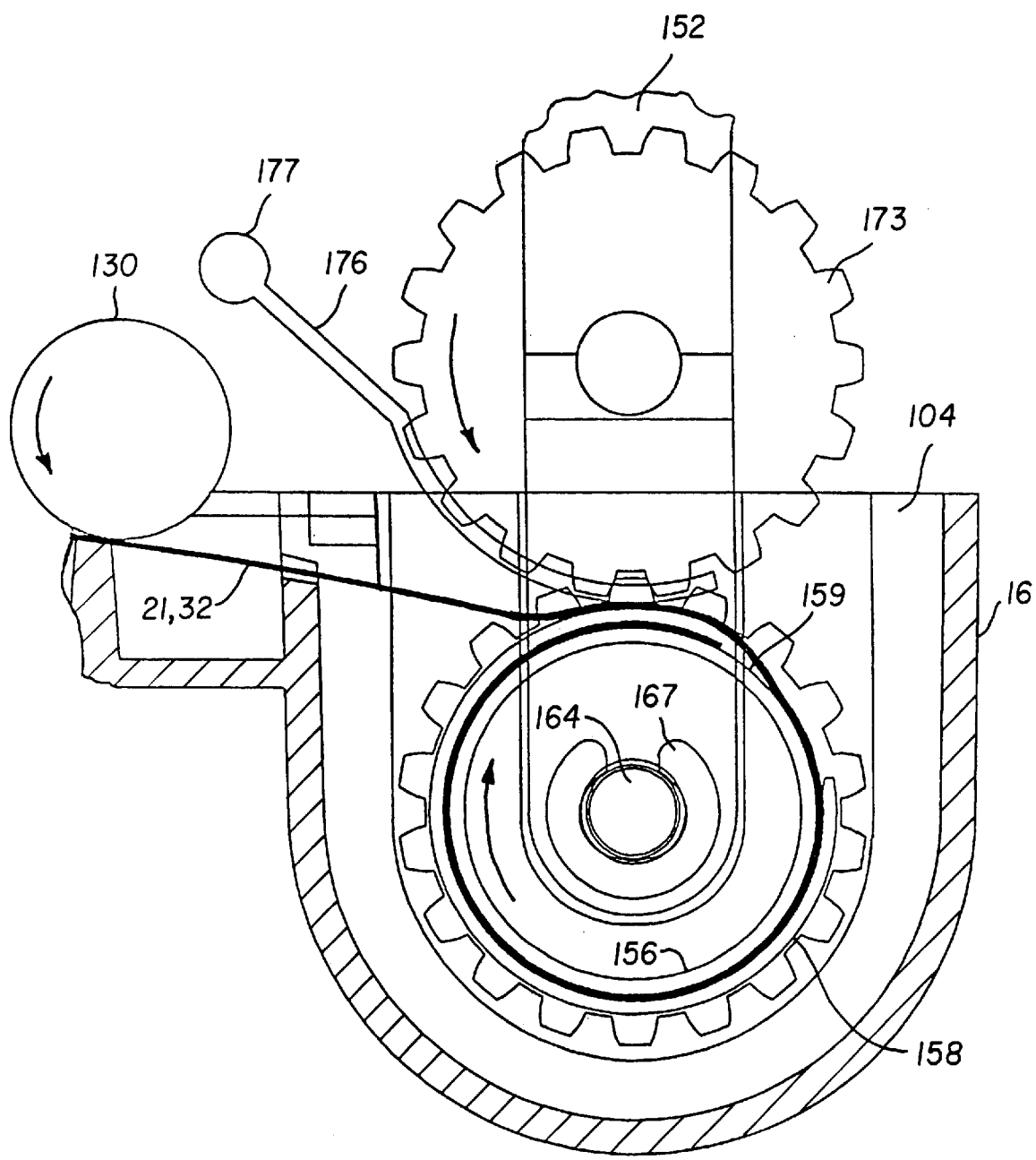
FIG. 7 is a partial enlargement of the same view as FIG. 5, but the apparatus is shown during initial winding onto the outer rings of the rims. The direction of rotation of the rims is indicated by an arrow. The film guide is shown in an optional position for continued biasing.
Figure 8:
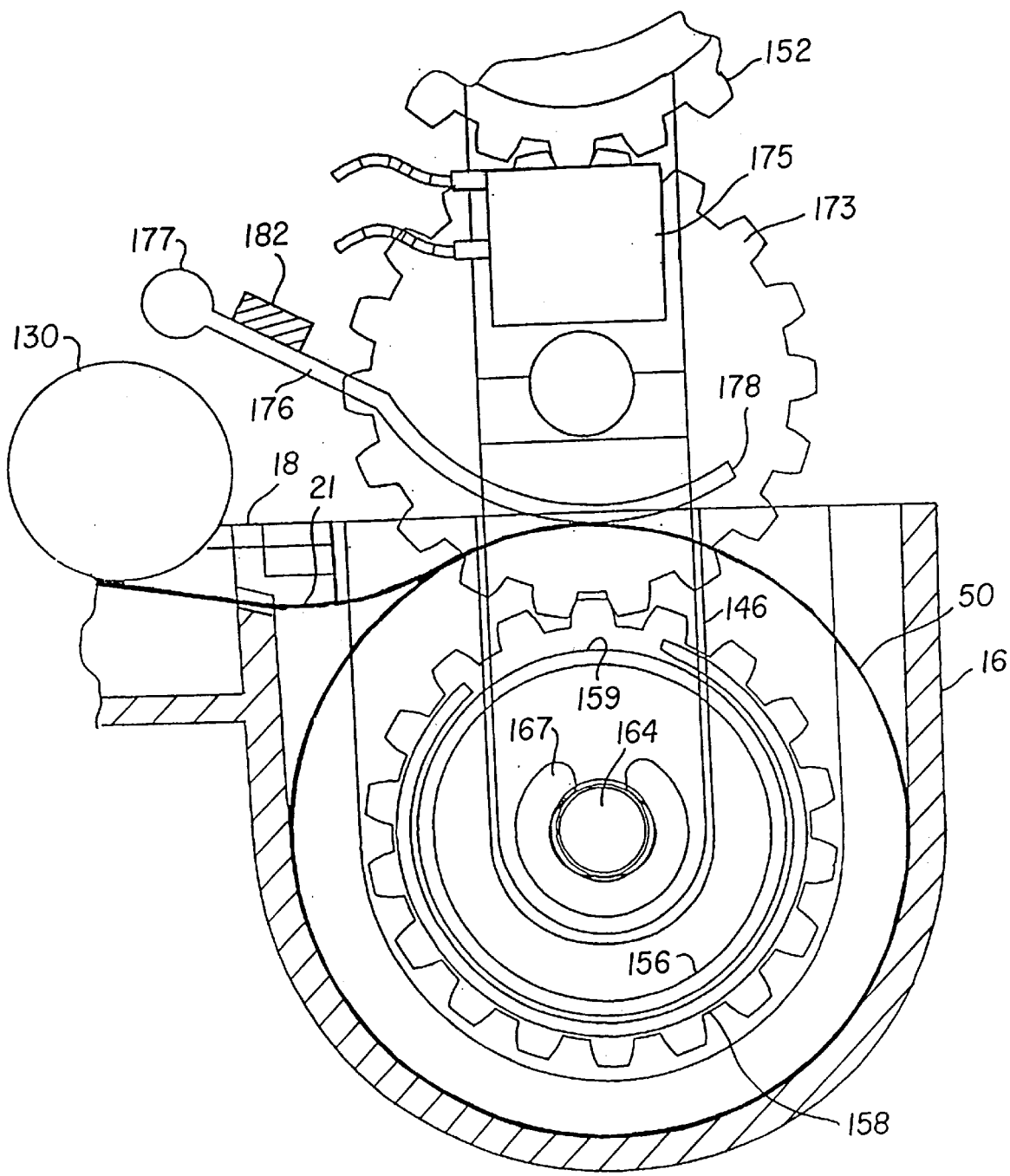
FIG. 8 is a partial enlargement of the same view as FIG. 5, but the apparatus is shown after the completion of film winding and withdrawal of the rims from the film space.

The drive portion 150 of the rim-unit 148 is configured so as to join the rim-unit 148 to the arm 146 and to operate with the rim driver 152. Detailed features of the drive portion 150 can vary, but it is preferred that the drive portion 150 not extend axially inward beyond the rim 102. This prevents possible contact with the filmstrip 21 during winding and prevents any possibility of the leading portion 28 of the filmstrip 21 misaligning and cinching onto the drive portion 150 rather than the rim 102. In the embodiment shown in FIGS. 2–10, the drive portion 150 is a gear. The inside face of the respective arm 46 includes a fixed hub 164. An end of the hub 164 extends through the drive portion 150 into a hollow 165 formed by the interior margin 166 of the rim 102. The rim-unit 148 can be held in place by a simple fastener or the like. For example, FIG. 4 shows a clasp 167 that is fixed to the hub 164 and overlaps a hole extending through the drive portion 150.

Figure 11:
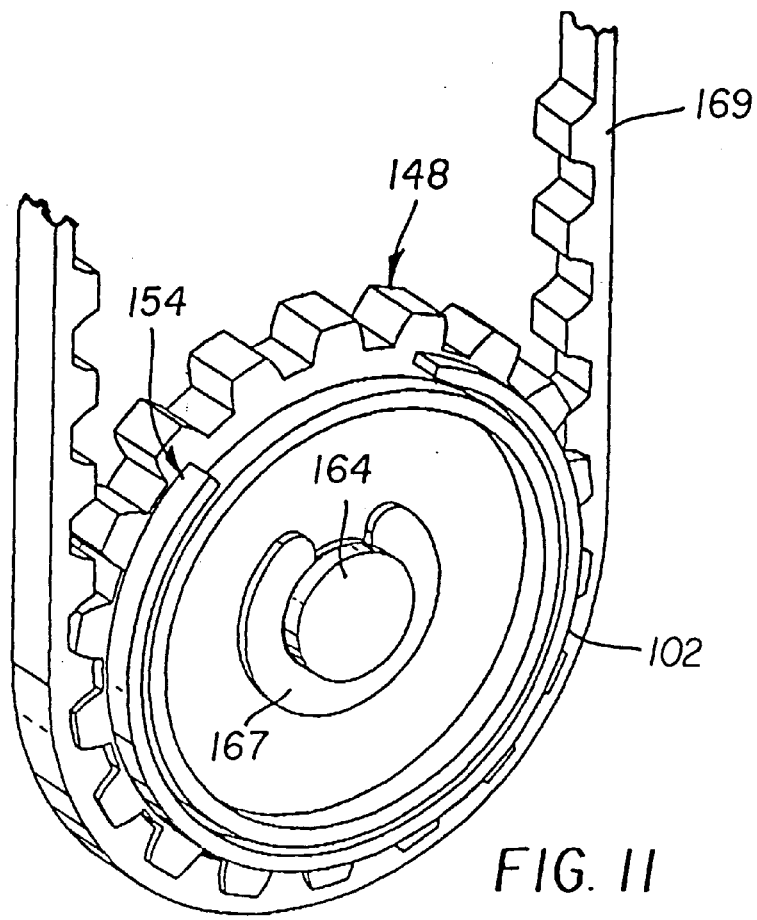
FIG. 11 is a perspective view of a sprocket type rim-unit and drive belt of another embodiment of a film edge driving film loader. Also shown are a clasp and the hub of the respective arm of the winder.
Figure 12:
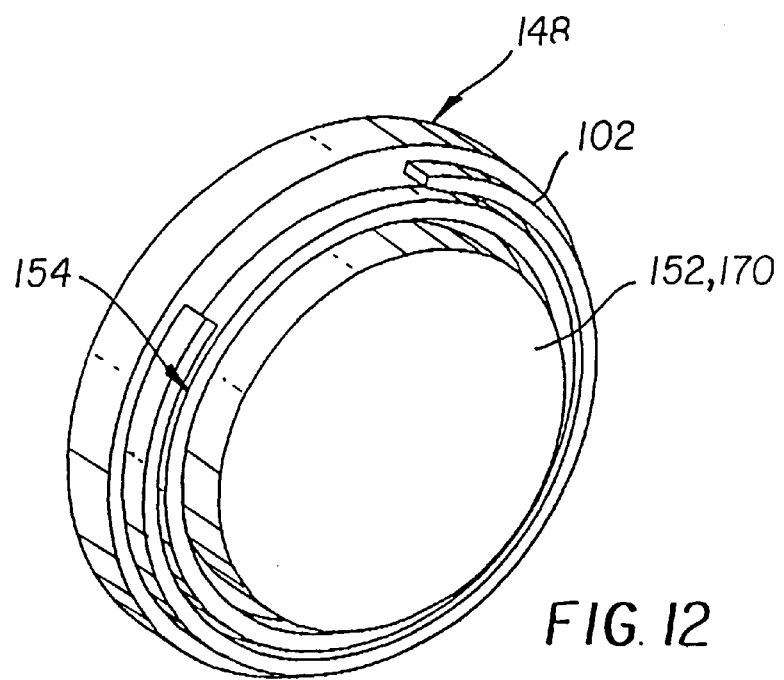
FIG. 12 is a perspective view of a pulley type rim-unit of still another embodiment of a film edge driving film loader. Also shown is a pancake motor of the respective arm of the winder.

Referring to FIGS. 2–10, a gear train 168 mechanically couples the drive portions 150 of both rim-units 148 to a rim driver 152 mounted to one of the arms 146. FIG. 11 discloses an alternative embodiment, in which the gear train 168 is replaced by a toothed belt 169. FIG. 12 discloses still another embodiment, in which the rim driver 152 includes a pancake motor 170 that fits substantially within the hollow formed by the rim 102. The pancake motor 170 is joined to the respective arm 146, and drives the rim-unit 148 by an internal connection (not shown). The drive portion 150 of the rim-unit 148 has the shape of a wheel or pulley and can bear a belt (not shown), which can drive the other rim-unit 148 through belts, or a gear train 168 or the like. Alternatively, both rim-unit 148 can include a pancake motor, with the motors synchronized by a computerized controller (not shown) or the like. The rim-units 148 can be positively driven, as in the embodiments of FIGS. 2–12, or can be driven by a clutched or friction coupling. A positive drive is currently preferred.

If desired, the rim driver 152 can drive only one of the two rim-units 148, while the other unit 148 freely rotates as the film winds. It is preferred that both rim-units 148 be driven and rotate in synchrony, since this reduces the risk that one rim-unit 148 might overrun the other and cause the filmstrip 21 to be canted during winding. Tandem rotation can be provided by separately driven motors combined with rotational position sensors and synchronization controls. Tandem rotation can also be provided by mechanically coupling the two rim-units in fixed rotational relation. In the embodiment shown in FIGS. 2–10, the mechanical coupling 172 is provided by a pair of intermediate gears 173 that are each fixed to a common shaft 174.

When the winder 101 is interposed in its active position in the film roll chamber 16, the lower ends of the arms 146 and the drive portions 150 of the rim-units 148 are interposed in respective accessways 56. The rims 102, in the active position, protrude into the axial ends of the film space 52 and the gallery 160 defines the inner circumference of the film space 52. The overall shape of the film space 52 is that of a hollow cylinder. In the embodiments shown in the figures, in the active position, the rim axis 153 of the winder is substantially collinear with the film space axis 51. The arms 146 and attached rim-units 148 are movable, within the film roll chamber 16, away from each other along the rim axis 153 from the active position to an offset position. In the offset position, the rims 102 are fully disposed within respective accessways 56 and are spaced apart from the film space 52.

In the active position, the leader entry 161 faces the rear opening 29 of the frame 12. The rim-units 148 are appropriately rotated before or after the winder 101 is interposed in the film roll chamber 16. The relative rotational position of the rims 102 can be determined by any conventional means. For example, as in the embodiment shown in the figures, a mechanical or optical or magnetic alignment sensor 175 can be mounted in fixed relation to the arms 146 to detect an alignment feature on one of the rim-units 148 or part of the rim driver 152.

The winder 101 can include a film guide 176 that is extended into the film roll chamber 16 prior to or at the time the filmstrip 21 is initially transported to the film roll chamber 16. The guide 176 has a mounted end 177 that is attached to a support (not shown) and a free end 178 that is interposed in the film roll chamber 16. For convenience, the following discussion will be directed primarily to the embodiments illustrated in which the film guide 176 is pivotable about a axis 181 (marked by "+" in FIG. 5) that is maintained in a fixed position relative to the rims 102. It will be understood, however, that the film guide 176 can vary. For example, the support for the film guide can be fixed to the arms 146 (not shown) or can be separate and can provide for rotational or translational motion of the film guide 176 or both (not shown).

The free end 178 of the film guide 176 has a pair of opposed contact areas 179 which overlap the respective rims 102 when the winder 101 is in the active position. In the embodiment shown in the figures, the free end 178 is aligned with the uncircumscribed portions 159 of the rims 102 when the winder 101 is in the active position. The film guide 176, preferably, only touches the film with the contact areas 179. Portions of the free end 178 between the contact areas 179 can be inset or cut-away. The free end 178 is preferably convexly curved, relative to the rims 102, to further minimize contact with the filmstrip 21 and to help deflect the free end 30 of the film into the gallery 160 for cinching. The filmstrip 21 can be deflected by the film guide 176 toward the rims 102 during film winding, but this is undesirable since the large area of frictional contact would present a risk film scuffing or distortion due to uneven film motion. It is desirable that the film course from the intermediate section 18 into the film roll chamber 16 follow a gentle, continuous curve, avoiding most of the film guide 176 and proceeding directly into the gallery 160. In the camera frame assembly 10 shown in FIGS. 2–3 and 5–10, the inner edge of the sidewall 48 is inset from the rear opening 29 to help provide such a gentle, continuously curved film path.

The mounted end 177 of the film guide 176 is pivotable about a pivot axis 181 which is exterior to the film roll chamber 16 and overlies the intermediate section 18 of the frame 12. The film guide 176 is pivotable from an initial position, shown in FIG. 5 to a final position, shown in FIG. 8. Further rotation of the film guide 176 beyond the initial position is limited by a stop 182 (shown diagrammatically in FIG. 8). Thus in the initial position, the film guide 176 is spaced apart from the rims 102 and, with the inner ring 156 of the rim, defines a film passage 183 through which the leading portion 28 of the filmstrip 21 is directed into the gallery 160.

As the rims 102 are rotated during film winding and the filmstrip 21 is wound onto the rims 102, the film guide 176 pivots outward from the rims 102. The film guide 176 continues to direct the filmstrip 21 toward the rims 102. The film guide 176 can be moved away from the film roll 50 in coordination with film transport to maintain a spacing from the growing film roll 50. It is currently preferred, however, that the film guide 176 rest on the growing film roll 50 and provide a biasing force radially toward the rims 102. The biasing force can be provided by the action of gravity on the guide 176 or by a spring (not shown) or the like. A sensor can be included in or associated with the stop 182 positioned to contact the film guide 176 at the completion of winding to provide a signal controlling film transport or other functions.

Film transport is continued until the main portion 32 of the filmstrip 21 has been wound onto the forming film roll 50. The trailing portion 34 of the filmstrip 21 remains connected to the spool 27 in the film cartridge 24 and after winding extends across the intermediate portion 22 to the final film roll 50. Film transport is stopped before an excessive strain is placed on the trailing portion 34. This may be done in a variety of ways in addition to the one already discussed. For example, a sensor (not shown) can detect an increased load due to reaching the trailing portion 34; or count rotation of the film spool 27 or another rotating part; or track the length or area of filmstrip 21 traveling to the film roll; or film can be wound for a predetermined time. In any case, a slip clutch (not shown) can be provided in the apparatus 100 to accommodate excessive strain.

When film transport has been completed, rotation of the rims 102 is stopped and the arms 146 and attached rim-units 148 are axially withdrawn, within the film roll chamber 16, away from each other along the rim axis 153 from the active position to the offset position. This movement releases the leading portion 28 of the filmstrip 21 from the gallery 160 and withdraws the rims 102 from the margins of the film roll. As the rims 102 are withdrawn, axial movement of the film roll 50 is intercepted, on either end by the film roll restraints 104. The released film roll 50 is free to clockspring outward, within the limits imposed by the film roll chamber 16, the guard 54, and any biasing by the film guide 176. The winder 101 is next moved out of the film roll chamber 16 to an inactive position. The film guide 176 can be withdrawn with the winder 101 or independently, before or after the winder is withdrawn. The film roll 50 will fully clockspring to a final position after both winder 100 and film guide 176 have been withdrawn. The extent of clockspringing can be designed to be very small, since the film roll can be wound to almost the limits of the film space 52. Withdrawal of the rims 102 from the film roll 50 can cause localized scuffing or pressure fogging of the film; however, this scuffing is outside the image area and, preferably, outside both the image area and the information areas of the film. Thus any scuffing or pressure fogging cause by the rims 102 is of little or no consequence. Since this is the case, it is unnecessary to rotate the film roll in a reverse direction to help loosen the film roll from the rims 102 prior to withdrawal of the rims 102. This simplifies film transport, since only forward transport and rotation of the rims 102 is required and reduces the risk of scuffing between layers of the film roll when wound in the reverse direction.

After film winding, the apparatus components 112 such as the film transporter 130, can be moved to a non-use position, relative to the camera frame assembly 10, which is then moved along for further processing. In embodiments having a film bridge 134, the camera frame assembly 10 is first displaced relative to the film bridge 134, and slack in the filmstrip 21 is taken up by retracting that filmstrip 21 portion back into the cartridge 24 or driving that filmstrip 21 portion forward with a capstan or the like.

Figure 17:
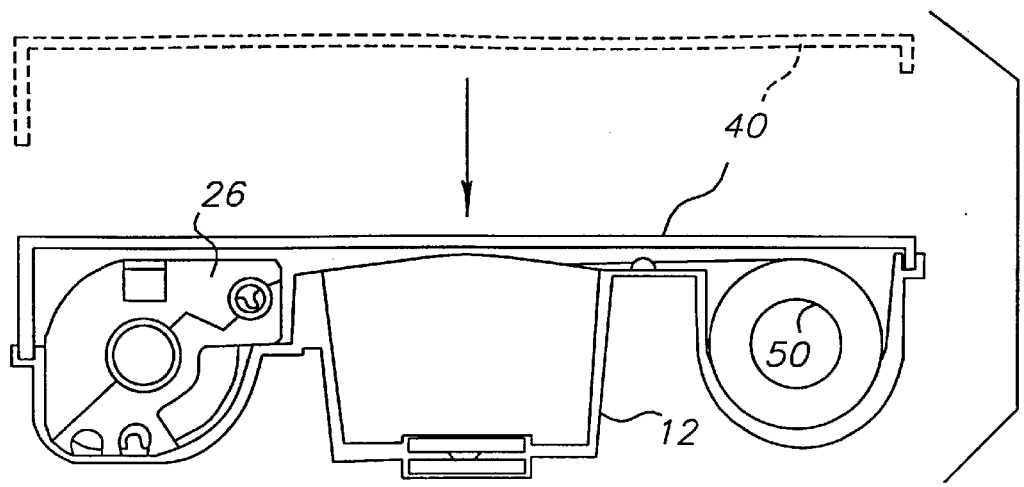
FIG. 17 is the same view of the camera frame assembly as shown in FIG. 13, but showing installation of the back cover. The back cover is shown in dashed lines prior to installation and in solid lines after installation.

After the film transporter 130 is moved away from the camera frame assembly 10, the rear opening 28 of the camera frame assembly 10 is light-tightly closed. Referring now to FIG. 17, in a particular embodiment, this is accomplished by placing (indicated by arrow 125) a light-tight back cover 40 over the chambers 14,16 and intermediate section 18 and a front cover 42 over the camera frame assembly 10. The resulting camera assembly can be a completed camera or can be completed in other assembly operations. In addition to the features already discussed, including a film cartridge and film roll, the camera can also include other conventional camera features well known to those of skill in the art.

Referring now primarily to FIGS. 19–41, another film loading apparatus 200 is shown. This apparatus 200 utilizes a film loading method which differs from the previous method in that a filmstrip 21 is propelled into a curling zone 202, where the film is curled against one or more pair of opposed contact surfaces 205,206 into a film roll 50. The curling zone 202 is cylindrical and has a central curling axis 208 that is parallel to the film space axis 51. During curling of the filmstrip 21, each pair of contact surfaces 205,206 continuously constrain the growing film roll 50, while rotating about a pivot axis 210 that is transverse to both the film space axis 51 and the curling axis 208. The members of each pair of contact surfaces 205,206 preferably maintain a constant separation during film loading. A variety of physical structures can be used to provide the required contact surfaces 205,206, but the simplest practical approach is the use of one or more rotating hooks 212. The apparatus 200 and method are useful with both guarded and unguarded camera frame assemblies 10. A suitable frame assembly 10 having a guarded film roll chamber 16 is shown in FIG. 26.

The hook or hooks 212 are interposed into the film roll chamber 16 for film loading. A pair of hooks 212 positioned in the film roll chamber 16 so as to divide the film space 52 roughly into thirds is highly preferred, since with a single hook 212 or a pair of closely spaced hooks 212, film roll misalignment is problematic. More than two hooks 212 could be used, but hooks 212 in excess of two add much complexity with little or no benefit. For convenience, the following description will refer to an embodiment of the apparatus 200 having a pair of hooks 212 unless specifically indicated otherwise.

The hooks 212 are rotated during film loading from an initial position to a final position, and then, following film loading, arc traversed into withdrawal positions in accessways 56b in the camera frame assembly 10 for removal.

The camera frame assembly 10 for this method has some differences from the camera frame assembly 10 used in the method previously described. Referring to FIGS. 23–27, the film roll chamber 16 has opposed ends 44 (shown in FIG. 26) and a sidewall 48 that extends between the ends 44. As in the other camera frame assemblies described herein, the shape of the sidewall 48 is not critical, as long as the film roll 50 can be accommodated without gross deformation and any film contact with the sidewall 48 during camera usage does not cause excessive scuffing. The film roll chamber 16 defines a film space 52 that has the same magnitude and is aligned with the width dimension of the intermediate section 18. The film roll chamber 16 lacks a film spool or other axial film support, thus the film space 52 is empty before loading and, after loading, only contains the film roll 50.

Referring now to FIGS. 19–41 generally, the sidewall 48 has a middle portion 218 aligned with the intermediate section 18 and the film space 52. The sidewall 48 also has an adjunct portion 220 (most easily seen in FIG. 26) at each end that protrudes beyond the film space 52. An end wall 46 is joined to each adjunct portion 220. Each end wall 46 preferably closes the respective end 44 of the film roll chamber 16, but one or both end walls 46 can be partially or fully cut away. Each adjunct portion 220 and respective end wall 46 defines an accessway 56b contiguous with a respective axial end of the film space 52. It is preferred that the end walls 46 be fully closed and that access to the film space 52 be limited to the film slot 61 and the accessways 56b. The end walls 46 can be configured to give the accessways 56b a complex shape; but, to minimize wasted space in the accessways 56b, it is currently preferred that the accessways 56b each have the same cross-sectional shape, in a direction perpendicular to the film space axis 51, as the middle portion 218. The axial dimension of each accessway 56b is a small fraction of the axial dimension of the film space 52 and is preferably about 2–3 mm.

The camera frame assembly 10 loaded by this method preferably includes a guard 54. The gate portion 58 of the guard 54 is inset from both end walls 46 and, as in the other embodiments, the gate portion faces or adjoins the intermediate section. The stem portion 60 is joined to the sidewall 48, preferably as part of a unitary plastic casting or as a result of sonic welding, solvent welding, or adhesion. The gate portion 58 can be cantilevered by the stem portion 60 or can be additionally supported by one frame a flanges (not shown) extending to the frame assembly outside the film path. The gate portion 58 can be conveniently supported by providing an extension 64 on the guard 54 like those previously discussed.

The guard 54 has a stem portion 60 which is joined to the outer edge of the sidewall 48 and is configured so as to not interfere with the hook or hooks 212 of the loading apparatus 200. The width of the stem portion 60, in a direction parallel to the width dimension of the intermediate section 18, can vary up to about one-half the axial length of the film space 52; but it is preferred that the width of the stem portion 60 be less than about one-quarter of the axial length of the film space 52. Similarly, the stem portion 60 can be centered between the end walls 46 or can be axially offset. If a pair of hooks 212 are used it is preferred that the stem portion 60 is centered. A convenient stem portion 60, for use with two hooks 212, has an axial dimension less than about a third of the axial length of the film space 52, and is centered along the film space axis 5 1. With a single hook 212 or pair of closely spaced hooks 212, the guard 54 can be offset to an end of the film roll chamber 16.

The stem portion 60 has a pair of lateral margins 62 that extend sideways to the gate portion 58. The lateral margins 62 and film roll chamber 16 together define at least one accessway 56b communicating with the film space 52. The end walls 46 can be configured to give the accessways 56b a complex shape; but, to minimize wasted space in the accessways 56b, it is currently preferred that the accessways 56b each have the same cross-sectional shape, in a direction perpendicular to the film space axis 51, as the film space 52. The axial dimension of each accessway 56b is a small fraction of the axial dimension of the film space 52 and is preferably about 2–3 mm.

Figure 27:
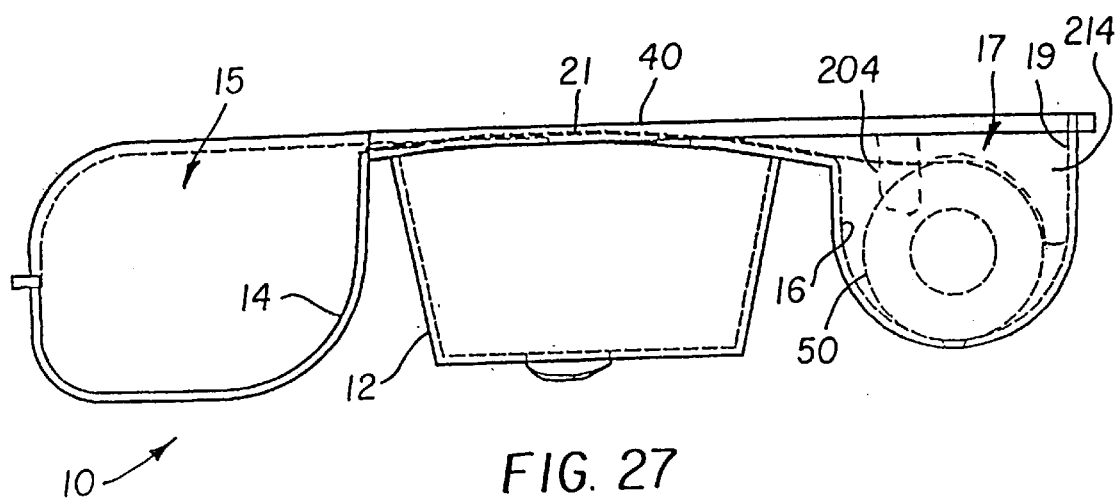
FIG. 27 is a semi-diagrammatical side cross-sectional view of the camera frame assembly of FIG. 26.

The guard 54 in FIGS. 26–27 is roughly T-shaped, with the base of the "T" forming the stem portion 60 of the guard 54. The gate portion 58 of the guard 54 forms the cap of the "T" and extends across the throat 19 of the film roll chamber 16 parallel to the film space axis 51. A similar guard (not shown) for use with a single hook would be roughly L-shaped.

Figure 28:
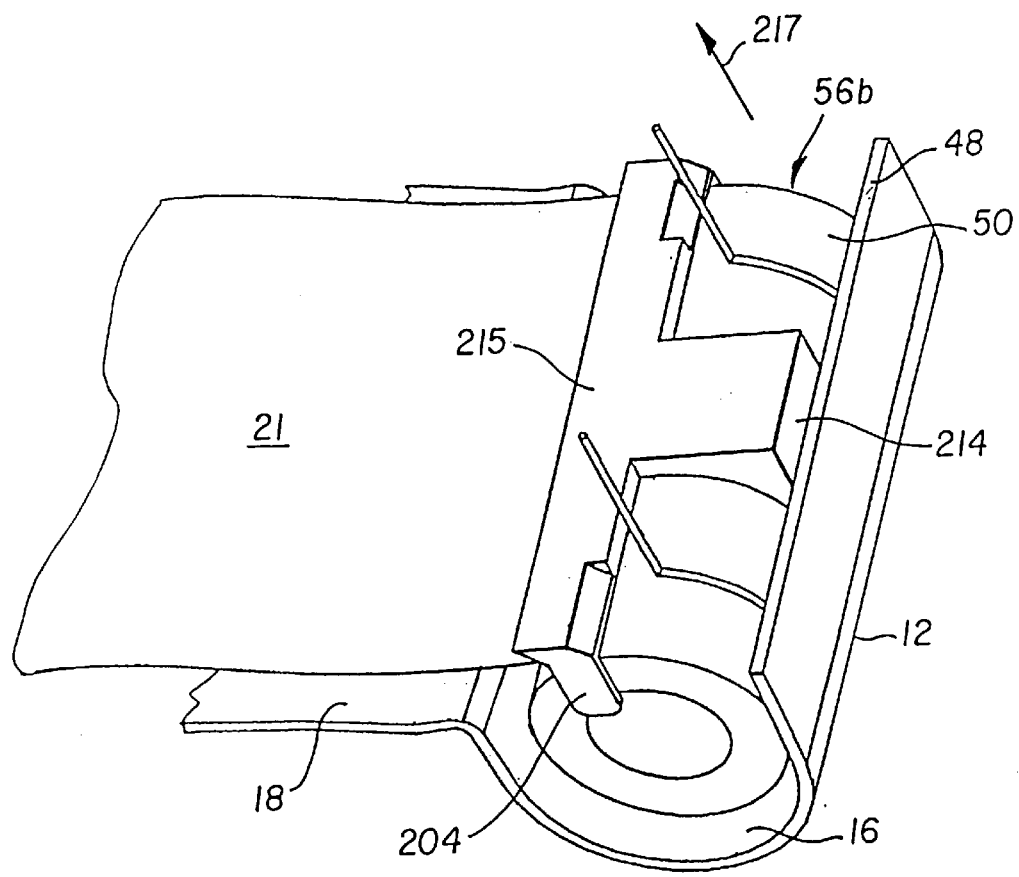
FIG. 28 is a perspective view of another embodiment of the rotating hook film loader. For clarity, only the hooks and guide-restraint unit are shown. Also shown are a portion of a filmstrip and part of the frame of a camera frame assembly. This figure shows the loader after the completion of film winding. The hooks are in the final position.
Figure 29:
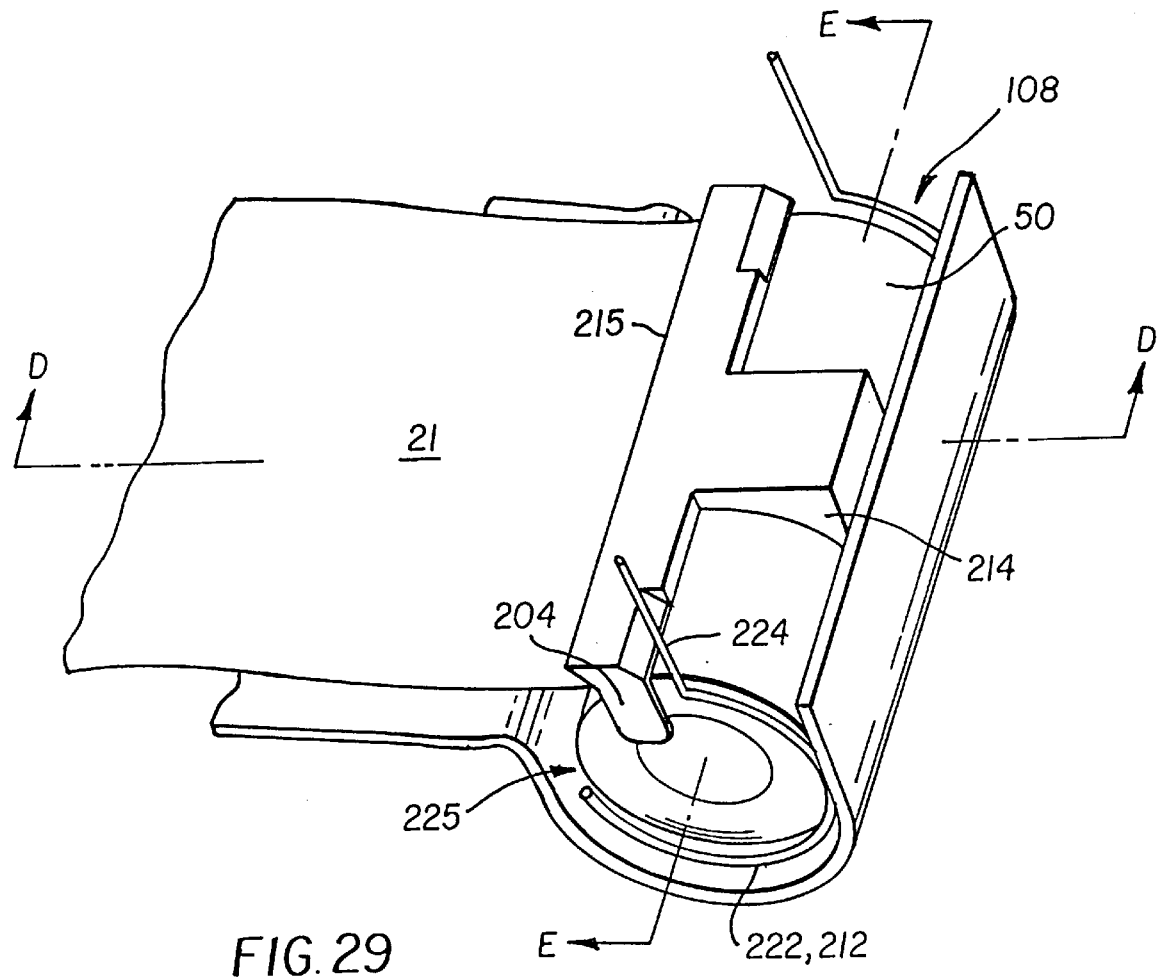
FIG. 29 is the same view as FIG. 28, except that the hooks are shown in the withdrawal position.
Figure 30:
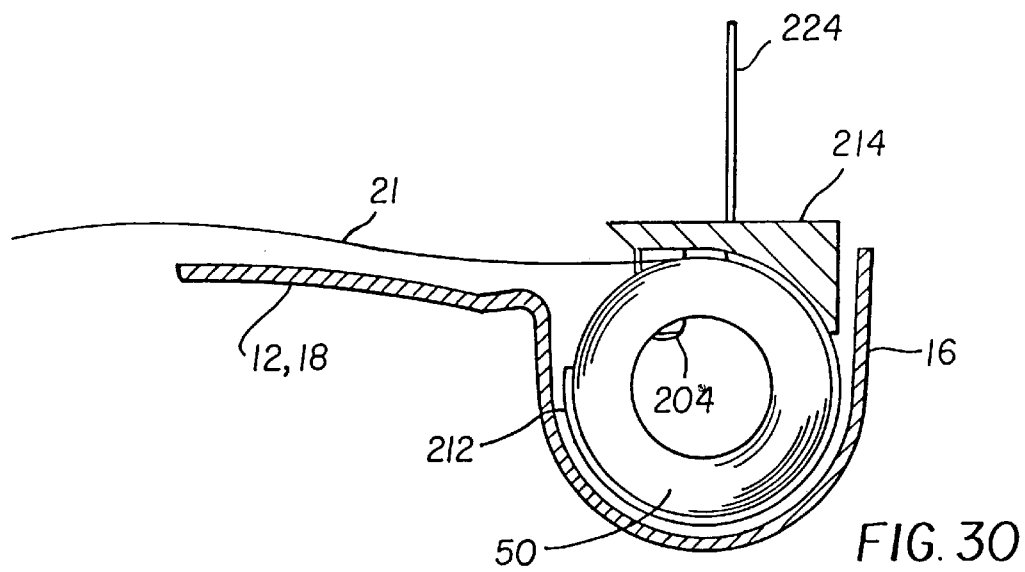
FIG. 30 is a cross-sectional view of the film loader and camera frame assembly of FIG. 29 taken substantially along line D—D of FIG. 29.
Figure 31:
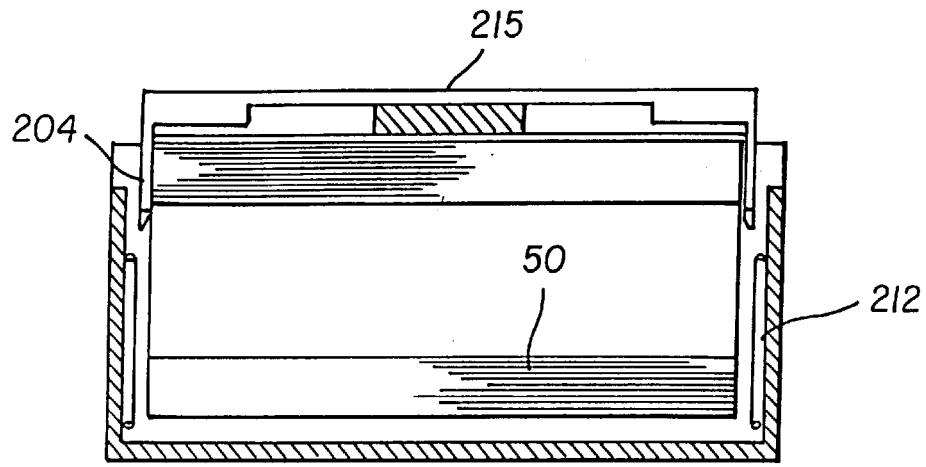
FIG. 31 is a cross-sectional view of the film loader and camera frame assembly of FIG. 29 taken substantially along line E—E of FIG. 29.
Figure 32:
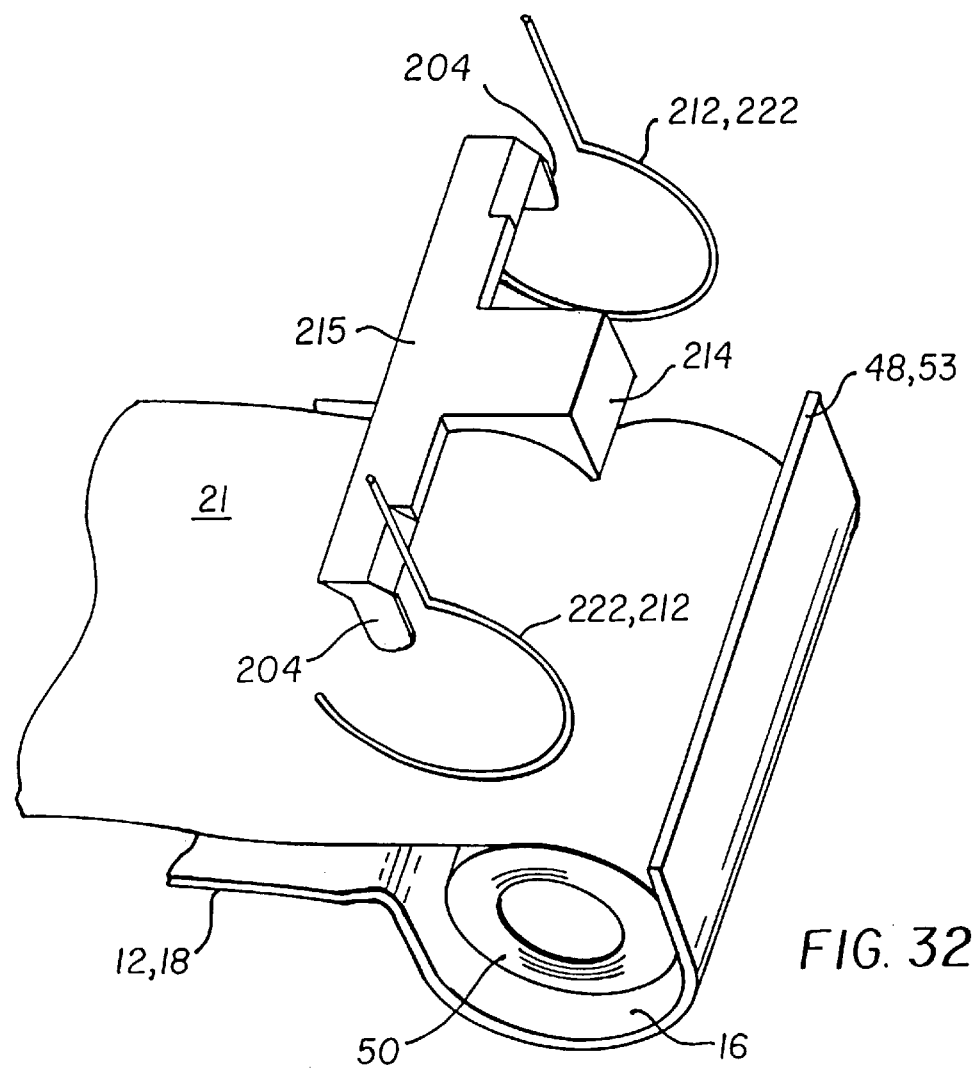
FIG. 32 is the same view as FIG. 29, except that the hooks and guide-restraint unit are shown in the inactive position.

Referring again to the apparatus 200 and particularly to FIGS. 28–30, each hook 212 has a bell 222 and a shank or support 224. Each bell 222 has one of the two pair of opposed contact surfaces 205,206. The term "contact surfaces" used herein in relation to hooks 212, refers to parts of the bell 222 which touch the film prior to the end of film loading. At the end of film loading, the film may touch most of each hook 212. At earlier stages, the film touches the bell 222 only in two limited and separated areas. The term "contact surfaces" refers cumulatively to those limited and separated areas irrespective of the stage of film loading.

The bell 222 extends away from the support 224 in an arc and defines a gap 225 which faces inward, toward the center of the camera frame assembly 10, when the hooks 212 are interposed in the film roll chamber 16. During loading, the bells 222 define the outer circumference of a curling zone 202. The film is propelled through the gaps 225 into the curling zone 202 within the bells 222. As the film is loaded, the bells 222 are rotated, expanding the outer circumference of the curling zone 202.

It is highly preferred, due to the spatial limitations of the film roll chamber 16, that, as shown in the figures, the bell 222 have two major dimensions defining a plane and a third dimension much smaller, preferably slightly less than 2 mm. This allows the bell 222 to fit easily within an accessway 56b having an axial dimension of about 2–3 mm. It is preferred that the bell 222 be sufficiently rigid to not flex during film loading, since this maintains a constant separation between the contact surfaces 205,206 of the hooks 212 as the film is curled and ensures that the curling zone 202 grows at a predetermined rate that is solely a function of rotation of the hooks 212. It is more difficult to control the size of the curling zone 202 during film loading if the bell 222 flexes. It is also preferred that the bell 222 only contact the filmstrip 21 along smooth, curved surfaces. These characteristics can be provided by making the bell 222 of stiff, circular cross-section wire, bent into a planar hook-shape. A semi-circular bell 222 of about 270 degrees of arc is preferred, but the bell 222 can have the shape of an incomplete ovoid or incomplete polygon.

Figure 21A:
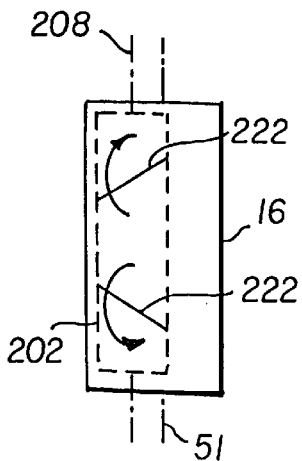
FIGS. 21a–21c are diagrammatical top views showing the hooks of the film loader of FIG. 19, a film roll chamber, and a film roll (indicated by a dashed line) during film loading.
Figure 21B:
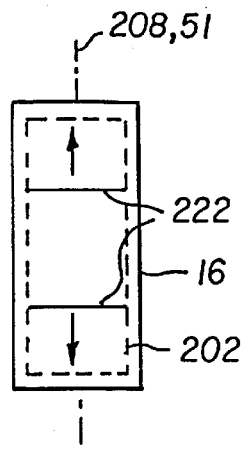
Figure 21C:
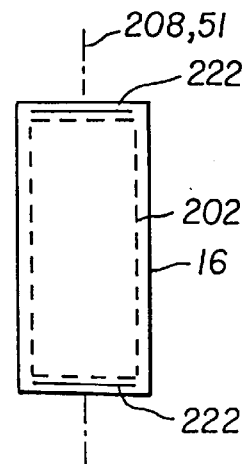
Figure 22A:
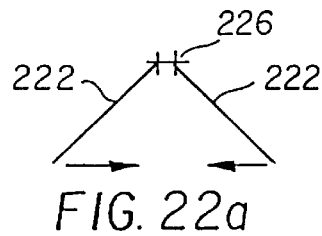
FIGS. 22a–22h are diagrammatical top views of the hooks of the film loader showing directions of hook rotation.
Figure 22B:
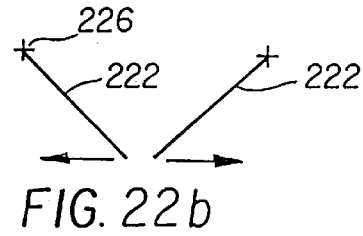
Figure 22C:
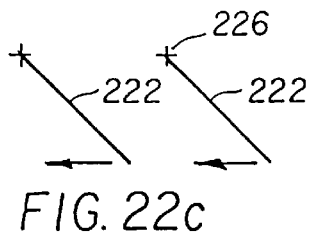
Figure 22D:
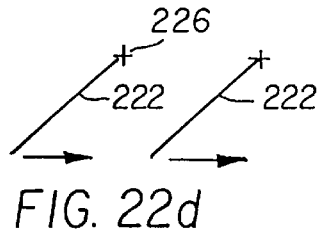
Figure 22E:
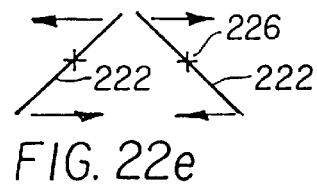
Figure 22F:
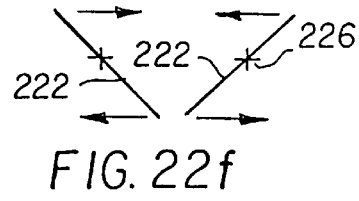
Figure 22G:
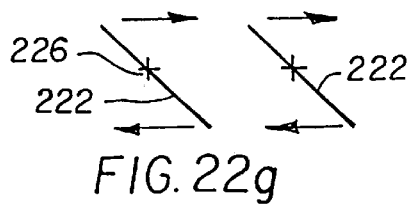
Figure 22H:
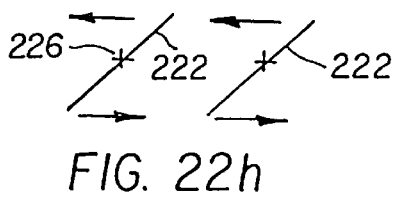

Referring to FIGS. 21a–22h, the major dimensions of the bell 222 of each hook 212 define a plane. At the start of film loading, each hook 212 is interposed in the film roll chamber 16 such that the planes defined by the bells 222 are transverse to the film space axis 51 and to a curling axis 208 defined by and centered in each bell 222 and parallel to the film space axis 51. As film is propelled into the film space 52, each hook 212 is rotated about a pivot axis 226 (indicated by "+" in FIGS. 22e–22h) from an initial position, in which the planes of the bells 222 are oblique to the curling axis 208, through a series of intermediate positions to a final position, in which the planes of the bells 222 are perpendicular or nearly perpendicular to the curling axis 208. (Rotation arrows are shown in FIG. 21 a and relative directions of motion are indicated by arrows in FIGS. 22e–22h.) It is highly preferred that this rotation of the hooks 212, during the film winding process, is through an angle of less than ninety degrees; since a greater degree of rotation would tend to compress the film roll at some time during film winding.

As the hooks 212 rotate, the film enters the curling zone 202 and curls about the curling axis 208. The curling axis 208 can be moved a small distance during film loading by moving the hooks 212. The curling axis 208 can also be made to migrate a small distance during film loading, by the use of hooks 212 having non-circular bells 222. The rotation of the hooks 212 increases the radial separation of each contact surface from the curling axis 208 thus increasing the size of the curling zone 202. The hooks 212 rotate in tandem, since independent rotation would be likely to cause telescoping of the film roll. The direction or directions of hook 212 rotation is not critical. FIGS. 22a–22d illustrate possible directions of rotation about a pair of pivot axes 226 which are maximally offset from the curling axis 208. FIGS. 22e–22h illustrate possible directions of rotation about a pair of pivot axes 226 which extend through the curling axis 208. In FIGS. 22a–22b and 22e–22f, the hooks 212 define intersecting planes in an initial position and one hook 212 is rotated clockwise and the other hook 212 is rotated counter-clockwise. In FIGS. 22c–22d and 22g–22h, the two hooks 212 continuously define parallel planes and are both rotated either clockwise or counter-clockwise.

The pivot axes 226 extend in a direction that is transverse to the curling axis 208. The pivot axes 226 can intersect or be offset from the curling axis 208. A convenient hook 212 has a pivot axis 226 that is perpendicular to the curling axis 208 and extends through the hook 212 support.

The hooks 212 can be rotated from the initial position to a final position during film loading by the film roll 50. In this case, the hooks 212 are mounted so as to rotate against a light bias from the initial position to the final position and the impetus applied to the film by the film transport is sufficient to build the film roll against the biasing. This approach is not preferred, because the rotation of the hooks 212 is dependent upon frictional contact between the hooks 212 and the film. This presents a risk of both spasmodic hook 212 rotation and film scuffing.

Figure 19:
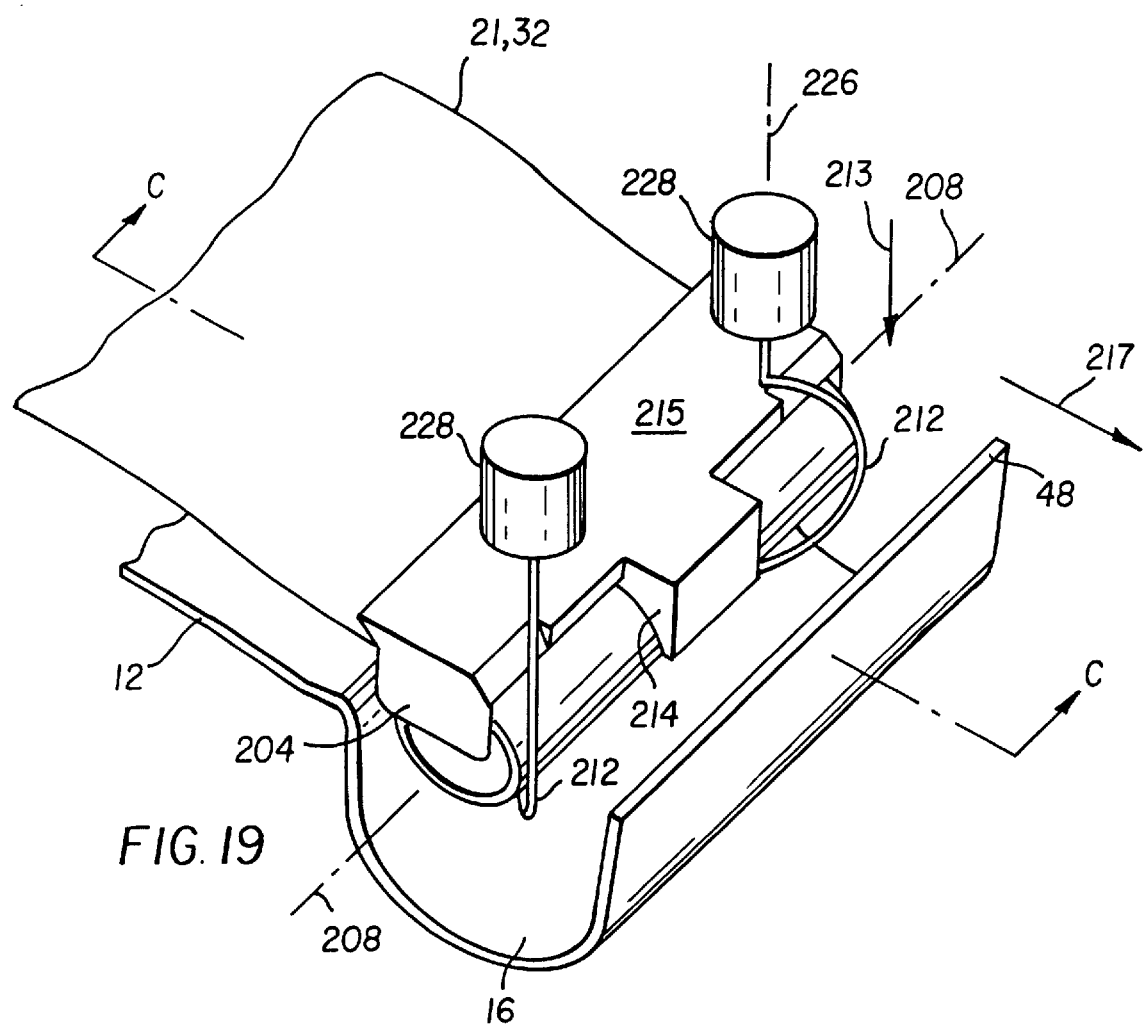
FIG. 19 is a perspective view of an embodiment of the rotating hook film loader. For clarity, only the hooks, hook drive, and guide-restraint unit are shown. Also shown are a portion of a filmstrip and part of the frame of a camera frame assembly. This figure shows the loader after curling of the first turn of film roll. The hooks are in the initial position.
Figure 20:
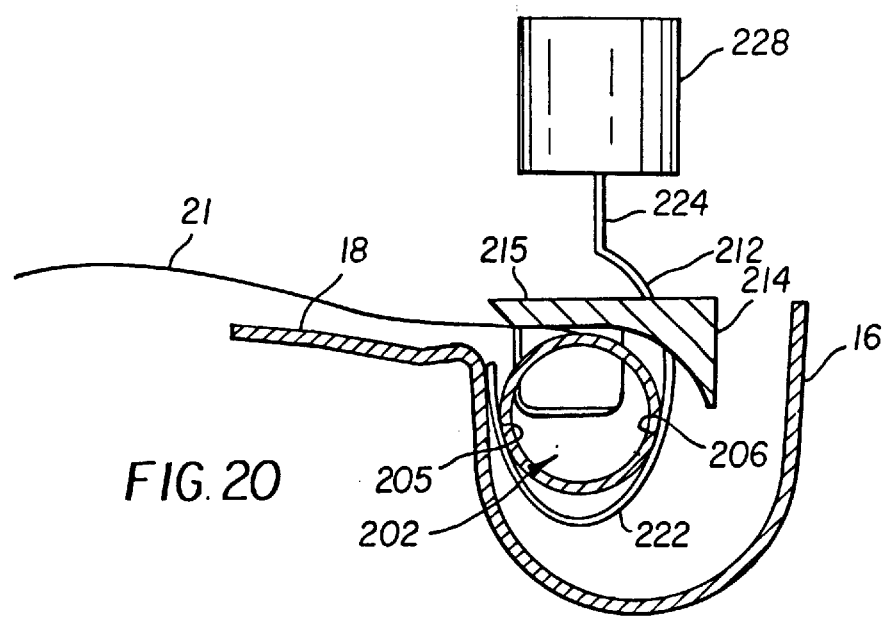
FIG. 20 is a cross-sectional view of the film loader and camera frame assembly of FIG. 19 taken substantially along line C—C of FIG. 19.
Figure 33:
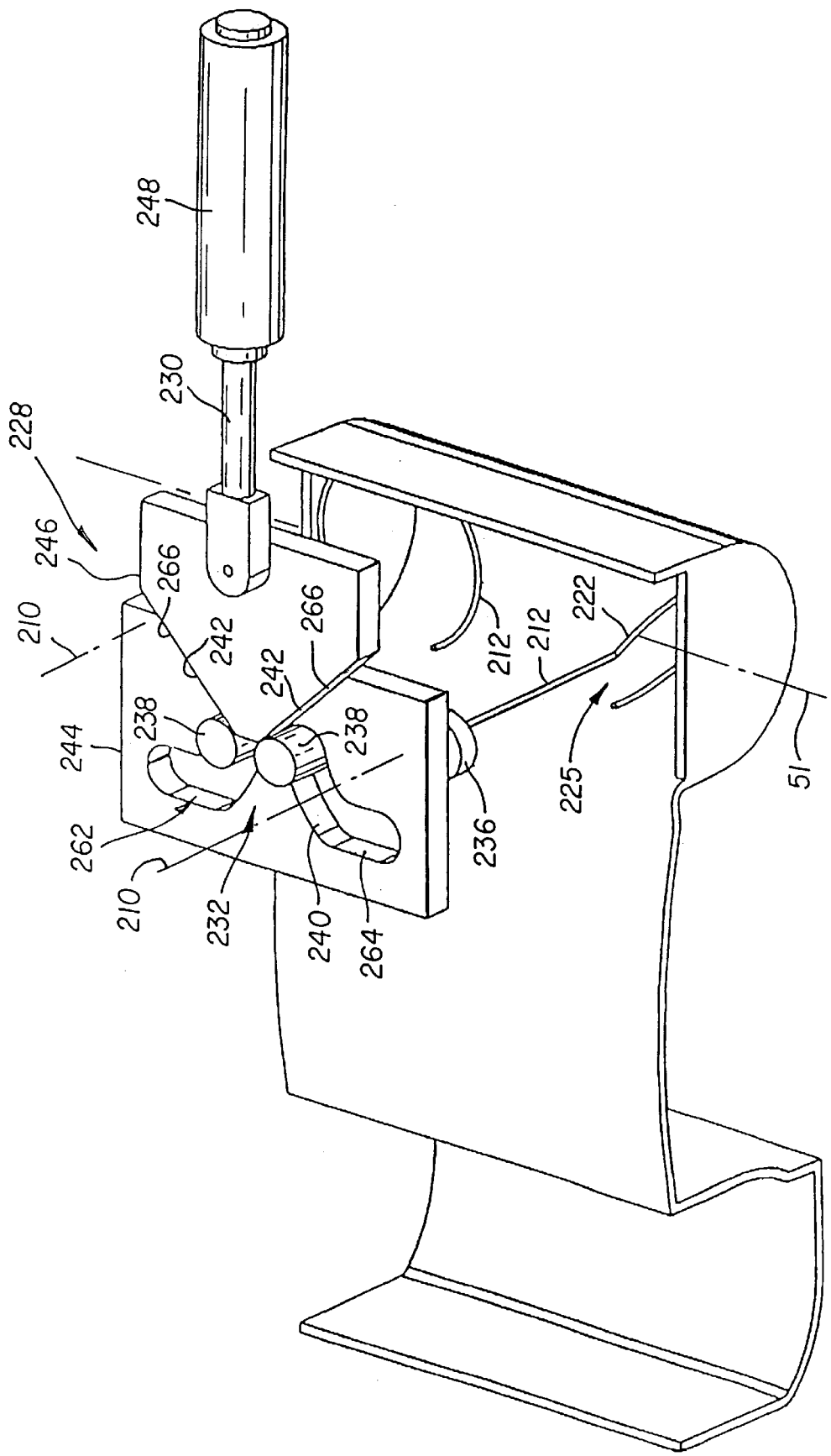
FIG. 33 is a perspective view of another embodiment of the rotating hook film loader. For clarity, only the hooks and hook rotator are shown. Also shown is part of the frame of a camera frame assembly. The hooks are in the initial position.
Figure 34:
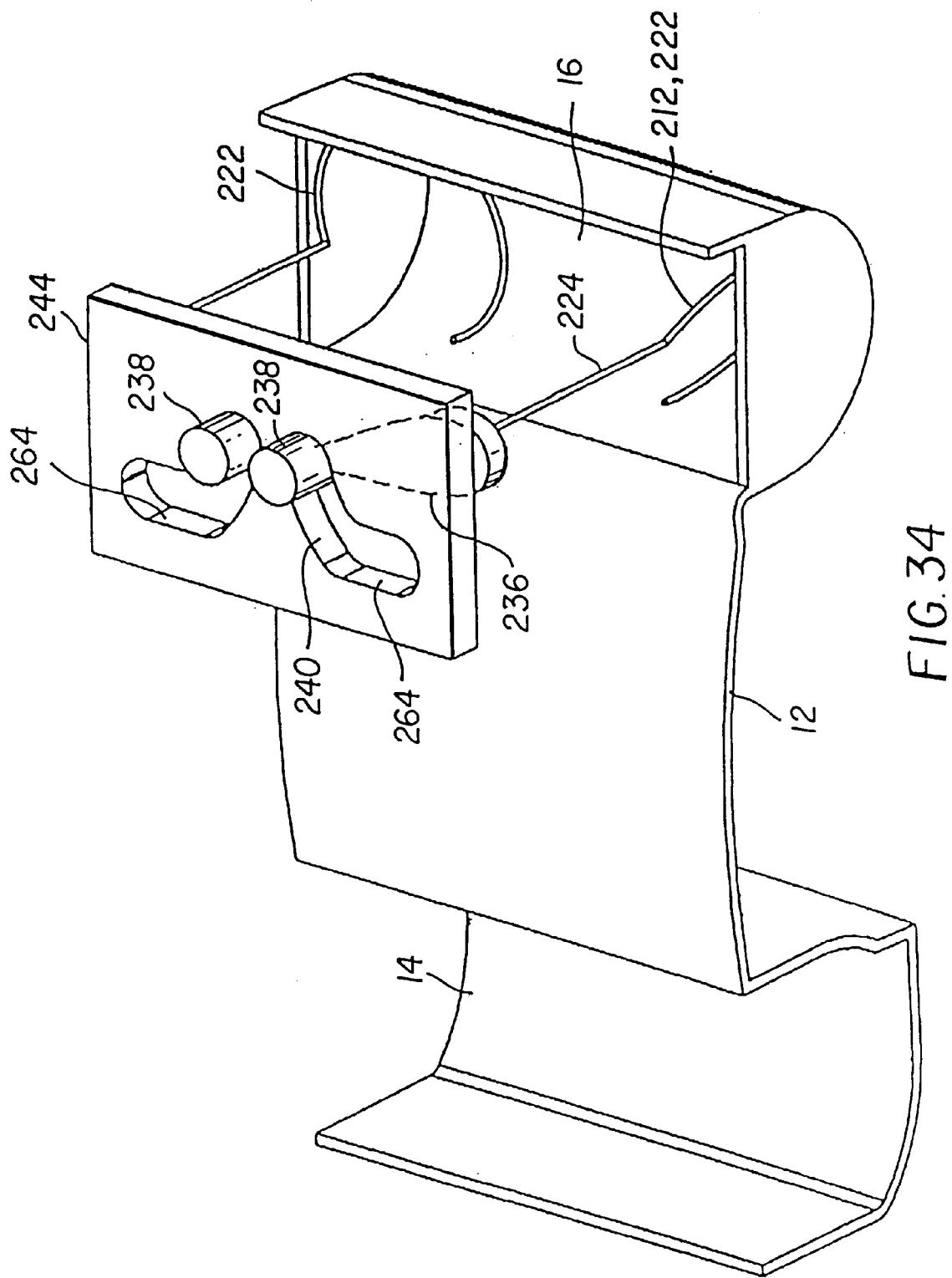
FIG. 34 is the same view as FIG. 33, but, for clarity, the hook drive is not shown.
Figure 35:
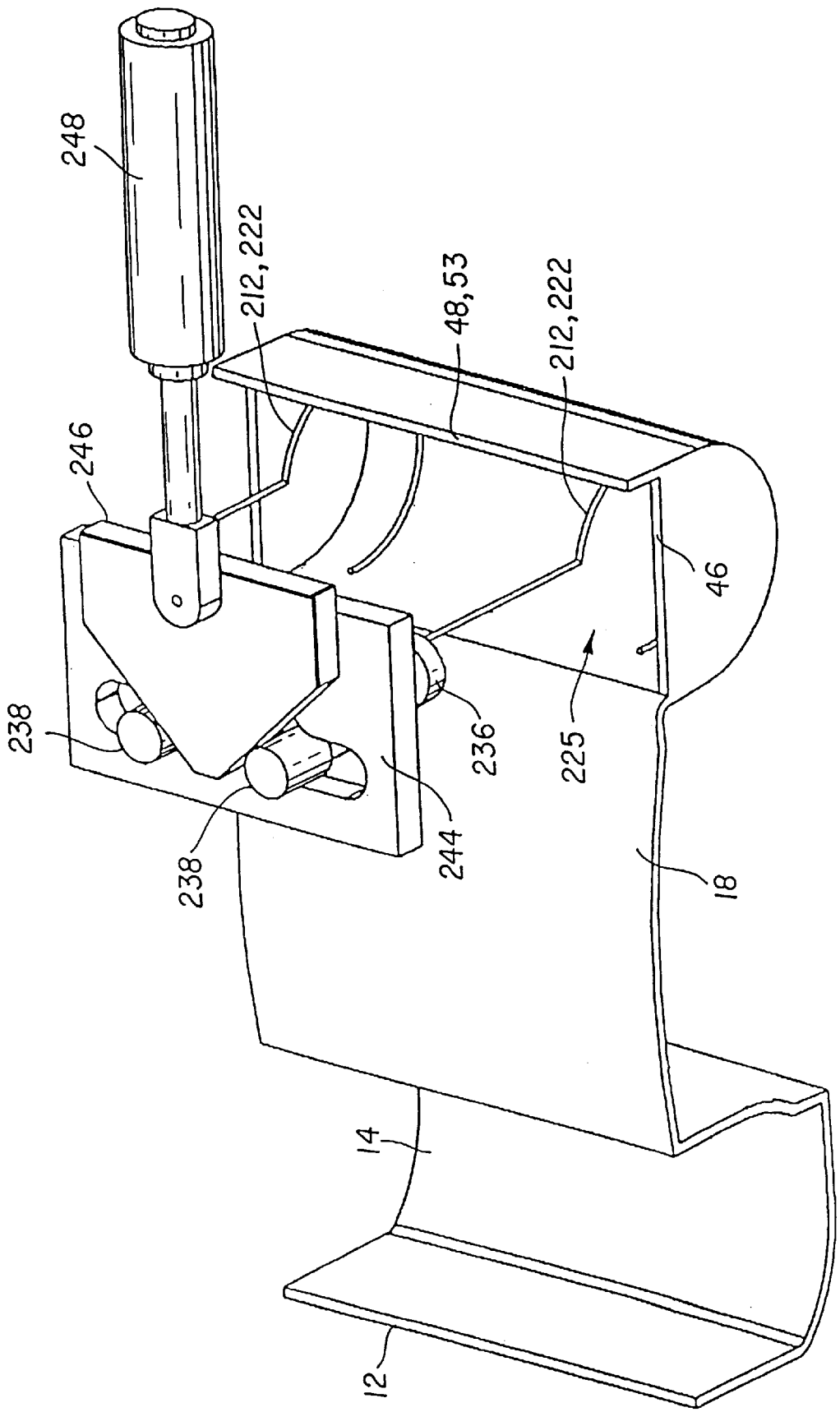
FIG. 35 is the same view as FIG. 33, but the hooks are in the final position.
Figure 36:
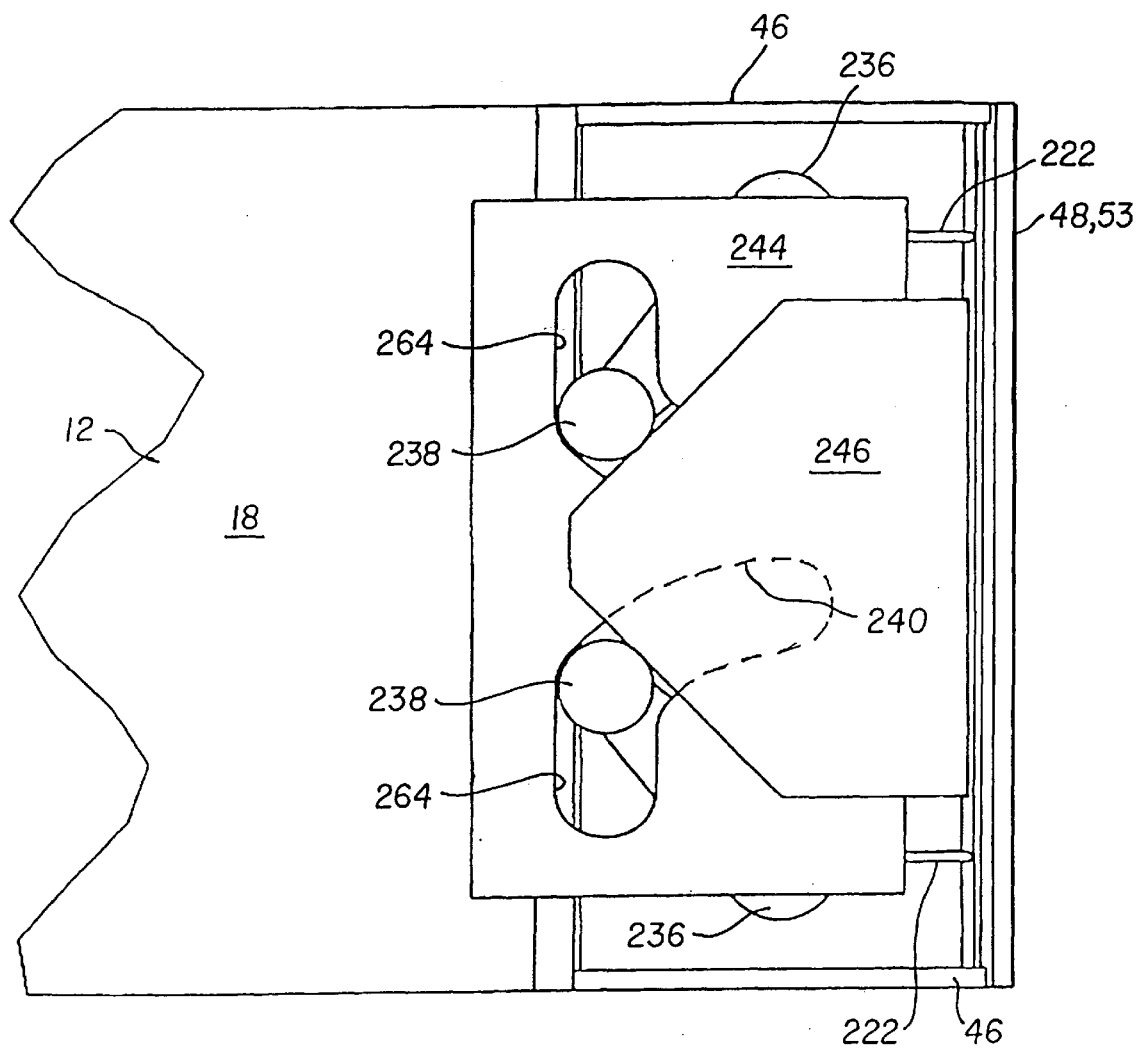
FIG. 36 is a top plan view of the rotating hook film loader of FIG. 35. For clarity, only the hooks and hook rotator are shown. Also shown is part of the frame of a camera frame assembly. The hooks are in the final position.
Figure 37:
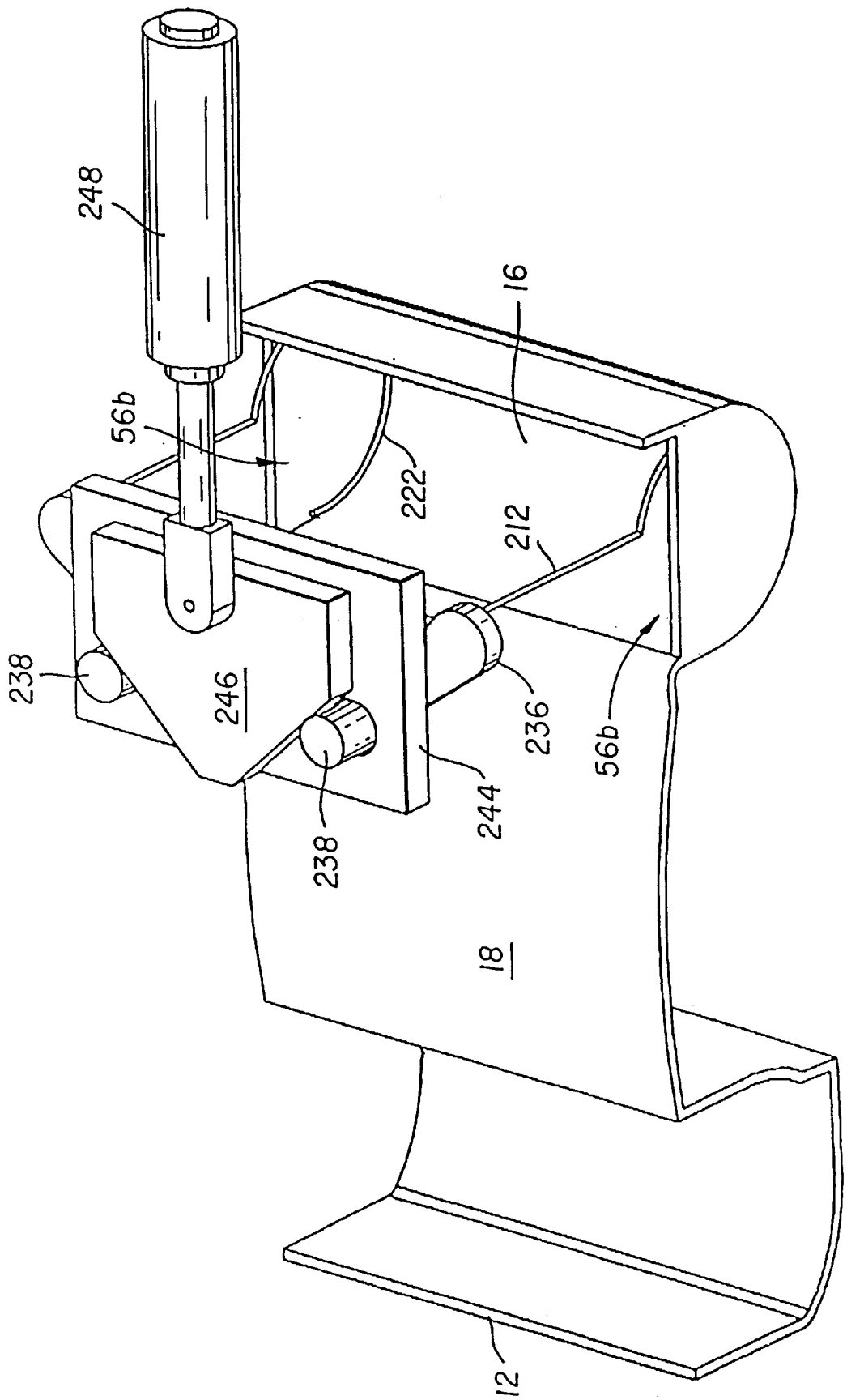
FIG. 37 is the same view as FIGS. 33 and 35, but the hooks are in the withdrawal position.
Figure 38:
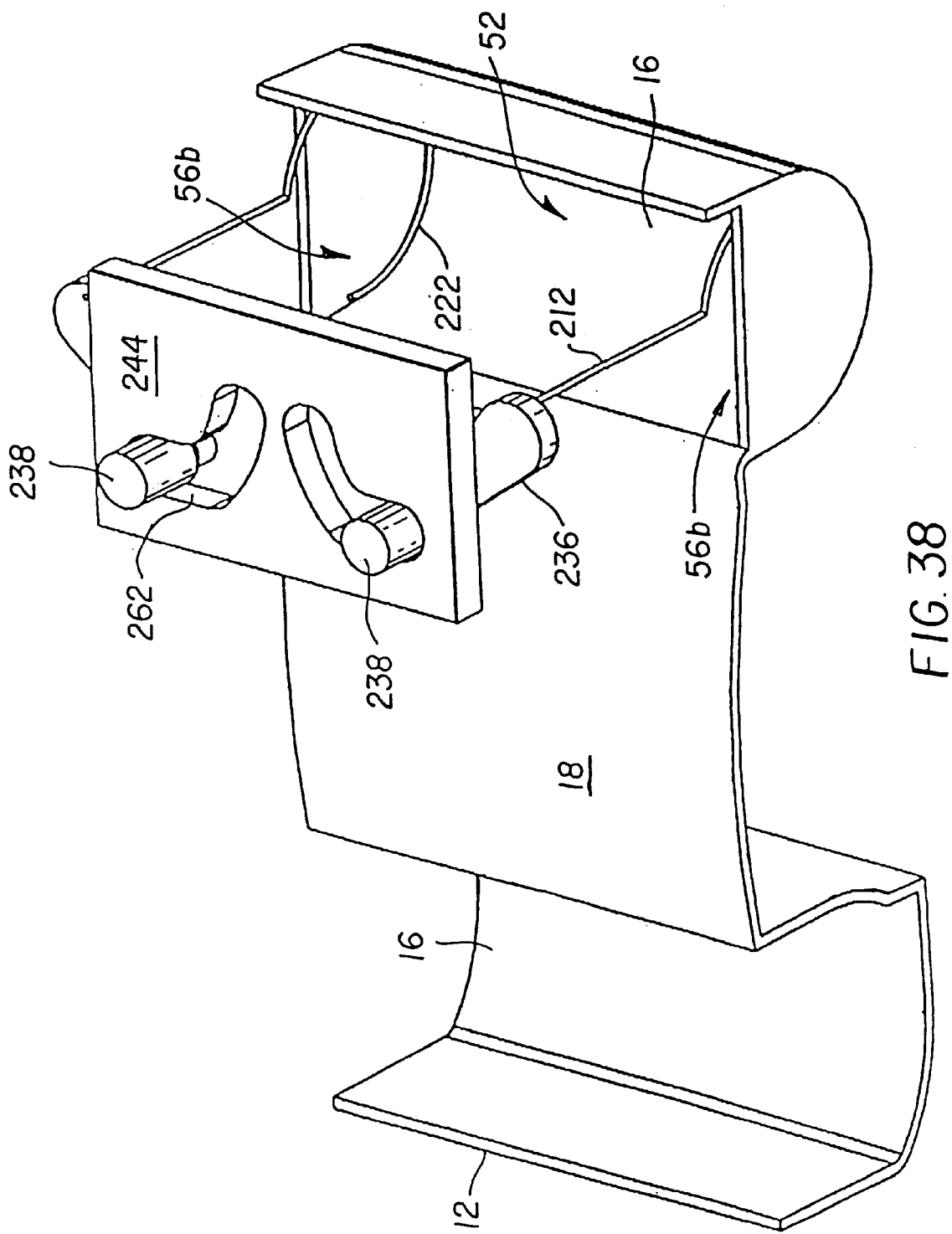
FIG. 38 is the same view as FIG. 37, but, for clarity, the hook drive is not shown.
Figure 39:
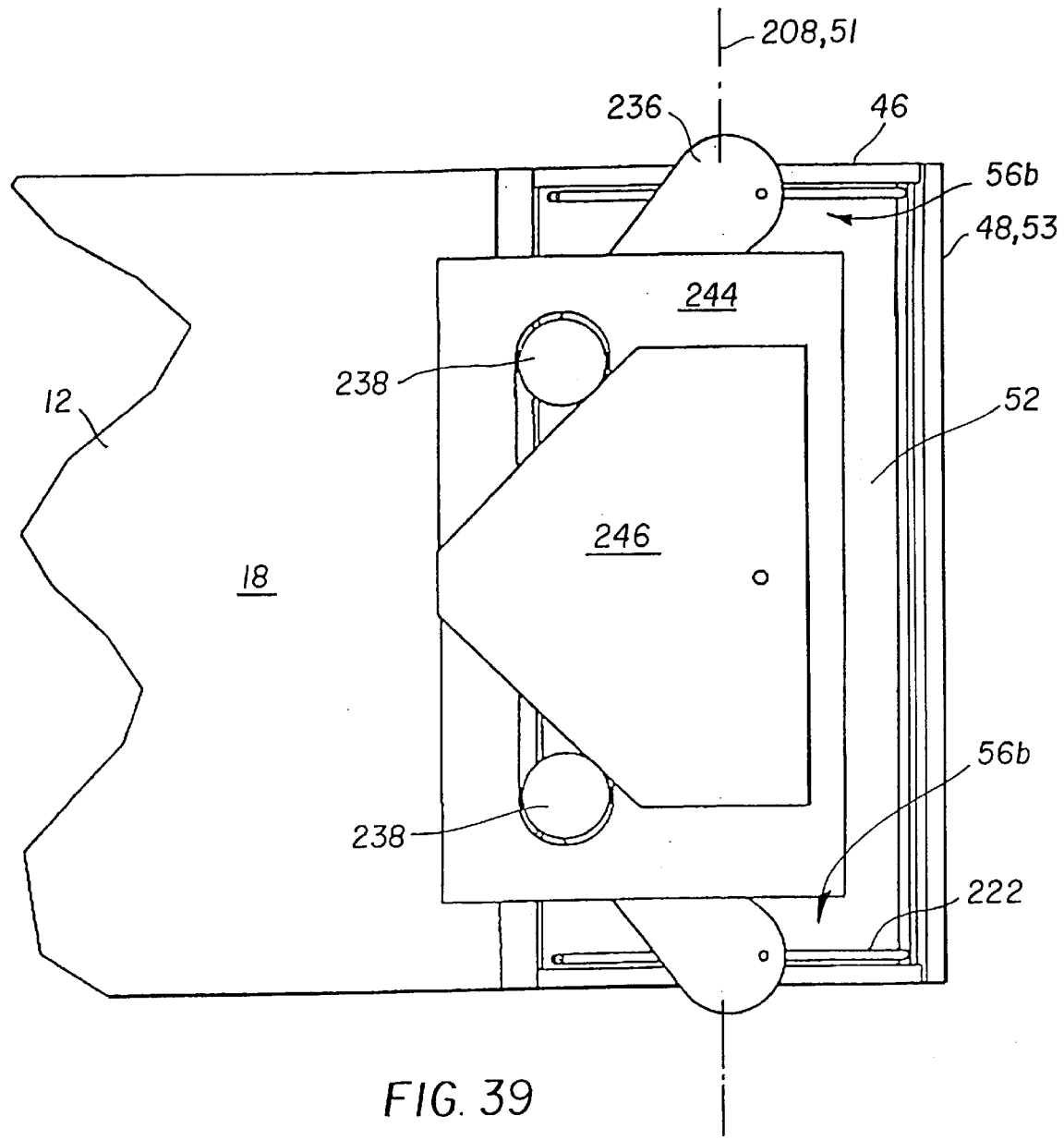
FIG. 39 is the same view as FIG. 36, but the hooks are in the withdrawal position.

Referring particularly to FIGS. 19 and 33, it is highly preferred that the hooks 212 are rotated by a hook rotator 228 and not the film roll. The hook rotator 228 has a hook drive 230 which rotates the hooks 212 at a rate proportional to the delivery of film to the curling zone 202, and a hook couple 232 which synchronizes the rotation of the two hooks 212. Most other general features of the hook rotator 228 can be varied to as desired or to meet individual requirements. For example, referring to FIGS. 19–20, in one embodiment, the hook drive 230 is a pair of servomotors or the like driving the shanks 224 of respective hooks 212, synchronized by a hook couple (not shown) in the form of a computerized controller or mechanical coupling.

In addition to the hook or hooks 212, it is preferred that a curling guide 214 also be present during film loading. The curling guide 214 is curved to match the film roll 50 and is positioned alongside the hooks 212 to aid in curling the filmstrip 21. The hook or hooks 212 are part of the rotating hook film loader 200. The curling guide 214 can be part of the apparatus 200 or can be included in the guard 54 of a camera frame assembly 10. If the curling guide 214 is included in the guard 54, then the curling guide 214 can also block clock-springing of the film roll after loading. In the camera frame assembly of FIGS. 23–25, the guard 54 includes the curling guide 214. The guard 54 overlaps about the middle third of the film space 52 and extends across about as far as the film space axis 51. The guard 54 includes an outwardly directed pocket 233, which is exterior to the light lock in the completed camera and aligned with openings 234 in the covers 40,42. A strap (not shown) can be threaded through the openings 234 and pocket 233 and secured against stiles 234a of the covers 40,42.

It is also preferred that a pair of opposed film roll restraints 204 be present during film loading. The film roll restraints 204 delimit the axial boundaries of the film space 52 and prevent telescoping as the film is wound. The film roll restraints 204 can also be provided as either part of the film loading apparatus 200 or be included in the guard 54 of a camera frame assembly 10. In the camera frame assembly 10 of FIGS. 26–27, the guard 54 includes a curling guide 214 and film roll restraints 204. The curling guide 214 is part of the stem portion 60. The film roll restraints 204 are attached to the ends of the gate portion 58 and extend into the film roll chamber 16 at the axial ends of the film space 52. In the apparatus 200, both the curling guide 214 and the film roll restraints 204 can be joined to a common support 215 to form a guide-restraint unit 216. The support 215 can be configured as needed to meet particular spatial limitations. The supports 215 shown in some of the figures are notched to provide clearance for the hooks 212.

The support 215 and hooks 212 can be moved during film loading, relative to the camera frame assembly 10 or each other or both, as necessary to make space for the growing film roll 50. In the apparatus shown in FIGS. 19–20, the hooks 212 are lowered (in the direction indicated by arrow 213) and both the hooks 212 and the support 215 are moved outward from the intermediate section 18 (in the direction indicated by arrow 215), during film loading. The support 215 shown in FIGS. 28–41 is moved upward relative to the hooks 212 and film roll chamber 16 (in the direction indicated by arrow 219), during film loading to accommodate the growing film roll. At the end of film loading, the film roll restraints 204 are left in place, if part of the apparatus 200; while the hooks 212 are traversed, restraining axial movement of the film roll. If the film roll restraints 204 are part of the frame assembly, this occurs automatically.

Referring particularly to FIGS. 21b–21c and 31–32, at the end of film loading, the hooks 212 are traversed, in directions (indicated by arrows in FIG. 21b) parallel to the curling and film space axes 208,226, beyond the film roll 50 into the accessways 56b. A traverse unit can be provided as a separate mechanism, such as a pair of linear actuators (not shown) connected to the hooks 212, or can be incorporated with other features of the hook rotator 228. After the traversing, the hooks 212 are withdrawn from the film roll chamber 16.

Referring to FIGS. 33–41, in other embodiments of the apparatus 200, the hook drive supplies linear motion and mechanically converts the linear motion to rotation motion for each hook with a pair of equivalent mechanisms and the hook couple unites the paired mechanisms into a single mechanically balanced structure for synchronous operation. FIGS. 33–41 illustrate the use of cam mechanisms for this purpose. Other equivalent structures, such as a gear train or pair of gear trains, are well known to those of skill in the art. Referring to FIGS. 33–41, the hooks 212 are wire and have pivot axes 210 perpendicular to the curling axis 208. The pivot axes 210 extend through the shanks 224. The upper ends of the shanks 224 are fixed to the ends of respective pivot arms 236. The opposite end of each pivot arm 236 has a cam follower 238 that is movable against a primary cam surface 240. The primary cam surface 240 is curved so that the pivot arm 236 turns and the attached hook 212 pivots as the cam follower 238 travels along the primary cam surface 240. The cam followers 238 are also each movable against a respective secondary cam surface 242, which overlies and is independent from the primary cam surface 240.

The pivot arms 236 and primary and secondary cam surfaces 240,242 are arranged in pair and have the appearance of mirror images. The primary cam surfaces 240 are internal surfaces of a single plate 244 which is maintained in a constant position relative to the frame assembly 10 during film winding. The secondary cam surfaces 242 are external surfaces of a head 246 which is joined to a linear actuator 248. The head 246 is translated across the plate 244 during the winding operation in a direction that lies in a plane perpendicular to the curling axis 208. The linear actuator 248 is operated by a controller (not shown) in coordination with the film transport. The cam followers 238 are biased against respective secondary cam surfaces 242, by springs or the like, to prevent unintended hook rotation.

The cam features shown in FIGS. 33–41, are simple in shape and easy to manufacture. The head 246 is shaped like a blunted arrowhead and the secondary cam surfaces 242 are linear and are inclined inward at the same angle toward a point between the two cam followers 238. The cam followers 238 are cylindrical posts having an upper portion riding on the respective secondary cam surfaces 242 and a lower portion riding on the respective primary cam surfaces 240. The primary cam surfaces 240 are arcuate openings in the plate 244. In the apparatus shown in FIGS. 33–39, the hooks 212 are angled toward each other in an initial position with the gaps 225 of the bells 222 innermost and rotate counter-clockwise and clockwise, respectively to the final position. The primary cam surfaces 240 curve counter-clockwise and clockwise, in the same manner, to achieve the required hook rotations.

Figure 40:
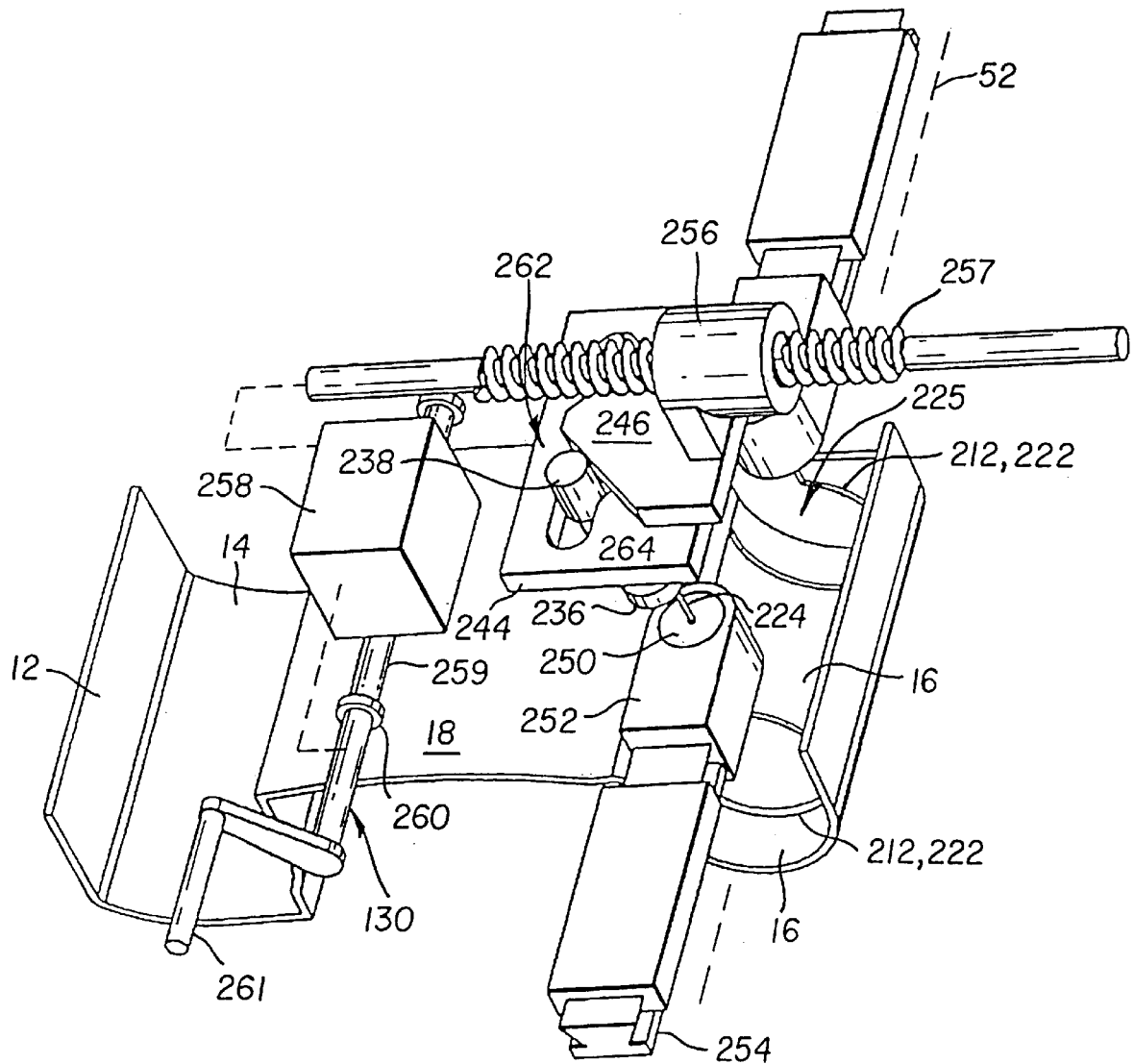
FIG. 40 is a perspective view of another embodiment of the rotating hook film loader and a camera frame assembly. For clarity, some features are not shown. The hooks are in the final position.
Figure 41:
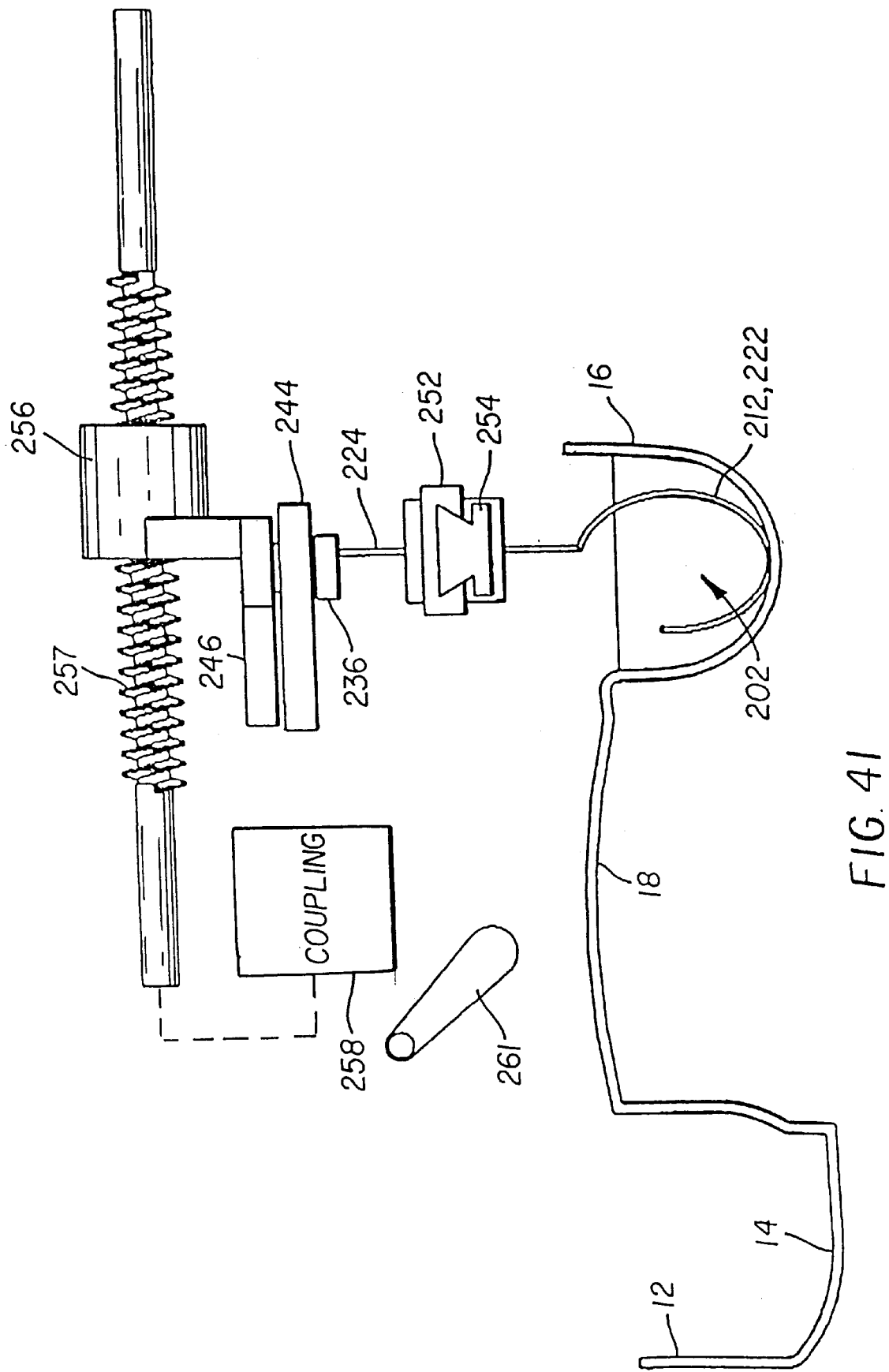
FIG. 41 is a side view of the film loader and camera frame assembly of FIG. 40. One of the hooks is shown, in an initial position.

In a slightly different embodiment shown in FIGS. 40–41, the shanks 224 each have a roller portion 250 which is held in a bearing slide 252 so as to be freely pivotable about the pivot axis 226. The bearing slides 252 are mounted to slide supports 254 for movement in directions parallel to the film space axis 51. The bearing slides 252 can be biased toward each other for biasing the cam followers 238 toward the initial position. A traveler 256, geared to an Archimedes's screw 257, is fixed to the head 246 and provides linear motion of the head 246 across the plate 244. A shaft of the screw 257 is mechanically coupled (indicated by dashed lines and box 258) to the film transporter 130. In FIGS. 40–41, the film transporter 130 is illustrated as a shaft 259 bearing a continuous or discontinuous roller 260 and a hand crank 261. Rotation of the crank 261 drives the film through a nip between the roller 260 and the intermediate section 18 of the frame 12. (The nip is not shown in the figures, since the shaft is shown in an offset position for clarity.) Various other film transports 130 were previously discussed and are also suitable.

In the apparatus of FIGS. 33–41, a traverse unit 262 has first and second traversing cam surfaces 264,266 on plate 244 and on the head 246 as continuations of each primary and secondary cam surface 240,242, respectively. The first traversing cam surfaces 264 are straight and are aligned with the film space 52 and curling axes 208. The second traversing cam surfaces 266 are linear continuations of the respective secondary cam surfaces 242. When the head 246 is moved across the plate 244 the cam follower 238 moves, without interruption, from the primary cam surface 240 to the first traversing cam surface 264 and from the secondary cam surface 242 to the second traversing cam surface 266. This movement of the cam follower 238 translates the attached hooks 212 from the final position, in which the hook 212 is still substantially tangent to the curling zone 202; to a position, in spaced relation to the curling zone 202, within the respective accessway 56. The hooks 212 are then withdrawn from the accessways 56 by an actuation mechanism 120.

FIGS. 52–57 and 64–79 show apparatus 300 for other film loading methods which differ from the previous methods in that a mandrel 302 is inserted axially into the film roll chamber 16 and is rotated to wind the film. Prior to winding, one or more guides 304 are used to curl the film about the mandrel 302 for cinching. Such methods are disclosed in U.S. Pat. No. 5,745,797 and U.S. patent application Ser. No. 08/997,556 filed, Dec. 23, 1997. In these methods, a leading portion of the film is curled using the guide. The leading portion is then cinched to the mandrel. After cinching, the guide is removed and the mandrel is rotated to wind the filmstrip. After winding, the mandrel is removed. These methods and apparatus are generally described herein in relation to APS film, but are not limited to that film type.

Referring to FIGS. 42–51, the guarded camera frame assembly 10 for this method has some differences from the camera frame assembly 10 used in the methods previously described. The film roll chamber 16 has a sidewall 48, but one or both end walls 46 can be omitted. It is preferred that one end of the film roll chamber 16 be completely closed by an end wall 46. The other end must allow entry of the mandrel 302 and one or more guides 304. It is preferred that this end of the film roll chamber 16 have an end wall 46 with a central opening 305 large enough to admit the mandrel 302 and one of the guides 304, a coaxial guide 306. This opening 305 or the omitted end wall 46 provides one accessway 56c to the film space 52. The film space 52 is necessarily larger in diameter than the mandrel 302. The coaxial guide 306 has an inner diameter that is only slightly larger than the diameter of the mandrel 302. The coaxial guide 306 can have a relatively small radial dimension, such that the outer diameter of the coaxial guide 306 is less than the diameter of the film space 52. In this case, the accessway 56c through the opening 305 in the end wall 46 can also be smaller in diameter than the film space 52.

The guard 54 can be continuous, but preferably has an opening over the film space 52, which provides a second accessway 56d. This accessway 56d allows entry of an additional guide 307 in a direction radial to the film space axis 51. FIGS. 52–57 and 64–79 show apparatus 300 having such an additional guide along with a coaxial guide. The guard 54 shown in FIGS. 42–51 would be usable with this apparatus 300. The guard 54 is shown with a wide accessway 56d, to accommodate a similarly wide additional guide 307. The accessway 56d is centered over part of the film space 52. The accessway 56d can vary in shape and location, and can be replaced by multiple accessways (not shown) to meet the requirements of a particular guide or guides. For example, the accessway of the guard 54 in could be changed to extend axially over the full length of the film space 52 or could be replaced by a pair of openings at axial ends of the film space 52. It is preferred that the guard 54 cover at least the ends of the film space 52 to protect the film roll chamber 16 against intrusion.

The frame assembly 10 includes a thumbwheel 308 which is mounted to an end wall 46 of the cartridge chamber 14. The thumbwheel 308 can be installed on the camera frame assembly 10 by a component (not shown) of the apparatus 300 or can be preinstalled. The thumbwheel 308 is attached to the frame 12 and, as attached, is free to rotate relative to the frame 12. The thumbwheel 308 has a rotation member 310 which, in the completed camera, is turned to advance film. The thumbwheel 308 has an axially positioned drivekey 312, which extends into the cartridge chamber space 14b. A collar or resilient flange or the like (not shown) holds the thumbwheel 308 in place on the frame 12. In the completed camera, the thumbwheel 308 engages and is keyed reciprocally to the spool 27 of the film cartridge 24. The terms "reciprocally keyed" and the like, used herein, refer to complementary structures on the cartridge spool 27 and the thumbwheel 308 that allow engagement of the thumbwheel 308 and spool 27 in only a single rotation orientation relative to each other. For example, Advanced Photo System™ cartridge 24 has a spool having a generally cylindrical socket with a cut-out or engagement portion 314 extending axially part way along the socket. A matching thumbwheel 308 has a drivekey 312 having a generally cylindrical shaft with an axially extending key complementary to the keyway of the spool. The cartridge 24 can have a cut-out 314 of unique shape for use in the specific camera. For use with APS film, the drivekey 312 has the shape shown in FIG. 68 and can mate with the cut-out 314 of the cartridge spool 27 in only a single orientation.

The camera frame assembly 10 shown includes an active light lock closer 318 that is actuated by a cam surface 320 of a thumbwheel 308. Active light lock closers of this general type are disclosed in U.S. Pat. Nos. 5,614,976 and 5,629,750. The ALL closer 318 has a drive unit 322 that is pivotably mounted to the frame 12. The drive unit 322 has an ALL coupling 324 on one end and a first sector 326 on the other. The ALL coupling 324 extends into the cartridge chamber 14 to engage the active light lock 328 of the cartridge 24. The ALL coupling 324 has a partial flange 330 that extends radially outward from the pivot axis 332 of the drive unit 322. The first sector 326 is meshed with teeth of a second sector 334 that is also pivotably mounted to the frame 12. The second sector 334 includes a follower 336 that is biased toward a C-shaped cam surface 320 of the thumbwheel 308 by a biasing spring (not shown). A sensor lever 338 is pivotably mounted to the frame 12 in the cartridge chamber 14 adjoining the intermediate section 18. The sensor lever 338 is biased rearward, that is, toward the filmstrip 21 in the completed camera; and has a rearwardly extending contact pad 340 that limits filmstrip 21 contact to an area outside the exposure area. A tab 342 on the sensor lever 338 is positioned so as to contact the partial flange 330 and block rotation of the drive unit 322 when the presence of the filmstrip 21 is sensed. In this film sensed position, the follower 336 remains spaced apart from the cam surface 320 of the thumbwheel 308 and the active light lock 328 remains open. In the completed camera, when the filmstrip 21 has been rewound into the cartridge 24, the sensor lever 338 moves rearward and the drive unit 322 rotates to a film absent-light lock open position, in which the follower 336 bears against the cam surface 320 of the thumbwheel 308.

The active light lock 328 is partially closed by this movement of the drive unit 322, which comprises about 10 degrees of rotation. As the thumbwheel 308 is rotated further, the follower 336 travels along the cam surface 320 and enters the gap 344 of the C-shaped cam surface 320. This movement of the follower 336 pivots the sectors 326,334 to a film absent-light lock closed position and fully closes the active light lock 328.

The sensor lever 338 does not reliably block rotation of the drive unit 322 until the filmstrip 21 has been prewound and the back cover 40 has been installed over the camera frame assembly 10. Prior to that time, the position of the active light lock 328 is determined by the position of the follower 336 on the cam surface 320 of the thumbwheel 308. If the follower 336 is disposed on the outer rim of the C-shaped cam surface 320, then the active light lock 328 is open. When the follower 336 enters the gap 344 in the cam surface 320, the active light lock 328 closes. Since the sensor lever 338 is not effective until the back cover 40 is in place, the active light lock 328 closes even if the filmstrip 21 is present in the active light lock 328. Filmstrip 21 damage is a likely result.

Referring to the apparatus 300 and methods of FIGS. 52–57 and 64–79, film is prewound in a camera frame assembly 10, in a darkroom, in a manner similar to the previously described methods and apparatus. In a first station 118, a camera frame assembly 10 is placed on a receiver 110, by a suitable component 112, such as a pick and place device. At the same or a following station 118, the film cartridge 24 is loaded into the frame assembly 10 using a cartridge mover 122 for positioning the cartridge 24 in the cartridge chamber 14.

The cartridge 24 is positioned in alignment with the cartridge chamber axis 354; that is, the long dimension of the cartridge 24 and the axis of the cartridge spool 27 are lined up with the long dimension of the cartridge 24 chamber. It is desirable that the cartridge chamber follow the ordinary practice in camera manufacturing and be sized to preclude placement of a cartridge 24 within the cartridge 24 chamber in non-alignment with the cartridge chamber axis 354. The cartridge 24 is also positioned adjoining the thumbwheel in close axial proximity. It is highly desirable that the axial proximity be very close, that is, at a small fraction of the length of the cartridge 24 chamber away from the thumbwheel, since more distant positioning presents a risk of the cartridge 24 tilting away from the chamber axis when the cartridge 24 is later moved toward the thumbwheel.

The cartridge mover 122 has a vacuum gripper 124 which allows the cartridge mover 122 to position the cartridge 24 in the cartridge chamber 14 and, optionally, to continue to grip or constrain the cartridge 24 during film winding. The cartridge 24 can be released after film winding is completed. This is convenient if the camera frame assembly 10 lacks features to prevent oscillation or other movement of the film cartridge 24 during film winding. The cartridge mover 122 can support other components, such as an active light lock opener 126 and a spool rotator 128. The active light lock opener 126 is pivoted to open the active light lock of a suitable film cartridge 24, such as an Advanced Photo System™ (APS™) cartridge 24, prior to placement of the cartridge 24 in the cartridge 24 chamber site. This allows the camera frame assembly 10 to include a detent (not shown) which retains the active light lock in the open position during film use.

The cartridge 24 can be positioned in the cartridge chamber 14, before or after installation of the thumbwheel 308. The cartridge 24 can first be placed in a nest 309 (shown, for example, in FIG. 52) and then be installed in the frame assembly 10. In moving the cartridge into the cartridge chamber 14, a cartridge mover 122 grips the cartridge 24 and positions the cartridge 24 in the cartridge chamber 14 in close axial proximity to the drivekey 312 of the thumbwheel 308. The cartridge 24 is not moved so far into the cartridge 24 chamber space 14 as to engage the cut-out 314 of the cartridge spool 27 and the thumbwheel drivekey 312. The reason is that in a film cartridge 24 like an APS cartridge, the opening of the cartridge door 328 unlocks the film spool 27. Thus, the engagement portion 314 and drivekey 312 may be misaligned and it is undesirable to force the parts together.

Figure 9:
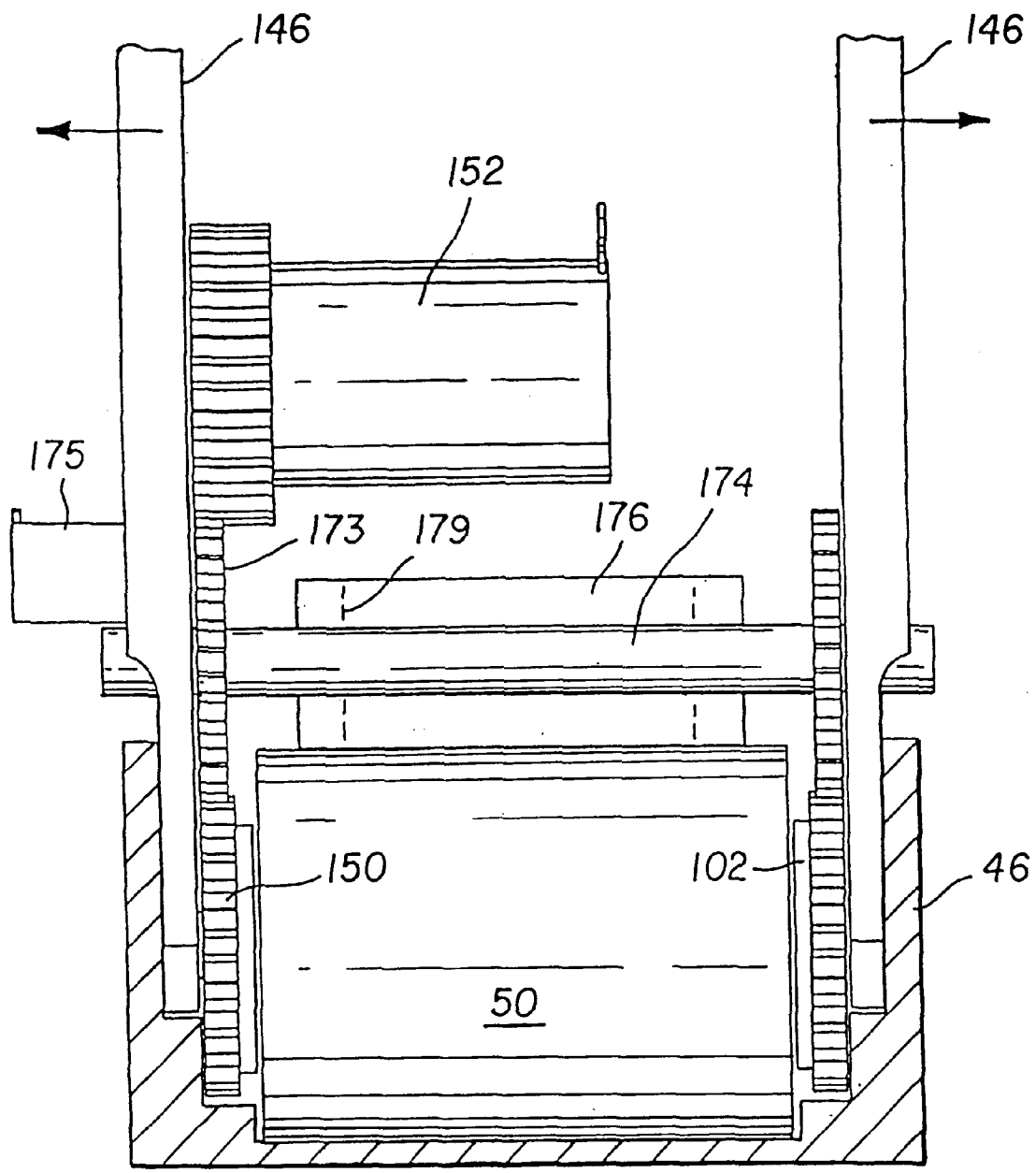
FIG. 9 is the same view as FIG. 3, but the apparatus is shown at the same time as in FIG. 8.
Figure 10:
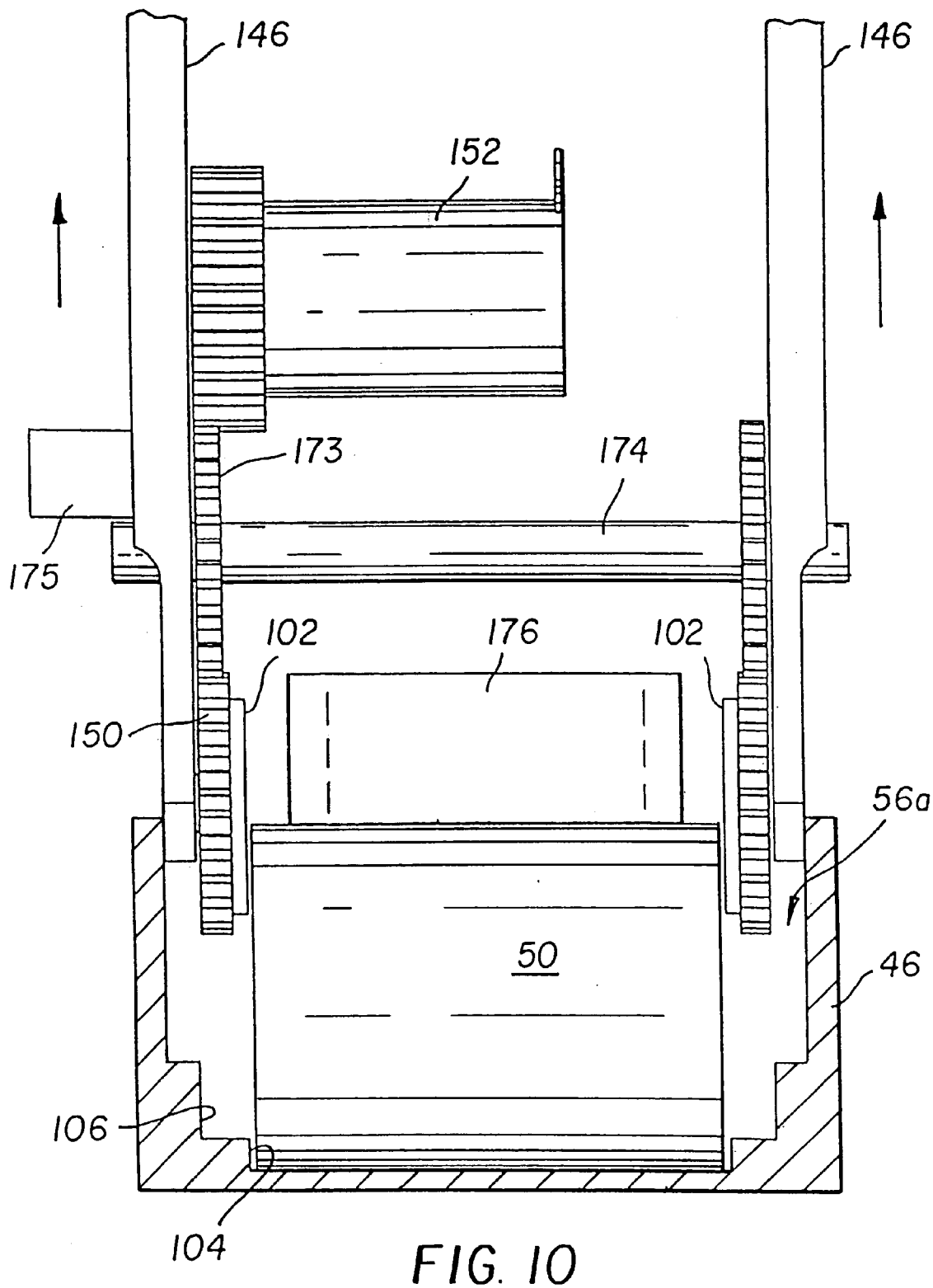
FIG. 10 is the same view as FIG. 9, but the apparatus is shown during removal of the winder.
Figure 53:
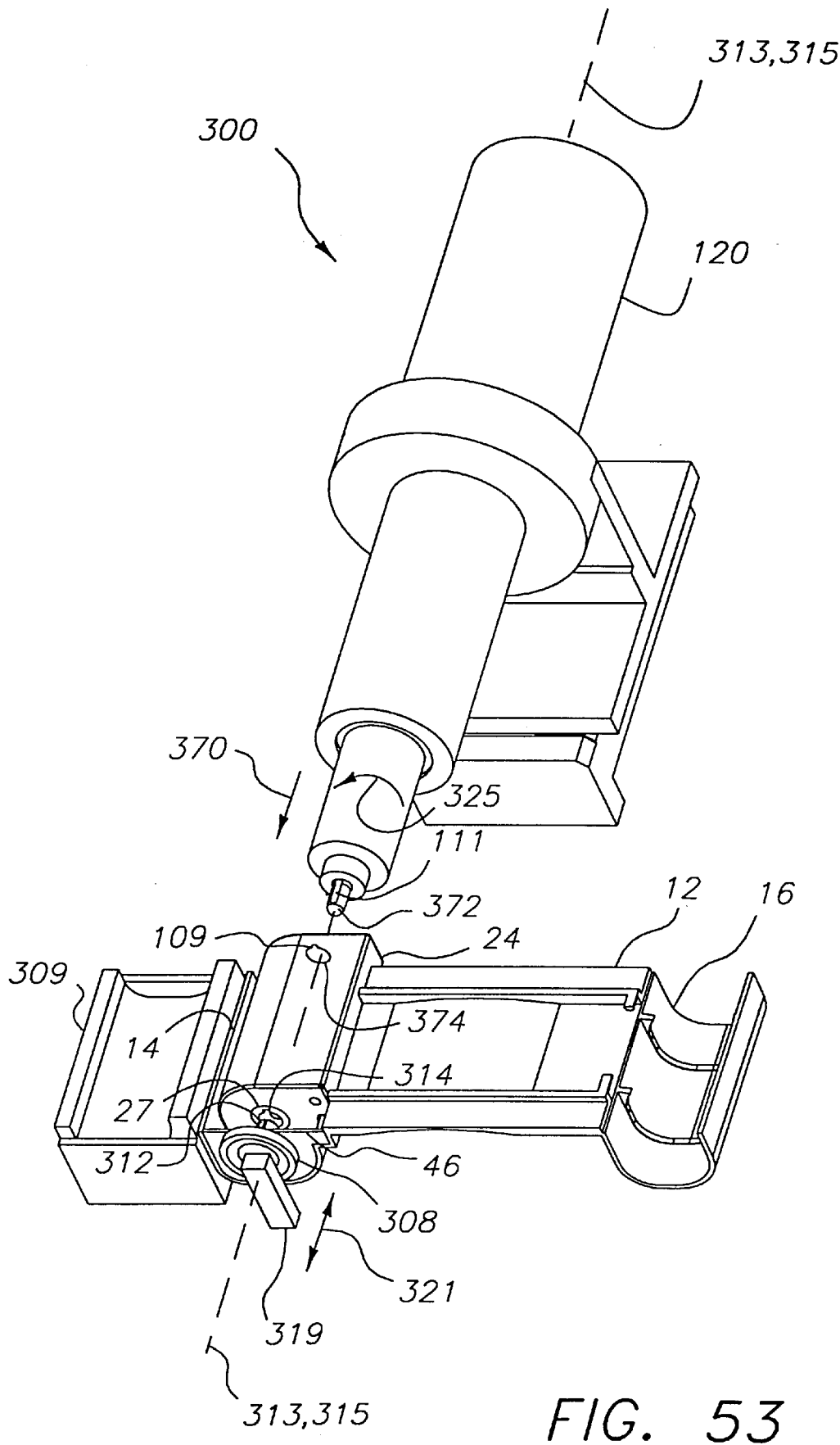
FIG. 53 is the same view as FIG. 52 showing an initial stage of cartridge loading.
Figure 54:
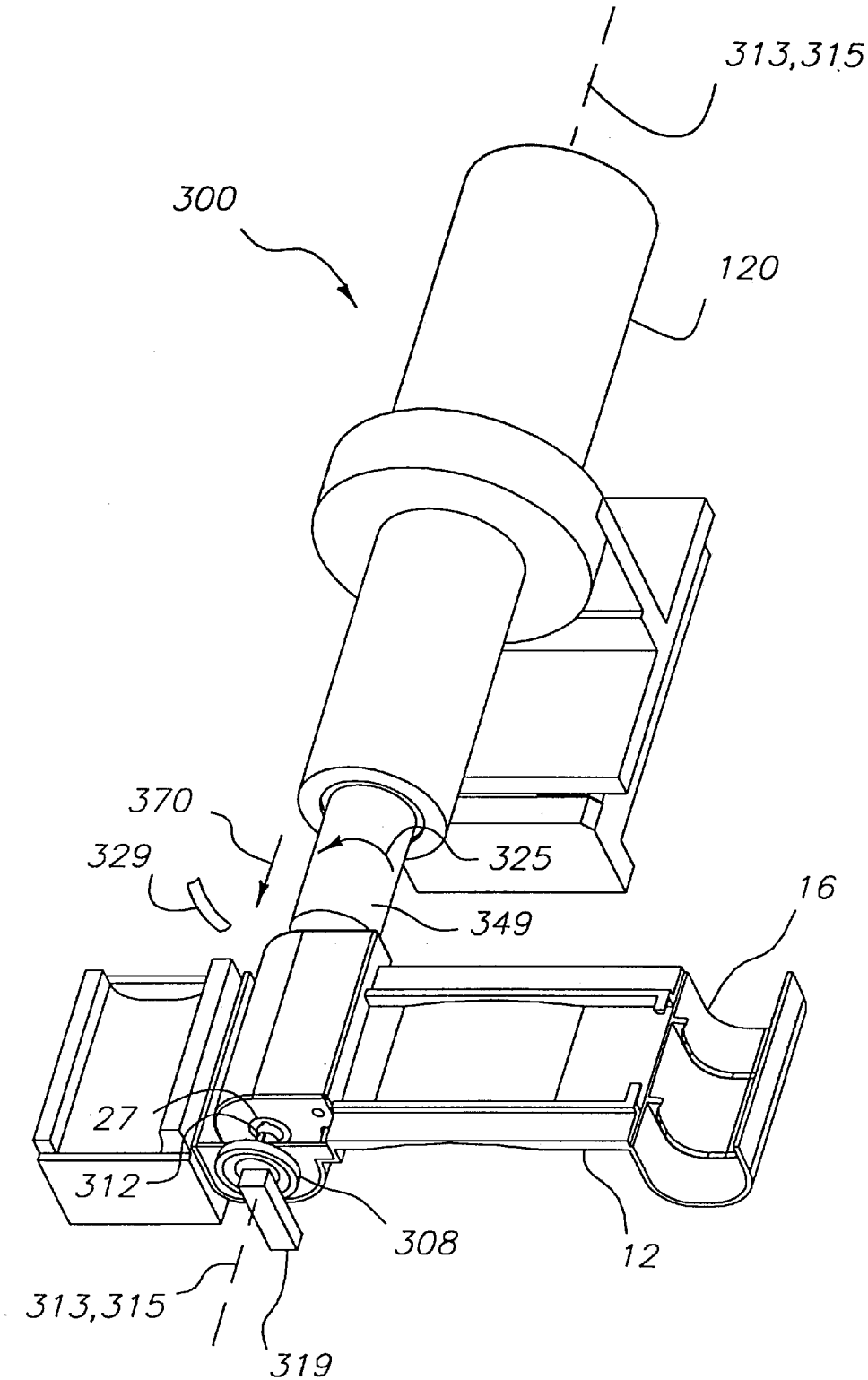
FIG. 54 is the same view as FIG. 52 showing a latter stage of cartridge loading.
Figure 55:
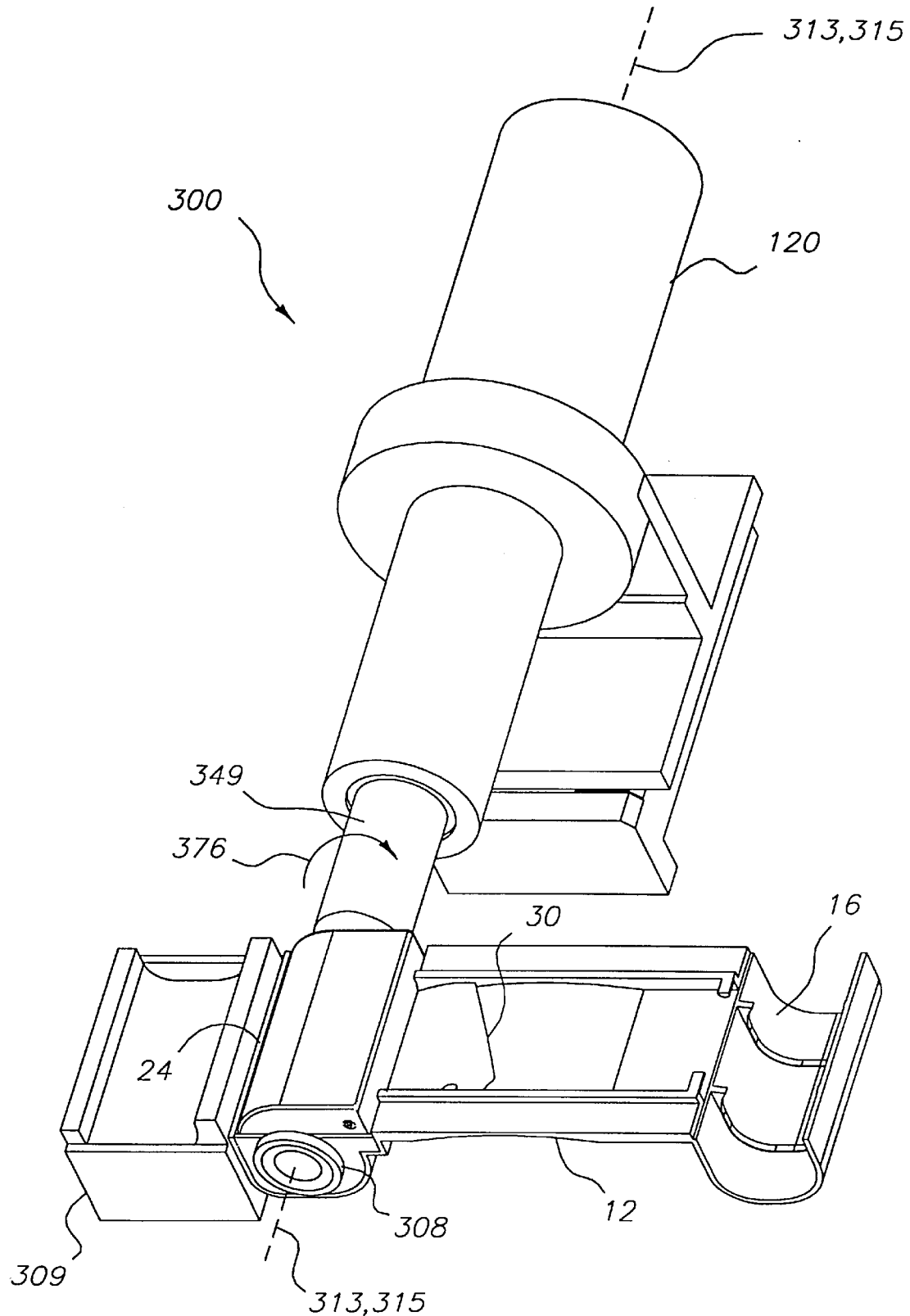
FIG. 55 is the same view as FIG. 52 showing film advancing.
Figure 56:
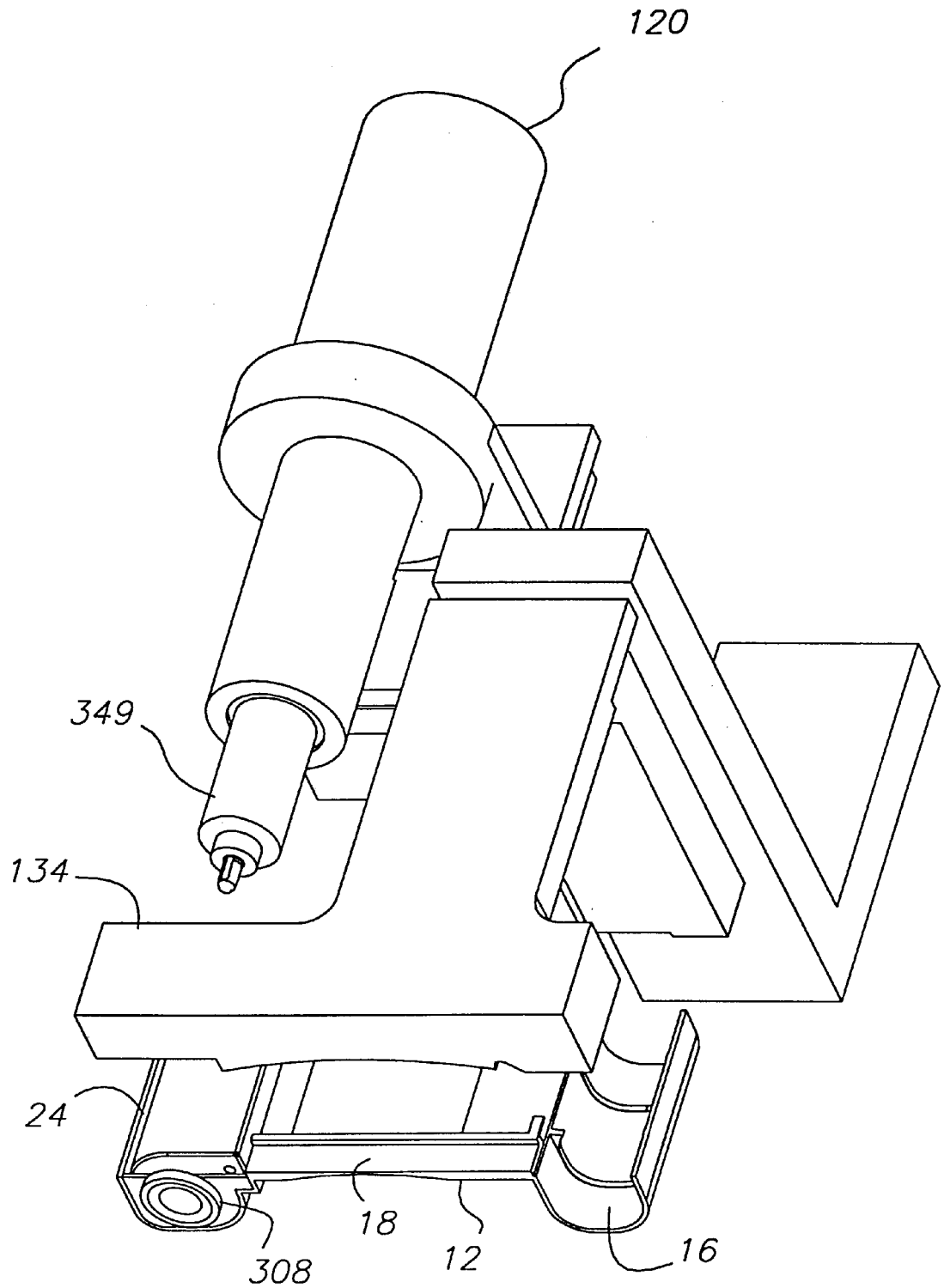
FIG. 56 is the same view as FIG. 52 showing a modified apparatus having a film transport component including a guide.

Referring now to FIGS. 53–54, in the same station or another station, a quill 349 is moved, by a linear actuator 120, in an axial direction (indicated by arrow 370) relative to the spool 27 of the film cartridge 24. The quill 349 has a quill drivekey 372 that is complementary in shape to a second cut-out or engagement portion 374 (indicated by dashed lines in FIG. 9) of the cartridge spool 27. The cut-outs 314,374 at opposite ends of the cartridge spool 27 may have the same shape or may differ. A clamping member 319 is moved, as indicated in FIG. 9 by two-headed arrow 321. The thumbwheel aligner 346 is also moved, from a non-use position spaced from the film roll chamber 16 to a use position in which the clamping member 319 bears against the thumbwheel 98, which clamps the thumbwheel 98 and prevents rotation of the thumbwheel 98 relative to the frame 12. Clamping member 319 bears against the thumbwheel 98, which clamps the thumbwheel 98.

The quill 349 is placed in close axial proximity to the spool 27 of the film cartridge 24 and is turned in the rewind direction. A light axial load (supplied by actuation device 106) on the quill 349, urges the quill 349 against the cartridge spool 27, and the cartridge spool 27 against the drivekey 312 of the thumbwheel 308. At the same time, the quill 349 is rotated by actuation device 120 in a backward direction (indicated by arrow 325); that is, the quill 349 is rotated in a direction of rotation that, if applied to the cartridge 24, would withdraw an extended filmstrip 21 back into the cartridge 24. This is the rewind direction for the film cartridge 24, that is, the direction the spool is rotated to rewind film back into the cartridge 24. With a thrust type film cartridge 24, this direction is also opposite to that of film thrusting. At the same time, the quill 349 is rotated by actuation device 120 in a backward direction (indicated by arrow 325); that is, the quill 349 is rotated in the rewind direction of rotation that, if applied to the cartridge 24 would withdraw the film. During the turning, the quill 349 is driven against the spool 27 urging the quill drivekey 372 toward the cartridge 24 and urging the cartridge 24 toward the thumbwheel drivekey 372 until the drivekeys 312,372 mate engagingly with respective engagement portions 314,374 of the cartridge spool 27. The thumbwheel 308 does not rotate, because rotation of the thumbwheel 308 in the rewind direction is prevented by the oneway mechanism 352.

While the quill 349 is rotated in the rewind direction and the drivekeys 312,372 are urged into mating engagement with respective engagement portions 314,374 of the spool 27, the jack 350 continuously retains the thumbwheel drivekey 312 in axial alignment with the quill 349. This retention of alignment decreases the average time needed to engage the drivekeys 312,372 and spool 27 and reduces the risk of the thumbwheel drivekey 312 and spool 27 jack-knifing and protruding out of alignment with the cartridge chamber axis 354.

The rotation of the quill 349 causes one, and then another, of the drivekeys 312,372 and respective cut-outs 314,374 to be aligned within two revolutions of the quill 349. When the first cut-out 314 of the spool 27 and the thumbwheel drivekey 312 are aligned, the cartridge 24 moves axially (generally in the direction indicated by arrow 370) under the force applied by the quill 349, relative to common thumbwheel and cartridge axes 313,315, until the first cut-out 314 has moved into mating engagement with the thumbwheel drivekey 312 and the cartridge 24 is seated against the thumbwheel 308 and end wall 46. Similarly, when the second cut-out 374 of the spool 27 and the quill drivekey 372 are aligned, the drivekey 372 moves axially into the second cut-out 374. The drivekey 372 of the quill 349 can be spring-loaded to moderate the force applied by the quill 349 and prevent possible jamming, during quill 349 movement prior to mating engagement of both pair of cut-outs 314,374 and drivekeys 312,372. After the cartridge 24 has been seated, the clamping member is retracted from the thumbwheel. The spring loading can be axial only or can provide both for resilience in an axial direction and in one or more other directions to accommodate possible misalignments of the quill 349 and the cartridge and thumbwheel axes 313, 315.

In a particular embodiment, the second spool cut out 374 is circular or similarly radially symmetrical except for a radial slot 109. In that embodiment, the quill drivekey 372 includes a detent or key member 111 that is configured to fit in the slot 109. The key member 111 is movable independent of the body of the drivekey 372 in directions substantially radial to the axis of rotation of the quill 349 and is resiliently biased outward. The key member 111 allows the quill 349 drivekey to enter the cut out 374 while radially misaligned. The quill drivekey 372 can then spin within the cut out 374 until the key member 111 becomes aligned and resiliently moves into the cut out 374.

The discussion here is primarily directed to an embodiment using an APS cartridge 24; however, this procedure is applicable to both thrust-type film cartridges, such as APS cartridges, and non-thrust type cartridges, such as type 135 cartridges. In the latter case care must be taken to avoid withdrawing all the leader into the cartridge during cartridge seating.

A detector 329 can be mounted in operative relation to the cartridge chamber space to sense axial motion of the cartridge 24, or the like. The detector 329 can be integrated into a control system, which can stop the operation and withdraw the quill 349 if a fault condition is detected.

The cartridge spool 27 is optionally parked prior to advancing the leading portion of the filmstrip 21 to the film roll chamber 16. In that case, referring to FIGS. 33–37, the apparatus 300 includes a thumbwheel aligner 346, which is used with a quill 349. The aligner 346 and quill 349 are associated with the cartridge mover 122 and are referred to collectively herein as a cartridge positioner-thruster 348. It is preferred that the cartridge mover 122, aligner 346, and quill 349 are all at the same station 118 of the apparatus 300, but the cartridge mover 122 can be provided at an upstream station 118 if desired. The cartridge mover 122, aligner 346, and quill 349 are located and move relative to the site 10 of the camera frame assembly 10 on the receiver 110 in the same manner previously described for other components.

The aligner 346 includes a pair of subcomponents: a jack 350 and a one-way mechanism 352. The jack 350 has an axis 353 that is coextensive with the cartridge chamber axis 354 when the aligner 346 is in its active position. The jack 350 is adapted to engage the thumbwheel 308 and hold the thumbwheel 308 in alignment with the jack axis 351 and permit rotation of the thumbwheel 308 about the jack axis 351. In the aligner 346 shown in the figures, the jack 350 has a freely rotatable cylindrical post 355 that is received by a closely-sized cylindrical post-hole 356 in the thumbwheel 308.

Figure 67:
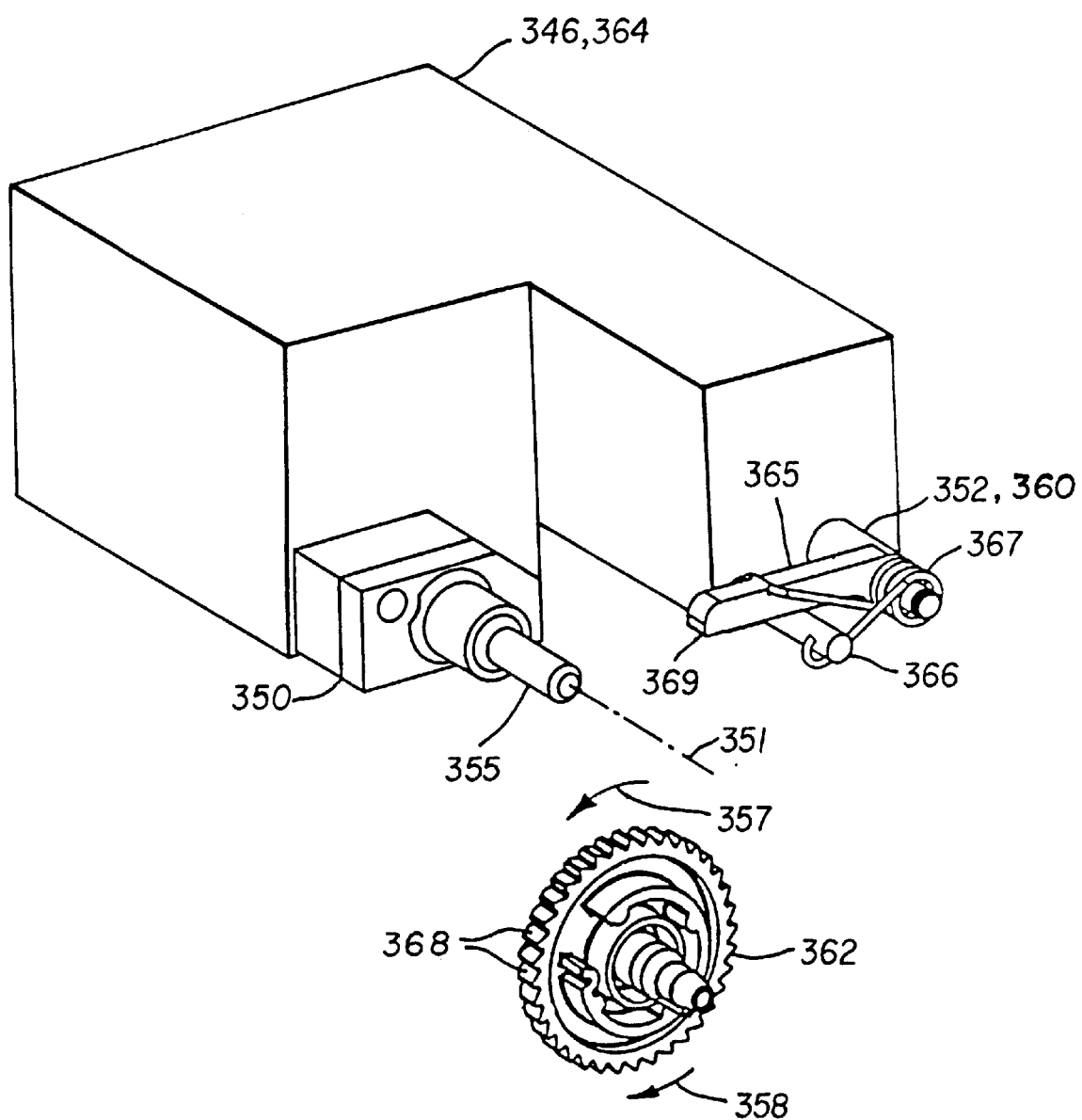
FIG. 67 is an enlargement of the view of the thumbwheel aligner of the cartridge positioner-thruster of FIG. 66. The view is partially exploded (the thumbwheel is shown displaced from the aligner).
Figure 68:
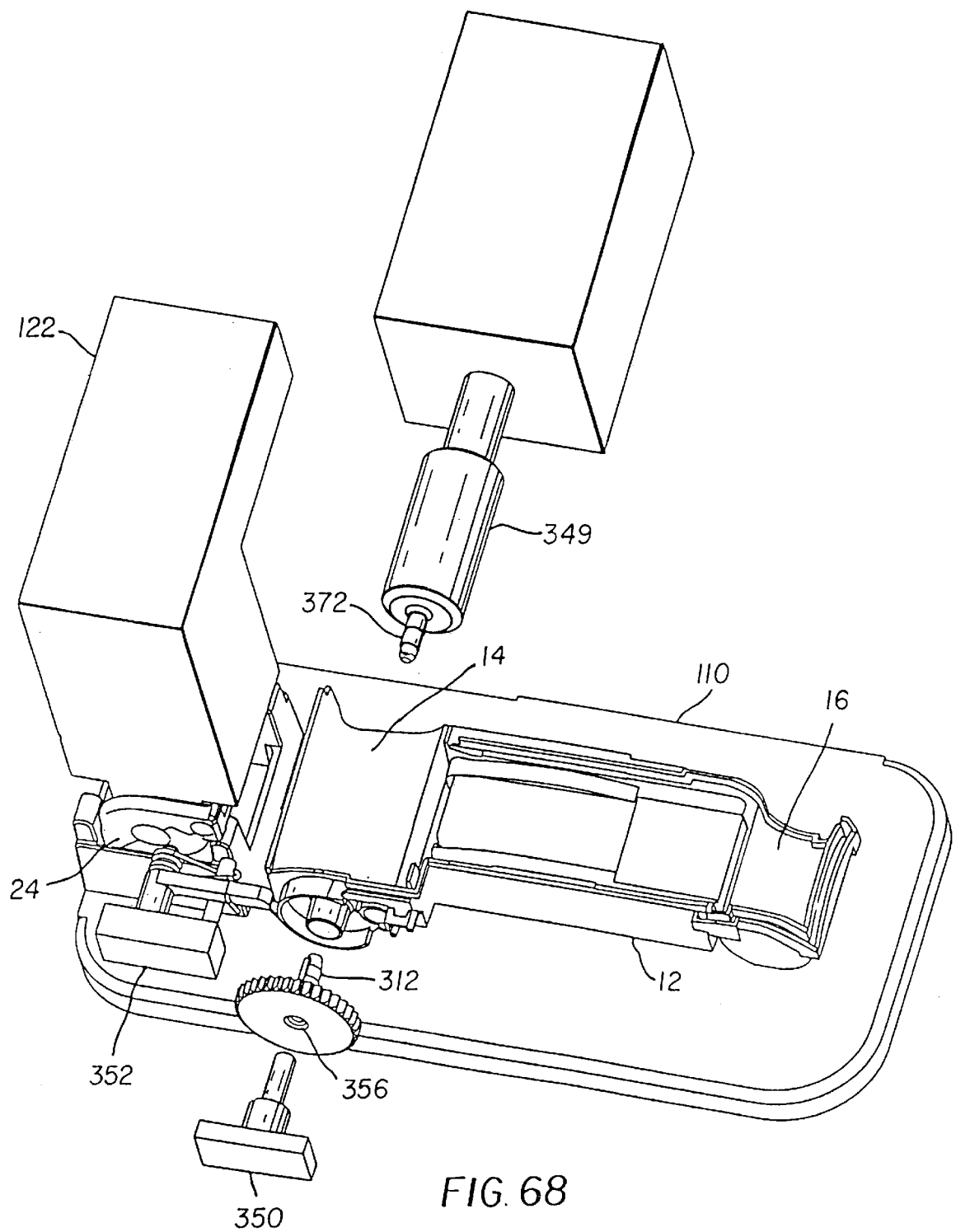
FIG. 68 is a perspective view of the cartridge positioner-thruster of FIG. 67 showing the cartridge being picked up from a nest by a cartridge mover. For clarity, the view is partially exploded (a jack of the aligner and the thumbwheel are displaced from the camera frame assembly and each other).
Figure 69:
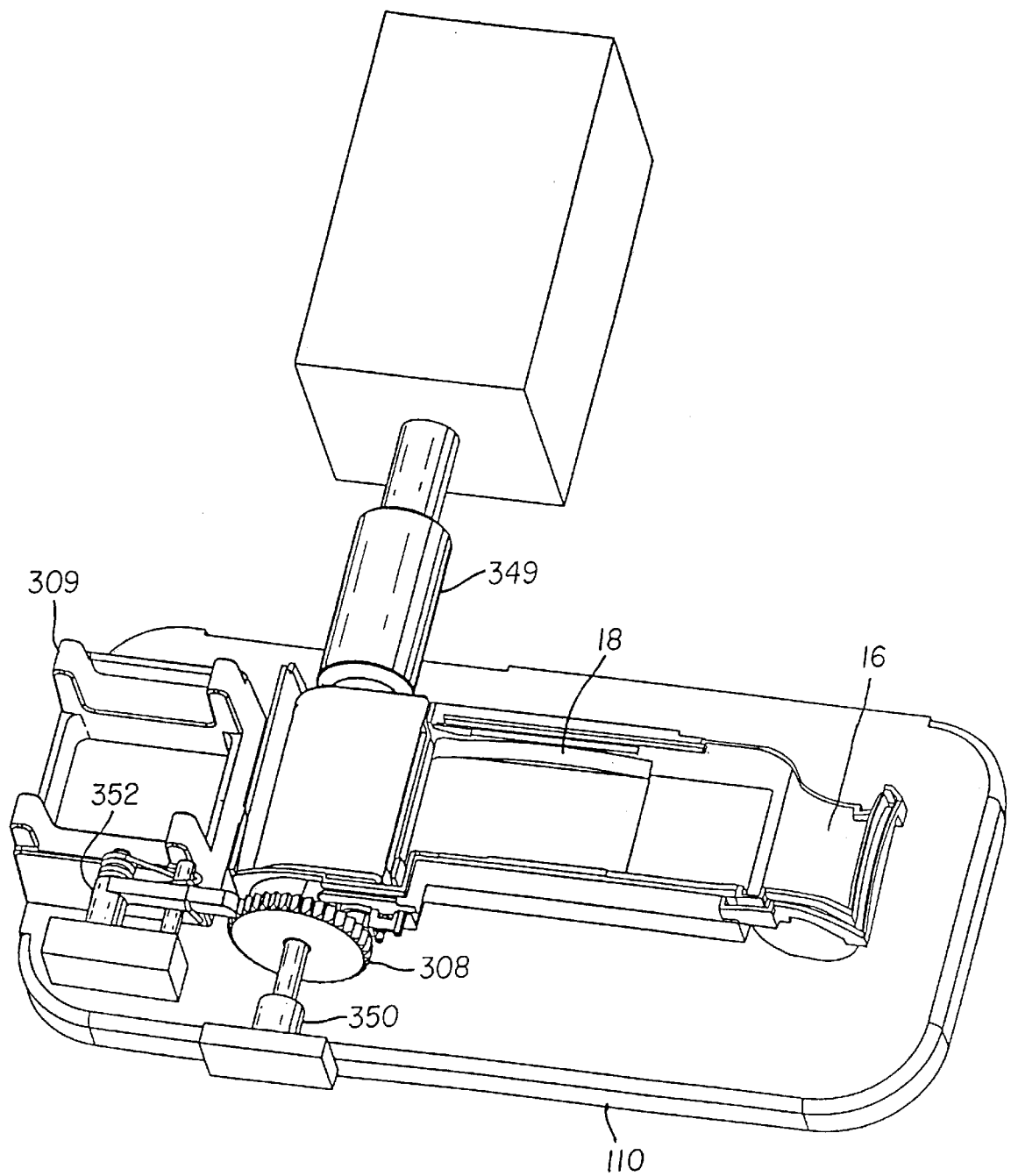
FIG. 69 is the same view as FIG. 68, after positioning and axial lodging of the cartridge in the film roll chamber.
Figure 70:
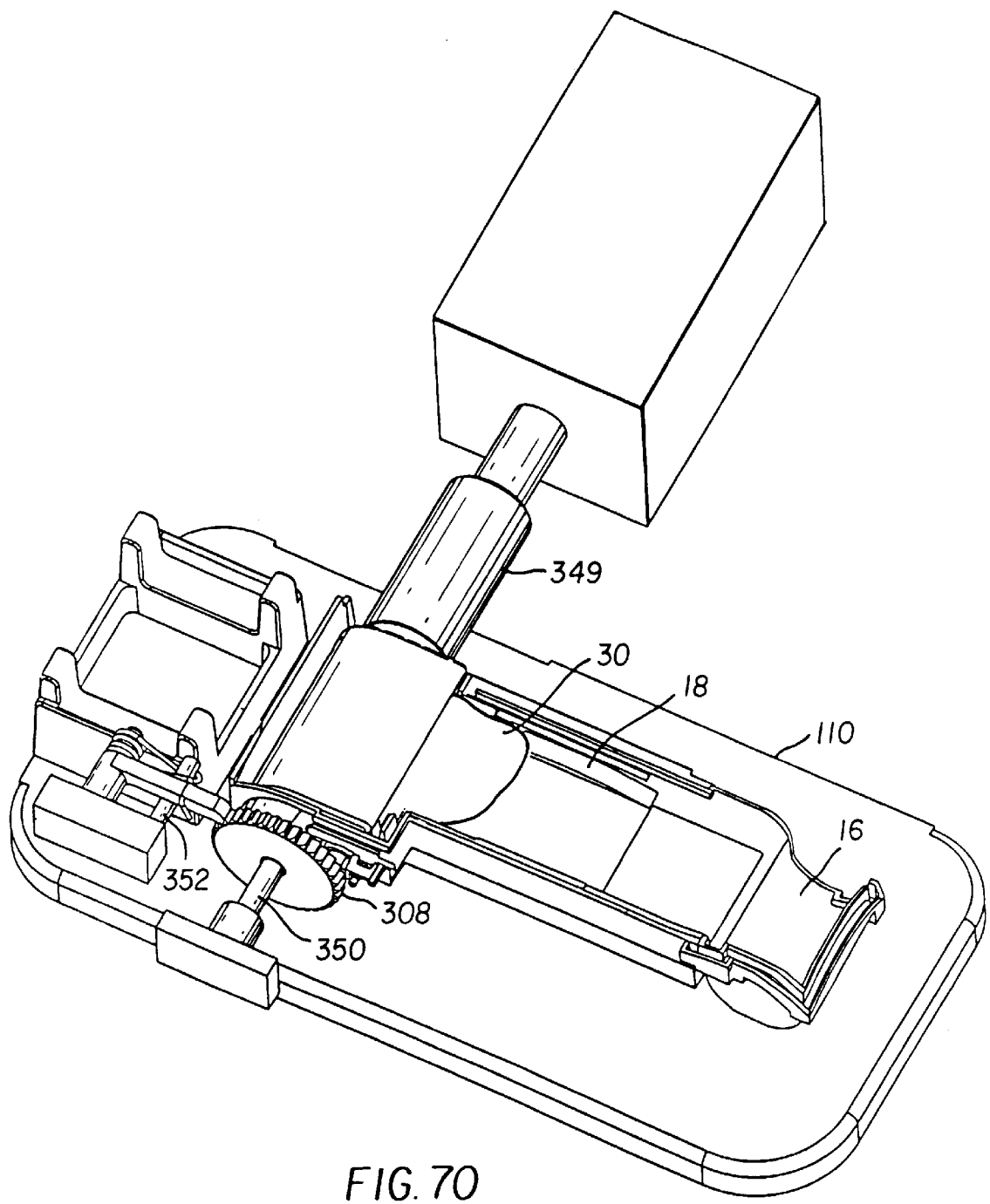
FIG. 70 is the same view as FIG. 69, after thrusting of the leading portion of the filmstrip from the film cartridge.
Figure 71:
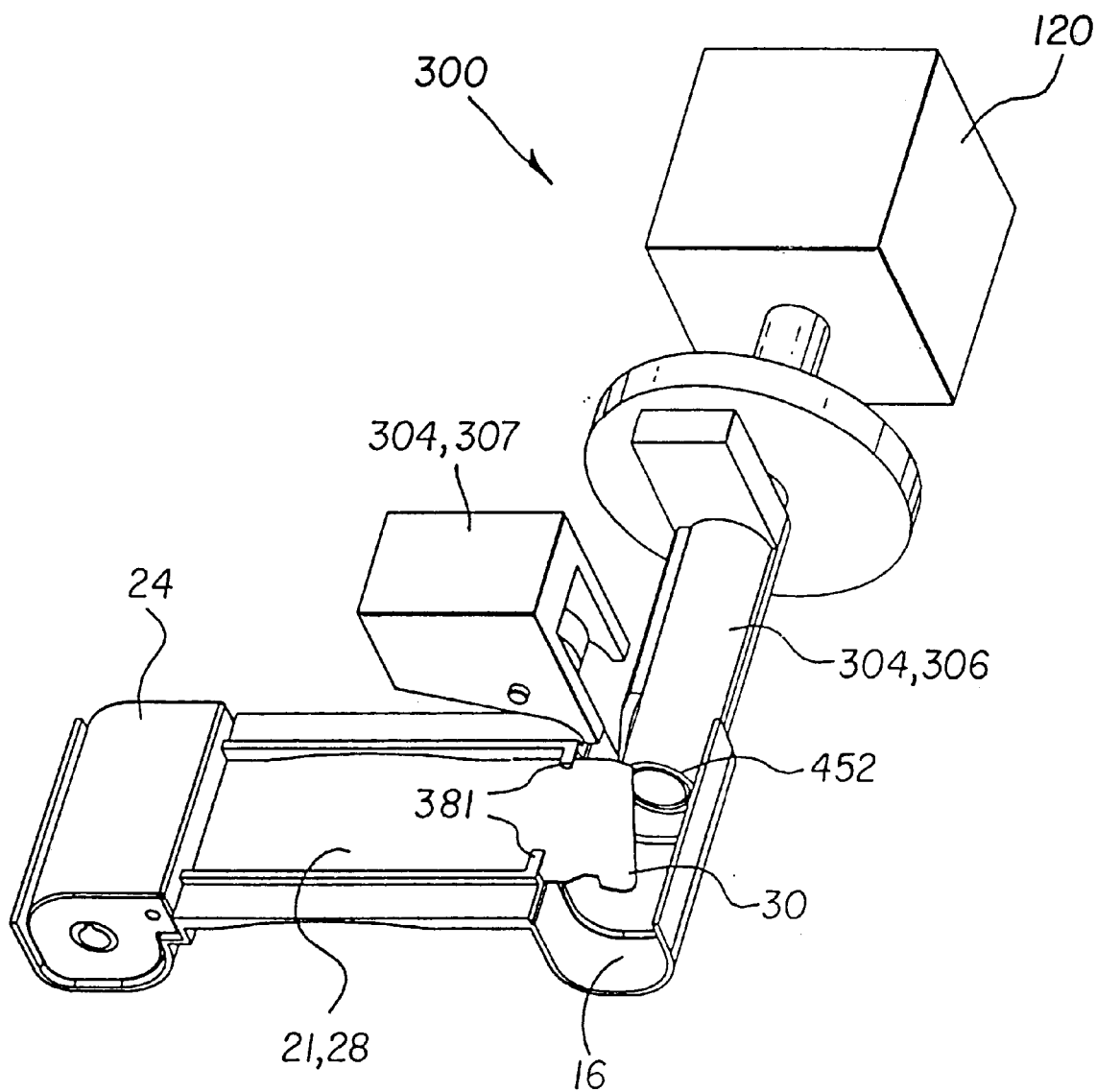
FIGS. 71–74 are semi-diagrammatical perspective views of different stages of film winding in a mandrel and guide film loader.
Figure 72:
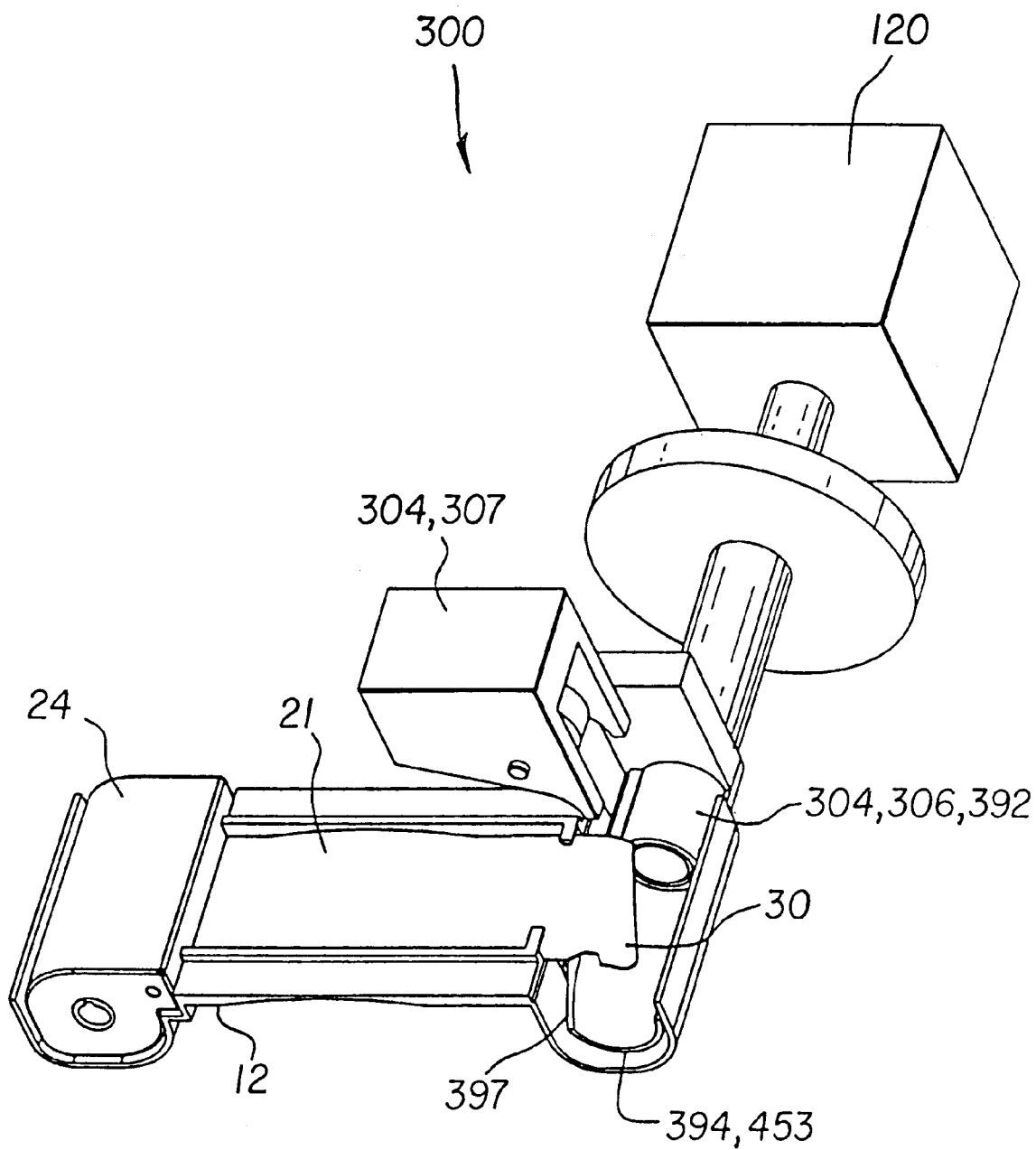
Figure 73:
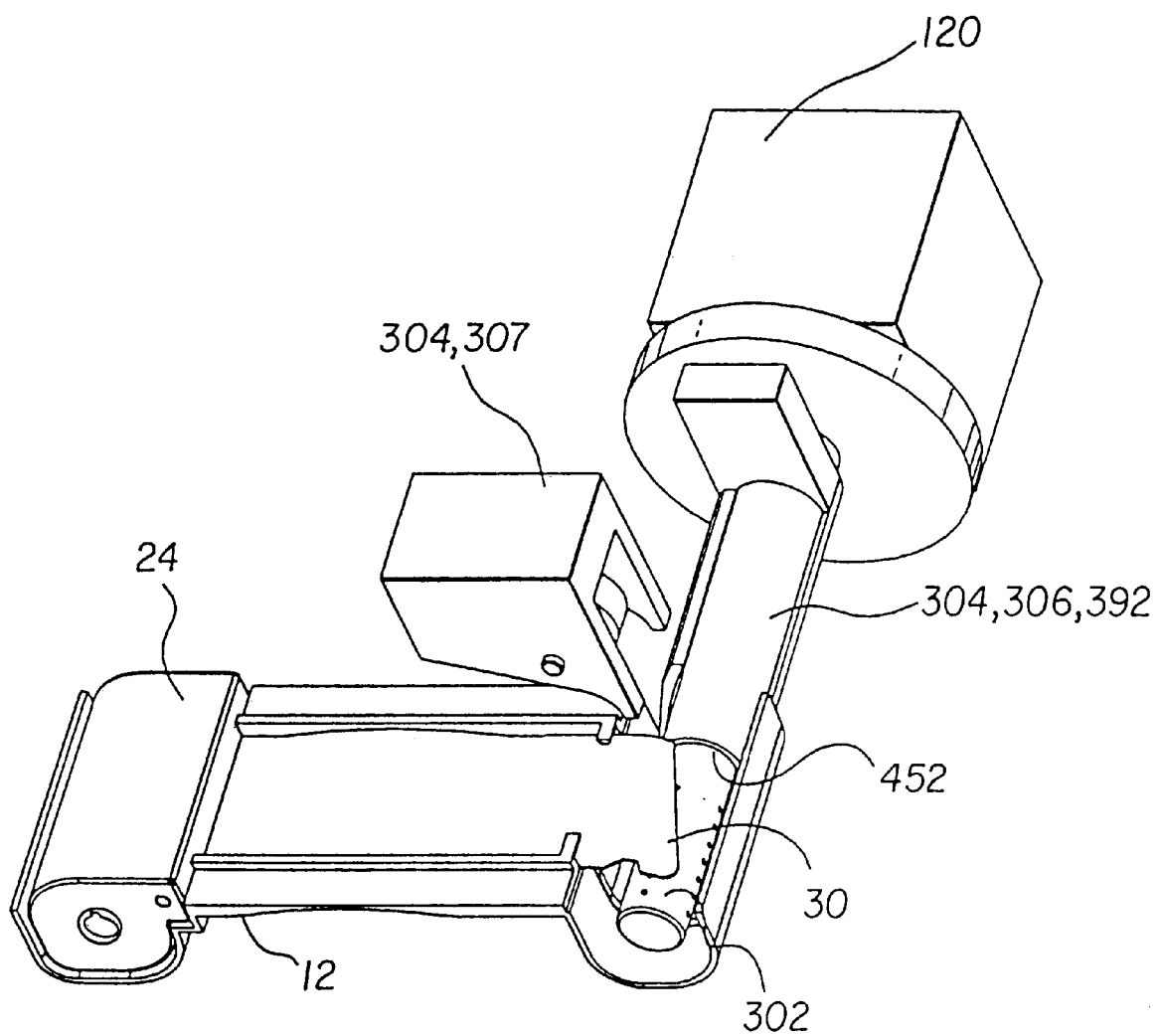
Figure 74:
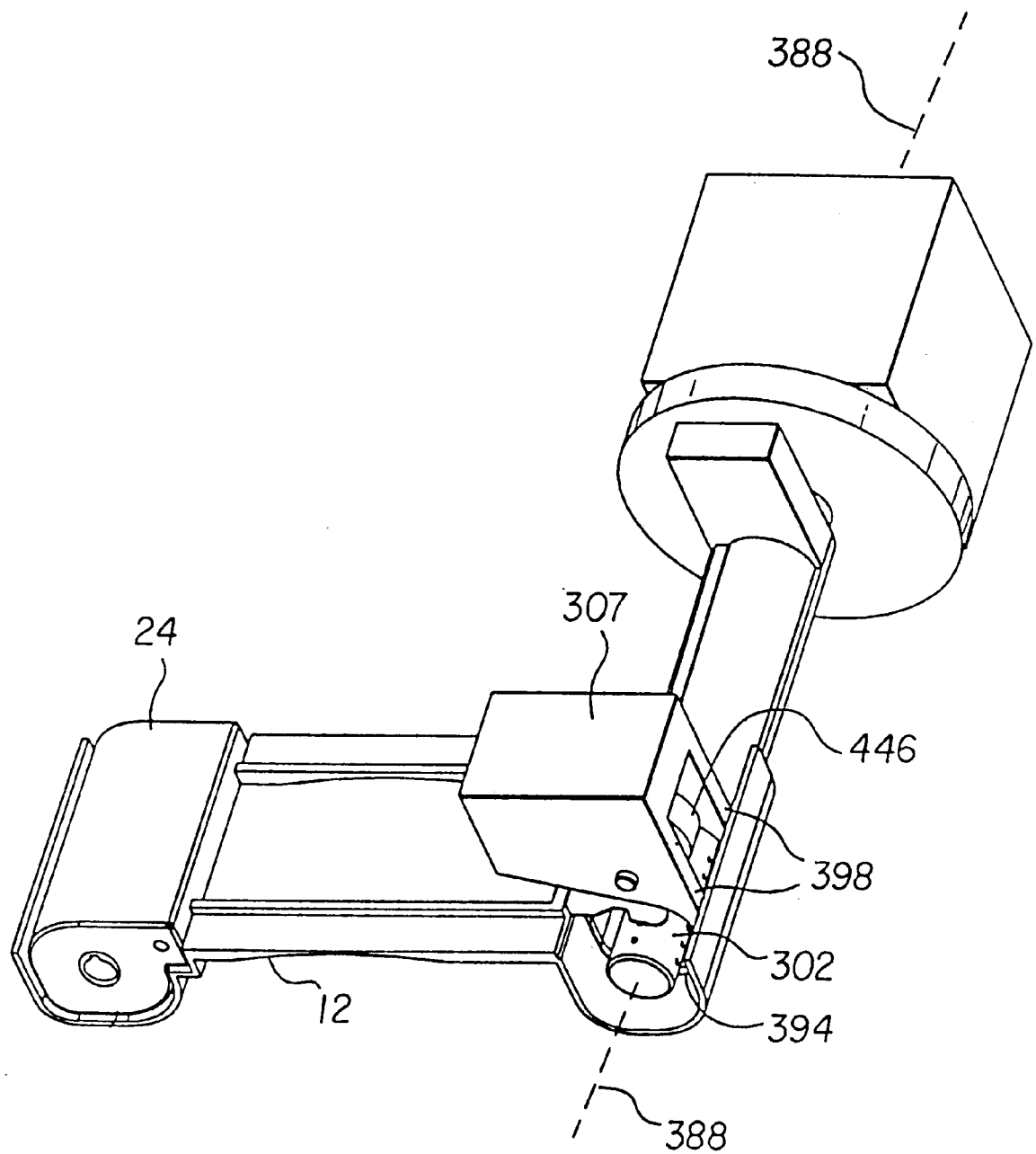

The one-way mechanism 352 permits the thumbwheel 308 to rotate about the jack axis 351 in a thrust direction, indicated in FIG. 67 by arrow 357, but deters rotation of the thumbwheel 308 about the jack axis 351 in a rewind direction, indicated by arrow 358. The rewind direction of rotation is the direction of rotation that, if applied to the cartridge 24, would rotate the cartridge spool 27 to withdraw an extended filmstrip 21 back into the cartridge 24. With a thrust type film cartridge, this direction is also opposite to that of film thrusting. Detailed characteristics of the one-way mechanism are not critical. A variety of one-way mechanisms are well known having a wide variety of features, for example, the one-way mechanism can be a ratchet and pawl mechanism that is unitary with the jack. It is currently preferred, however, that the one-way mechanism 352 be a ratcheting pawl, as shown in FIG. 67. The ratcheting pawl 360 is discrete from the jack 350, and that the thumbwheel 308 has a toothed margin 362 adapted to act as a ratchet wheel for the ratcheting pawl 360. In this embodiment, the ratcheting pawl 360 and jack 350 are each joined to a rigid support 364, in fixed relation to each other. The ratcheting pawl 360 has a lever arm 365 that is pivotably mounted to the support 520 and is disposed to engage the thumbwheel 308. The ratcheting pawl 360 is biased toward the thumbwheel 308. A stop 366 limits rotation of the lever arm 365 when the thumbwheel 308 is not present. Biasing is provided by a spring 367 that engages the lever arm 365 and the stop 367. The teeth 368 of the thumbwheel 308 and an engagement portion 369 of the lever arm 365 are shaped so as to permit rotation in the thrust direction, but deter rotation in the rewind direction. This embodiment of the oneway mechanism has the advantages of simplicity and that wear can be largely limited to the thumbwheel, which can be replaced as necessary during camera recycling.

After engagement of the thumbwheel 308 and spool 27, and spool 27 and quill 349; the direction of rotation of the quill 349 is reversed and the quill 349 is driven by the quill motor 375 in a forward direction (indicated by arrow 376), rotating the cartridge spool 27 and thrusting a leading portion 28 of the filmstrip 21 from the cartridge 24. The thumbwheel 308 rotates in the thrust direction with the cartridge spool 27. This can be most conveniently accomplished at the same assembly station 118 as was used for seating the cartridge 24. Thrusting can be continued until the leading portion 28 of the filmstrip 21 is disposed over the intermediate section 18 or until the leading portion 28 reaches the film roll chamber 16.

Figure 64:
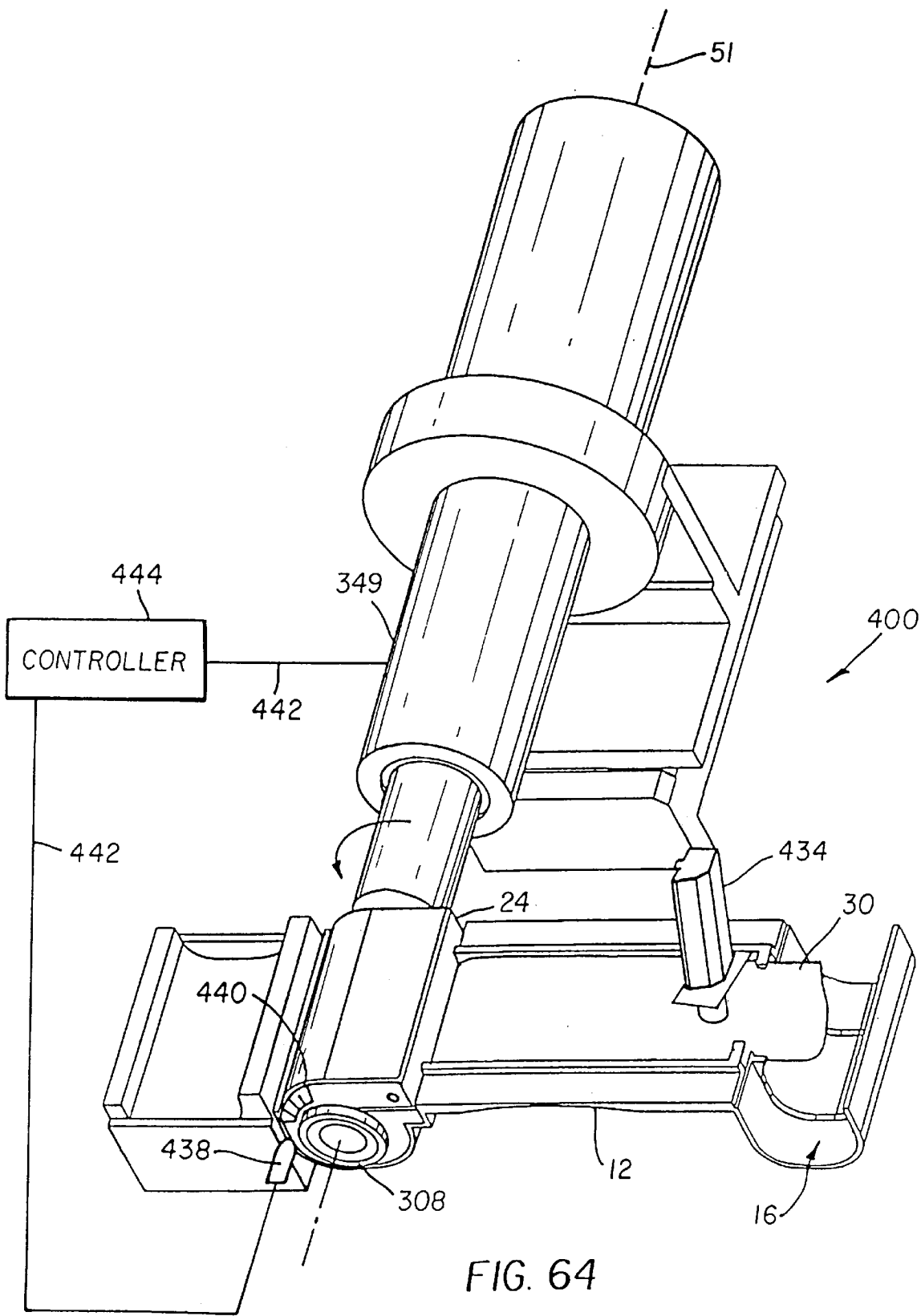
FIG. 64 is a perspective view of a spool repositioner of another film loading apparatus, a camera frame assembly, and part of the pallet. For clarity, the active light lock closer of the camera frame assembly is not shown. The guard is also not shown.
Figure 65:
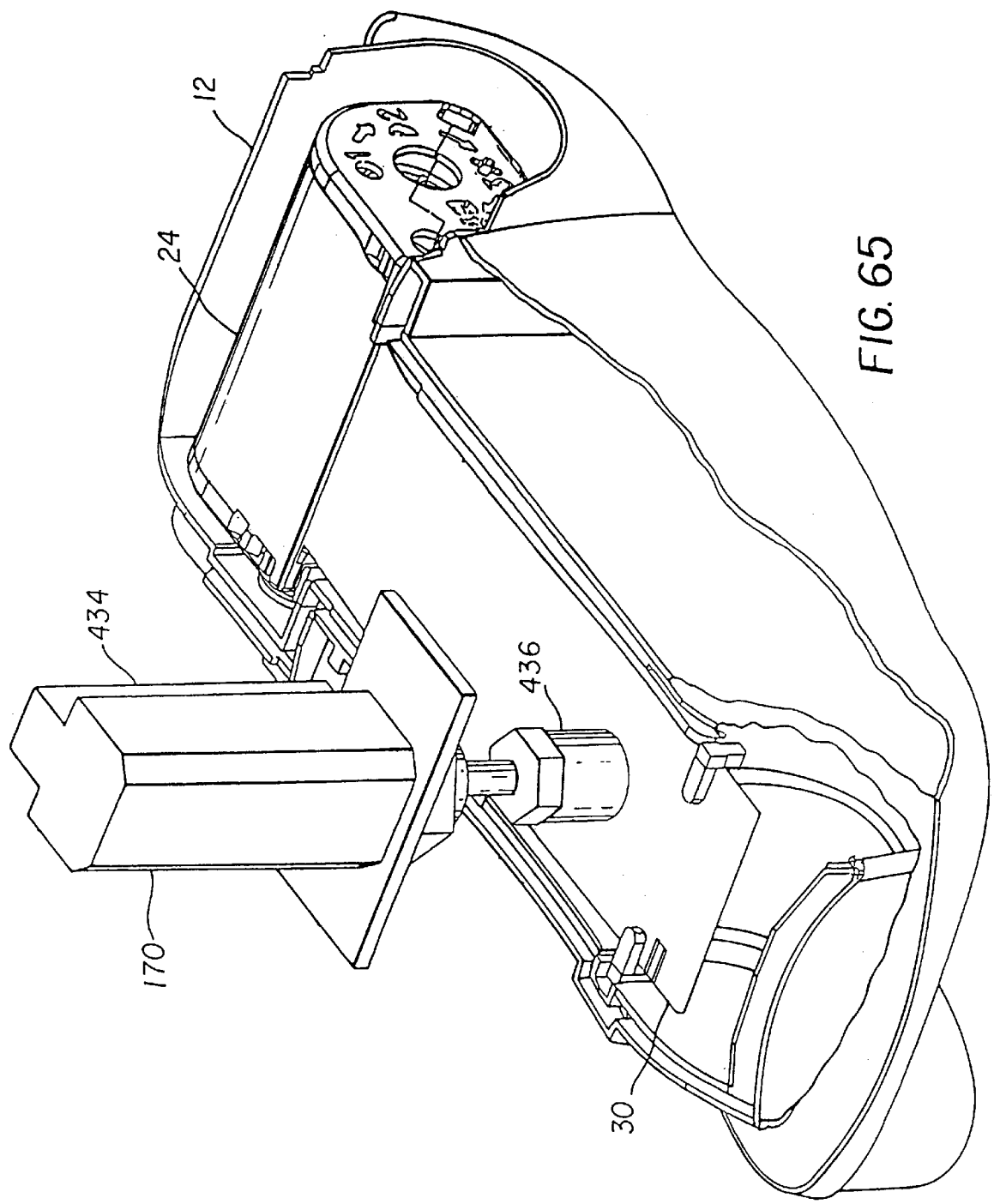
FIG. 65 is a perspective view of the holder of the spool repositioner of FIG. 64.
Figure 66:
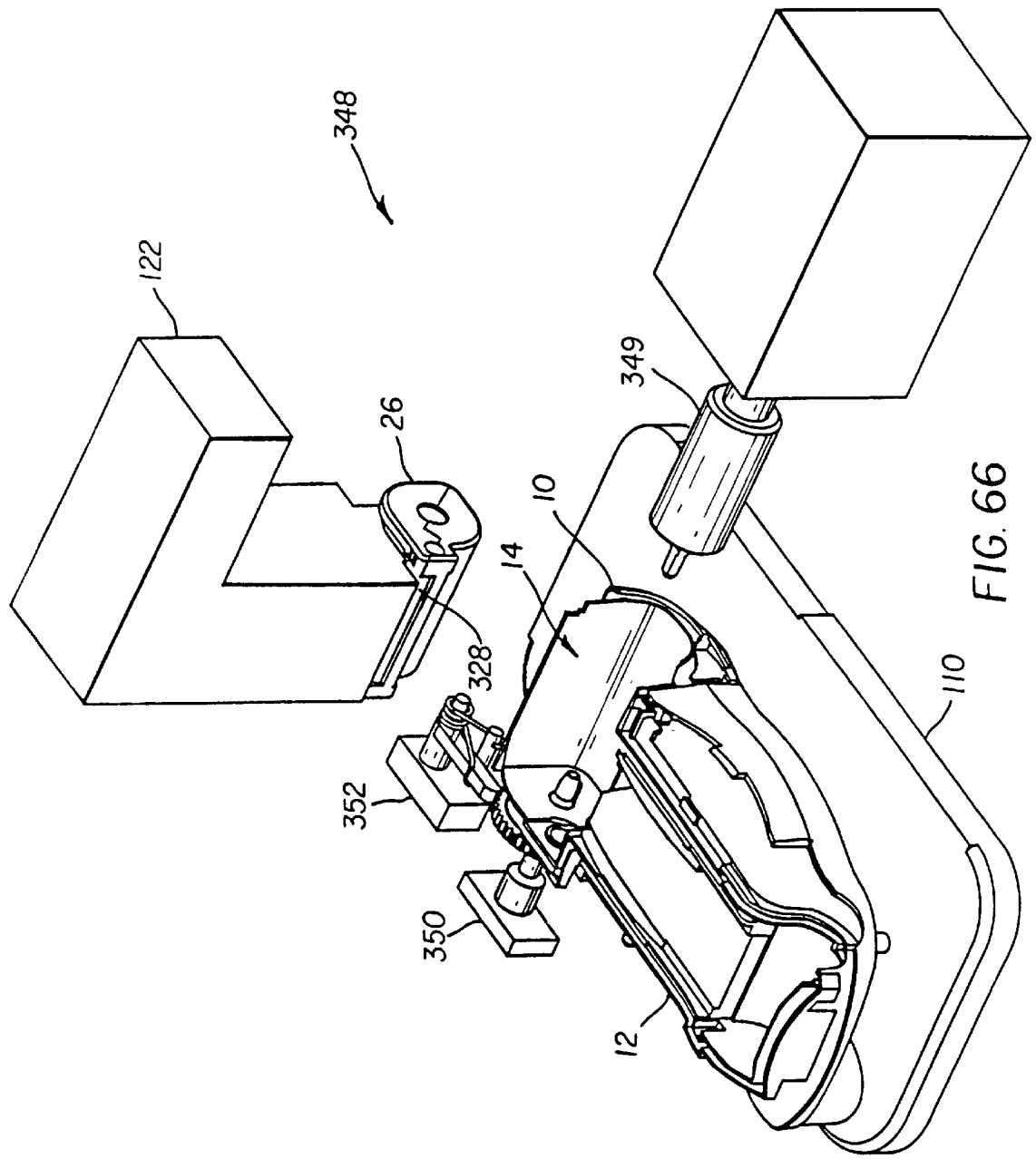
FIG. 66 is a perspective view of a cartridge positioner-thruster of another film loader. The receiver of the apparatus and a camera frame assembly are also shown. The guard of the camera frame assembly is not shown.

Referring now to FIG. 64–65, in a particular embodiment, the apparatus 300 includes a spool repositioner 400. The spool repositioner 400 is used to prevent active light lock closing during transport between stations 118. The spool repositioner 400 can be disposed in a separate station 118 or as a part of a previously described station. The spool repositioner 400 has a quill 349 that is moved into engagement with the film cartridge spool 27, in the same manner as the quill 349 previously described. The spool repositioner 400 also has a holder 434 that has a grip head 436 that is moved toward and away from the intermediate section 18 of the camera frame assembly 10. The spool repositioner 400 is used after the leading portion 28 of the filmstrip 21 has been advanced over the intermediate section 18 by a film transporter in the manner previously described. The holder 434 has a linear actuator 120 that advances the grip head 436 to an active position. In the active position, the grip head 436 engages the leading portion 28 by friction or by suction supplied by a vacuum line (not shown) and holds the leading portion 28 in a fixed position within and relative to the intermediate section 18 of the camera frame assembly 10. The spool repositioner 400 has a sensor 438 that is directed towards a spool position indicator 440 at the end of cartridge 24 or toward an indicator (not shown) provided as a part of the quill 349, such as a digital shaft encoder. (Spool position indicators are well known to those of skill in the art and are present on Advanced Photo System™ film cartridges.) The sensor 438 detects the position of the spool 27 and thumbwheel 308 relative to the drive unit 322 and sends a signal along a signal path 442 to a controller 444. The controller 444, in response, actuates the drive of a quill 349 and rotates the spool 27 and thumbwheel 308 to provide a required net rotation of less than 360 degrees. The degree of rotation is that necessary to ensure that the cartridge spool 27 is parked in the safety zone, that is, that the follower 336 of the ALL closer 318 is positioned on the cam surface 320. It is currently preferred to park the spool 27 at the approximate middle of the C-shaped cam surface 320. It is preferred that rotation be in the rewind direction only, since rotation in the thrust direction presents a risk of film bunching or other distortion. The controller 444 of the quill 349 drive can include a load sensor to detect when the filmstrip 21 is taut and deactivate the quill 349. After spool repositioning, the camera frame assembly 10 can be transported, as desired, and the thrusting of the film can be continued until the free end 30 of the filmstrip 21 is impelled into the film roll chamber 16. A detector 329 can be positioned to sense optically or in some other manner when the free end 30 reaches the film roll chamber 16 and signal the controller (not shown) to stop thrusting.

Figure 57:
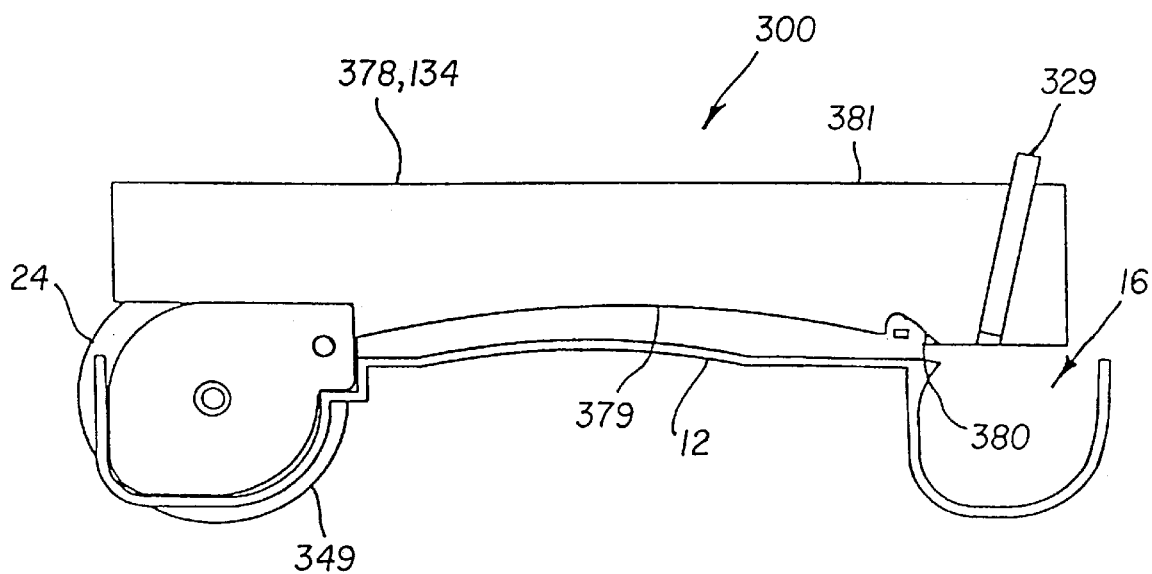
FIG. 57 is a semi-diagrammatical vertical cross-section of the film transport component and camera frame assembly of FIG. 56.
Figure 58:
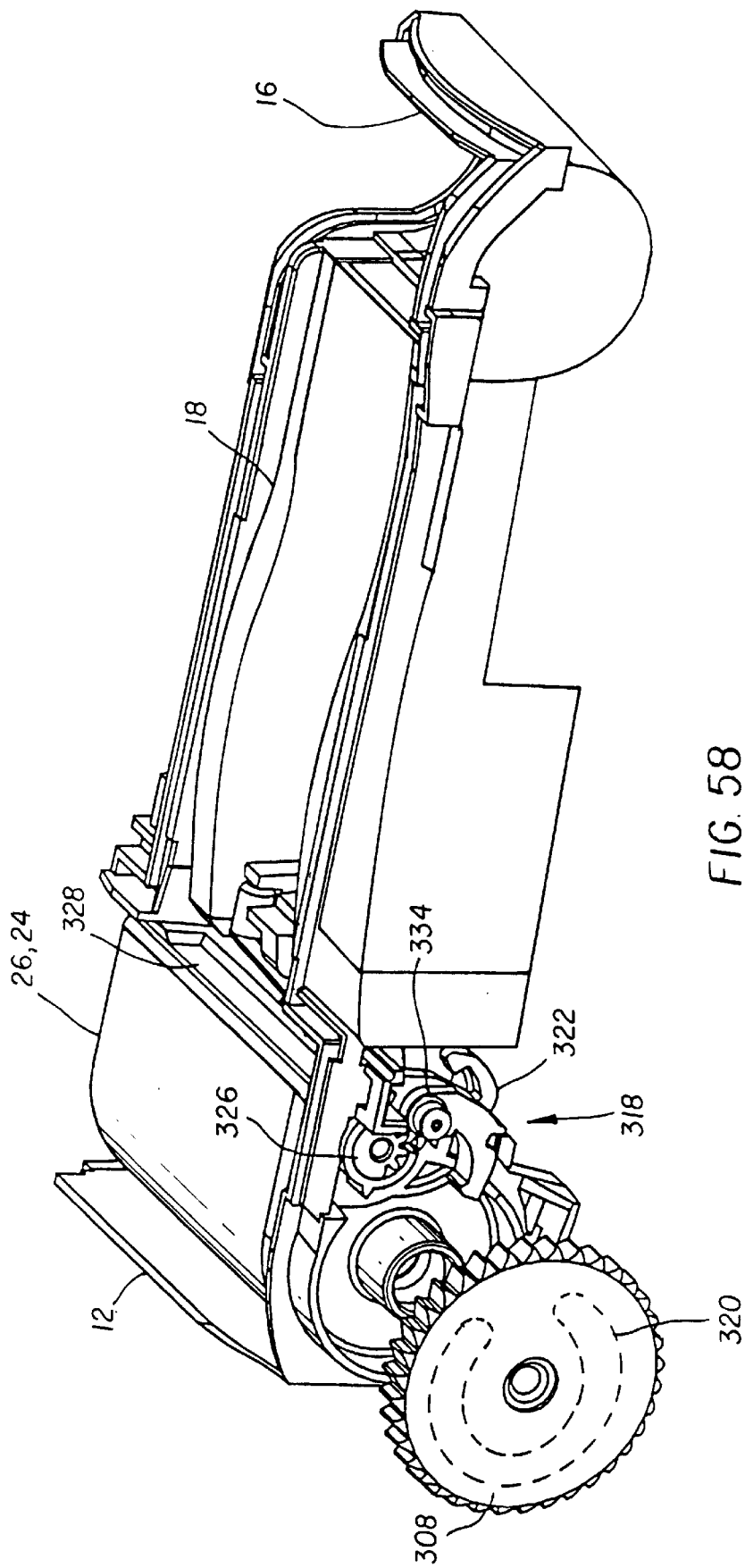
FIG. 58 is a top, rear perspective view of a particular camera frame assembly. The cartridge is shown in engagement with the thumbwheel; however, for clarity, the view is partially exploded (the thumbwheel is shown displaced from the camera frame assembly) and the sensor lever is not shown. The guard is also not shown.
Figure 59:
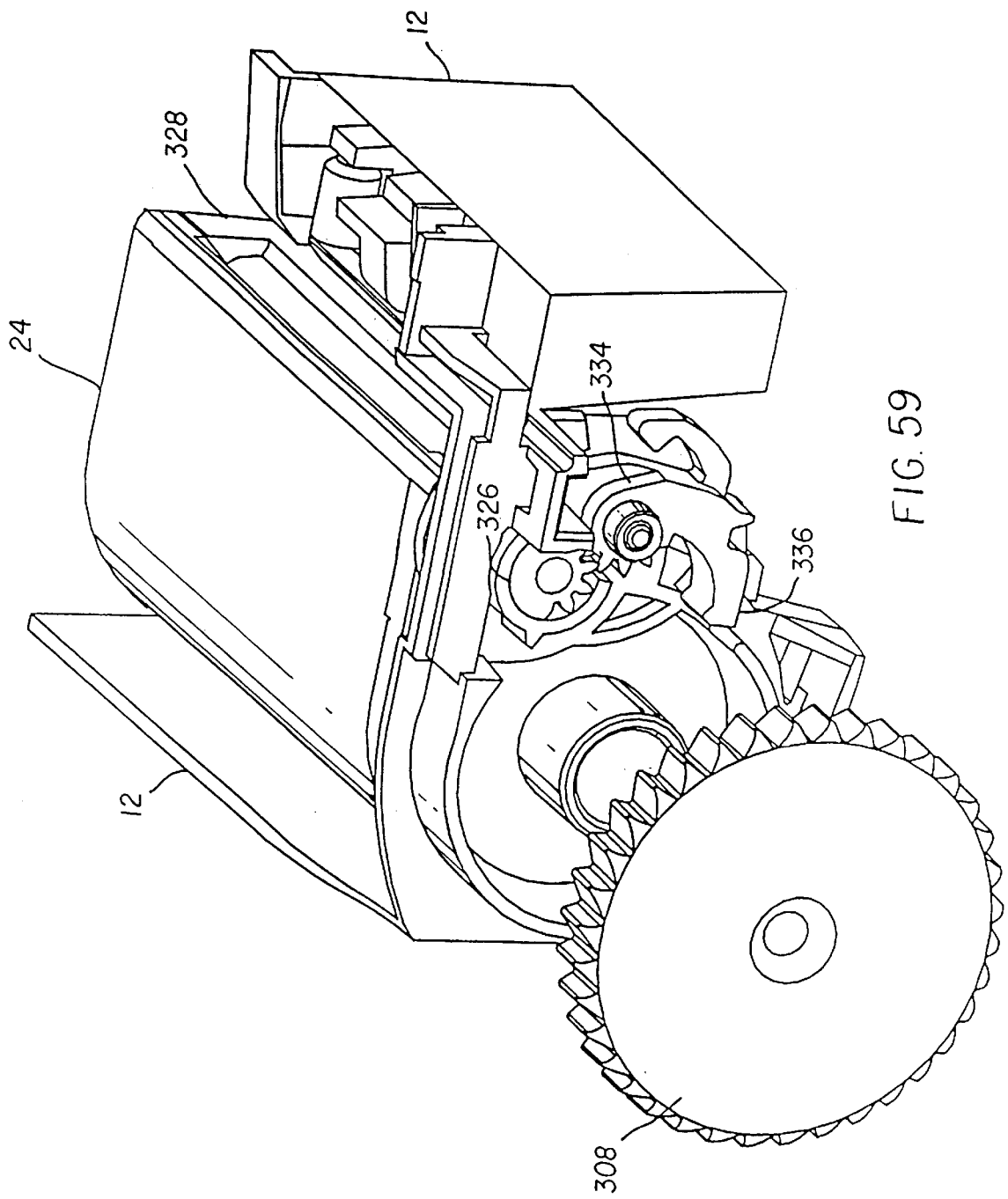
FIG. 59 is a partial enlargement of the view of FIG. 58. The drive unit is in a film sensed position.
Figure 60:
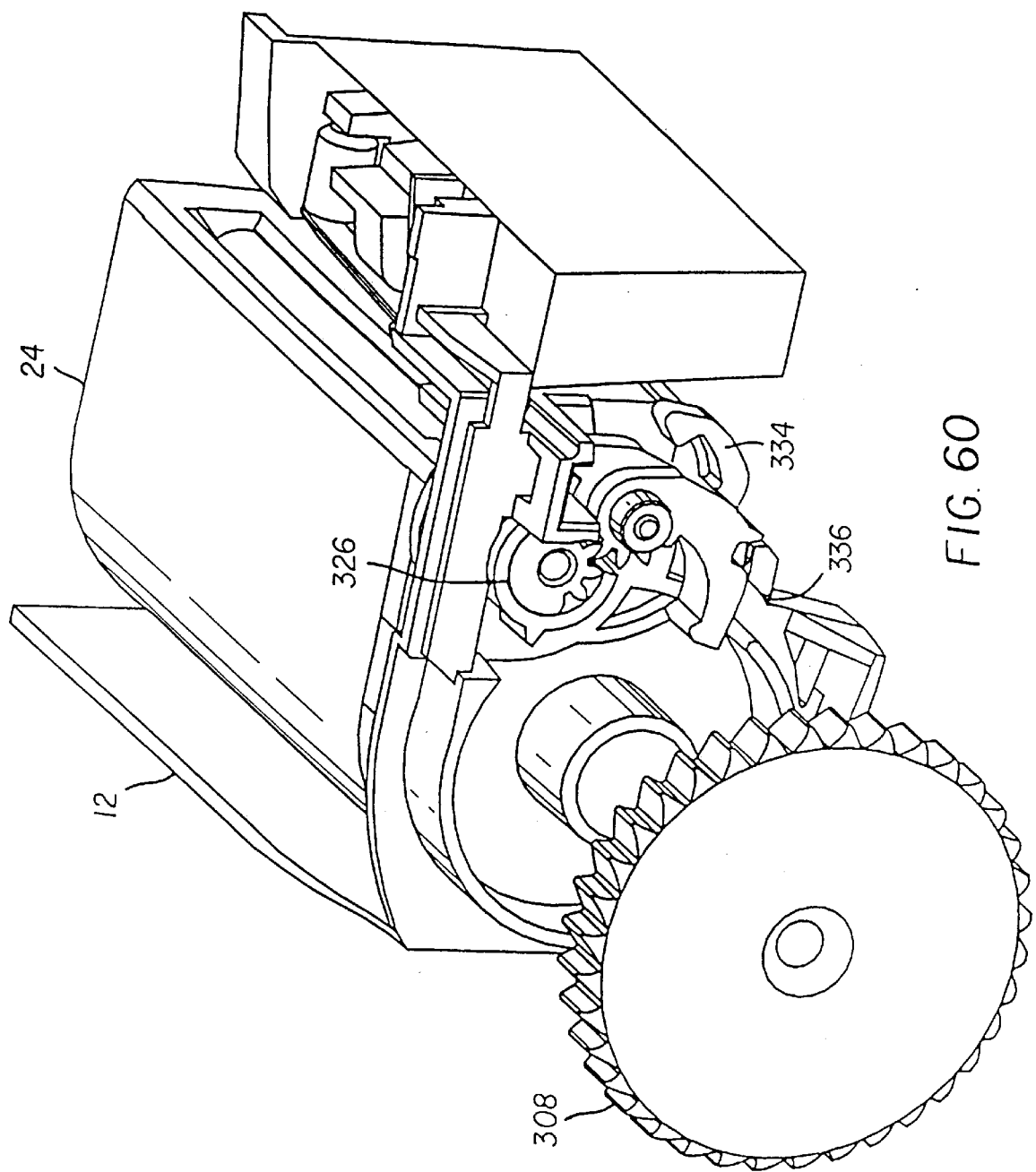
FIG. 60 is the same view as FIG. 59, but the drive unit is in a film absent-light lock open position.
Figure 61:
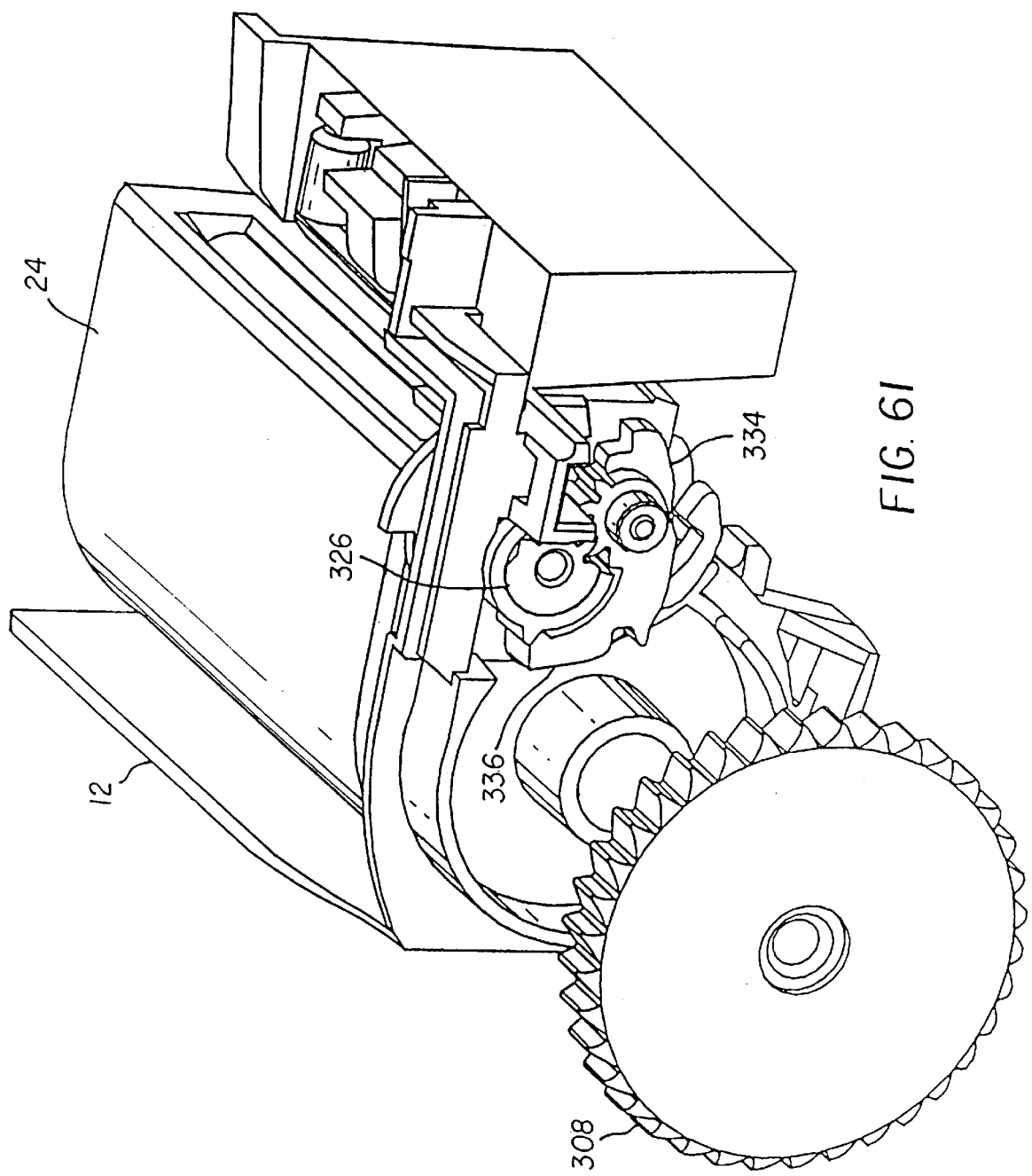
FIG. 61 is a partial enlargement of the view of FIG. 58, but the drive unit is in a film absent-light lock closed position.
Figure 62:
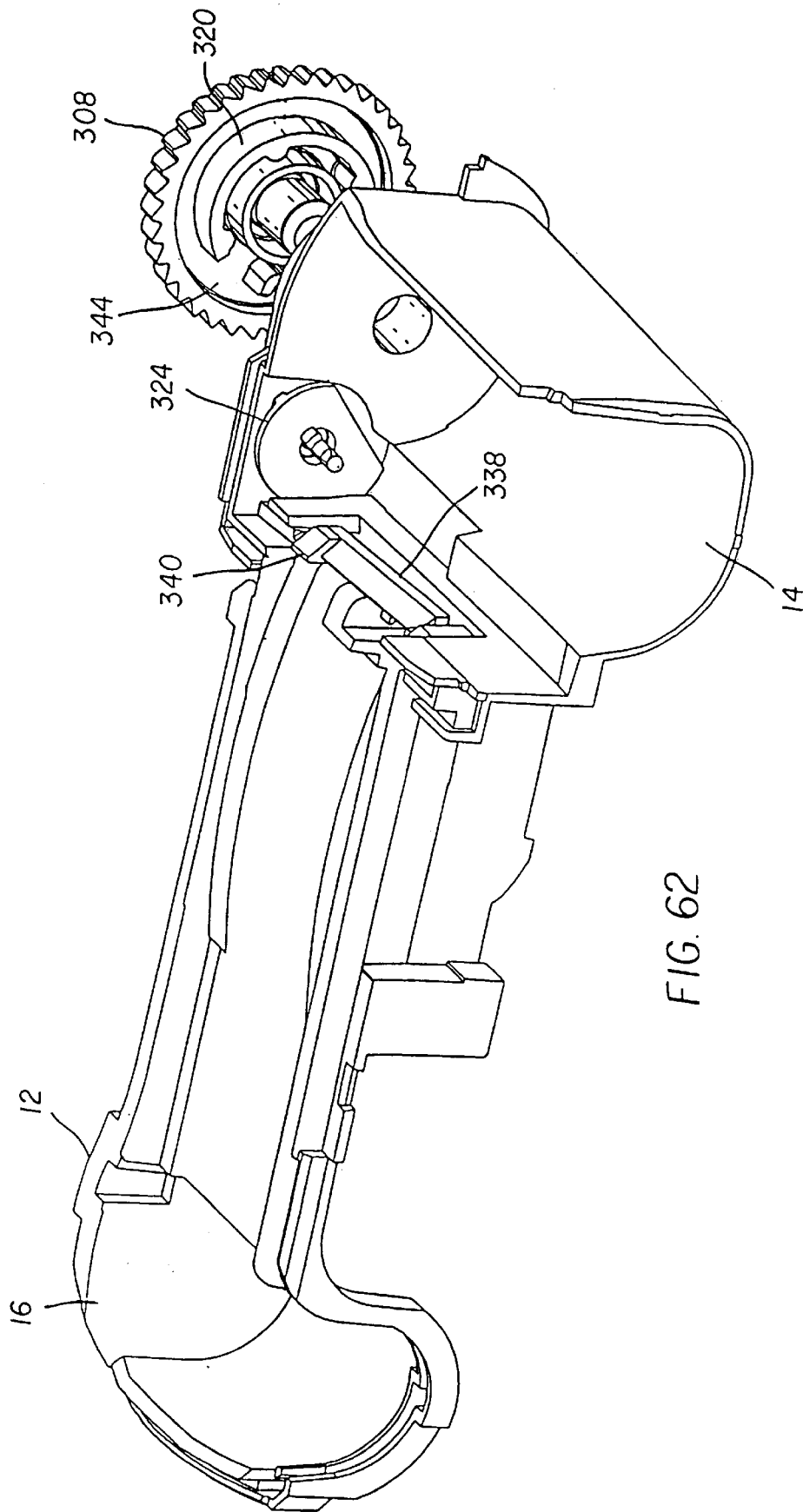
FIG. 62 is a bottom, rear perspective view of the camera frame assembly of FIG. 58. The drive unit and sensor lever are shown in the film sensed position.
Figure 63:
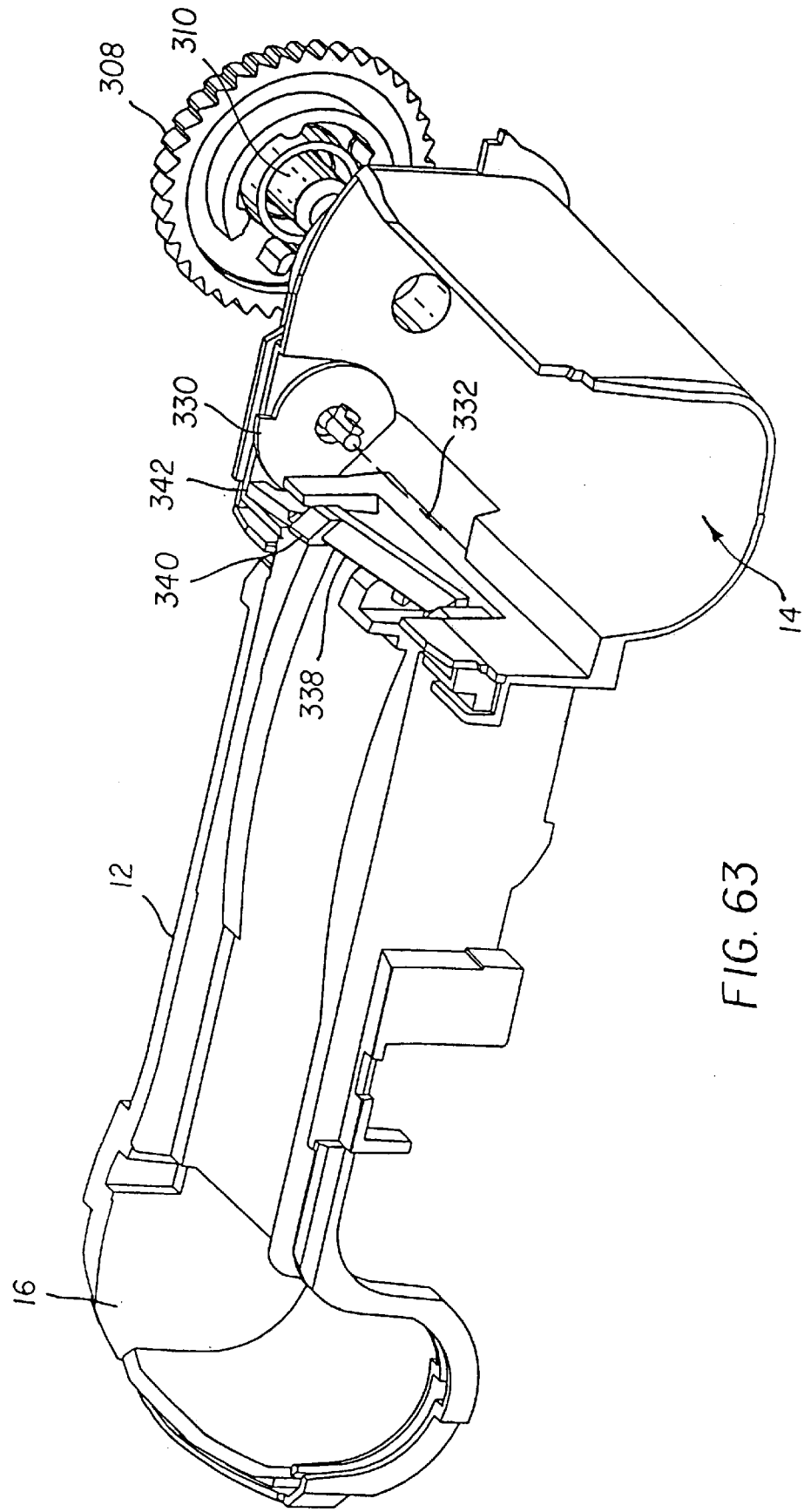
FIG. 63 is the same view as FIG. 62, but the drive unit and sensor lever are shown in the film absent-light lock closed position.

Referring now to FIG. 57, in some embodiments, a film guiding member 378 that incorporates a film bridge 134 is next moved, relative to the frame assembly 10, to an active position over the intermediate section 18 of the frame assembly and the film is transported, in the same manner as in previously described film loading methods. The film guiding member 378 is lowered into position over the intermediate section 18 of the frame assembly 10, by a linear actuator 120, prior to or during film thrusting, at the same station as is used for cartridge 24 seating or at a succeeding station. The film guiding member 378 has a concave bottom 379 overlying the intermediate section 18. The film guiding member 378 can have pockets 380 to receive film retention fingers 381 or part of the guard 54. A detector 329 can be conveniently housed in the film guiding member 378.

Referring now particularly to FIGS. 71–75, after the free end 30 of the leading portion 28 of the filmstrip 21 has been advanced to the film roll chamber 16, the frame assembly 10 is moved to another station 118. In this station 118, a mandrel 302 or a spool attached to the apparatus 300, is introduced into the film roll chamber 16 along with one or, preferably, a plurality of film guides 304. The guides 304 define a substantially cylindrical preliminary roll space 383 within the film roll chamber 16, centered on the mandrel 302. The preliminary roll space 383 has a radius 384, (referred to hereafter a the "preliminary radius 384") that is predetermined by the internal configuration of the film guides 304. The leading portion 28 of the filmstrip 21 is transported into the preliminary roll space 383 and curled about the mandrel 302 and a curling axis (indicated by a cross 385 in FIG. 75). The curling axis 385 is disposed within the film roll chamber 16 and is, at the time of curling, coextensive with the axis of rotation of the mandrel 302.

The guides 304 are interposed between the interior wall 386 of the film roll chamber 16 and the mandrel 302 and both guide the leading portion 28 of the filmstrip 21 around the mandrel 302 and limit deflection of the filmstrip 21 in directions radial to the common axis of rotation of the mandrel 302 and the curling axis 385. The initial turn (not separately shown) of the filmstrip 21 is cinched to the mandrel 302, the guides 304 are retracted from the film roll chamber 16 (in currently preferred embodiments in a direction parallel to the curling axis 385, and the majority of the filmstrip 21 is wrapped around the initial turn to form a film roll 50.

The mandrel 302 is preferably a vacuum mandrel, that is, a hollow cylinder perforated on the longitudinal surface by air passages 387 and is connected to a vacuum pump or negative air pressure source (not shown). As the leading portion 28 of the filmstrip 21 curls about the mandrel 302, the vacuum urges the filmstrip 21 into contact with the mandrel 302. The mandrel 302 is rotated about the mandrel axis 388, starting either before or after the free end 30 of the filmstrip 21 contacts the mandrel 302 and the leading portion 28 of the filmstrip 21 is overlapped and cinched against the mandrel 302, after which the main portion 32 of the filmstrip 21 is wound over the first turn of film roll.

Referring now to FIGS. 71–75, one or more film guides 304 surround the mandrel 302, in directions radial to the mandrel axis 388, except for an entry 390 through which the filmstrip 21 is admitted. In these embodiments, the film guides 304 preclude the leading portion 28 of the filmstrip 21 from deflecting in directions radial to the mandrel axis 388 beyond a preliminary radius 384 defining the limits of the preliminary roll space 383. The leading portion 28 of the filmstrip 21 is thus isolated from the interior wall 386 of the film roll chamber 16 as the leading portion 28 is curled about the mandrel 302 and cinched. The mandrel axis 388 and preliminary film space axis are coextensive. The mandrel 302 can be lowered into the film roll chamber 16 during film winding to maintain tangency between the outermost turn of the film roll and the section of the filmstrip 21 entering the film roll chamber 16. In particular embodiments, the frame 12 has film retention fingers 381 or similar portions of a guard and the mandrel 302 is kept in a central position within the film roll chamber 16 during film winding. The latter approach has the advantage of requiring simpler equipment for moving the mandrel 302.

In a particular embodiment, shown in FIGS. 71–75, in which the mandrel 302 is kept in a fixed position, the mandrel 302, preliminary roll space 383, and film roll chamber 16 all have a common axis. In this embodiment, the assemblage of guides 304 includes separable upper and lower guides 392,394, respectively. It is preferred that the lower guide 394 is an arcuate partial sleeve or cinch sleeve having a C-shaped cross-section. The partial sleeve 394 has a concave inner surface that is smooth or otherwise configured to present a low frictional load to the filmstrip 21. The inner surface 395 of the partial sleeve 394 closely adjoins the mandrel 302. In a particular embodiment the separation is a few times the thickness of the filmstrip 21, about 1 mm. The partial sleeve 394 is coaxial or substantially coaxial with the mandrel 302 and extends around more than half (more than 180 degrees) of the interposed mandrel 302. The lower guide 394 has a distal edge 396 that is at least roughly parallel to the mandrel axis 388 and a horizontal diameter of the mandrel 302. The lower guide 394 has a medial edge 397 that is roughly parallel to the mandrel axis 388 and an imaginary horizontal line tangent to the mandrel 302. (Terms "horizontal" and "vertical" and the like, are used herein in a relative sense in which the longest dimension of the frame assembly defines a "horizontal" direction. Actual orientations may vary as desired, taking into account the effect of gravity on loose parts.)

It is preferred that the upper guide 392 is a guide shoe that is movable independent of the partial sleeve 394. The guide shoe 392 has an arm 398 that extends down and closely adjoins or contacts the distal edge 396 of the partial sleeve 394. The arm 398 can be continuous or can be divided into two discontinuous portions as shown in FIGS. 71–75. The arm 398 has a concave, low friction inner surface 399. The arm 398 has a lower edge 401 that meets with the distal edge 396 of the partial sleeve 394 so as to present a guidepath to the filmstrip 21 that is substantially free of discontinuity. The lower edge 401 and distal edge 396 can meet so as to provide a continuous curve, interrupted only by a narrow seam. Alternatively, the lower edge 401 can extend radially inward beyond the distal edge 396 so as to define a guidepath for the filmstrip 21 in which the filmstrip 21 jumps the discontinuity between the edges 401,396. The latter approach has the advantage that slight misalignment errors do not present a risk of gouging the filmstrip 21.

The guide shoe 392 has a bearing member 446 medial (toward the left in FIG. 75) to the guide shoe arm 398. The bearing member 446 is positioned so as to be separated from the mandrel 302 by a nip 447 when the upper and lower guides 392,394 are in operating position within the film roll chamber 16 and the filmstrip 21 is in place between the mandrel 302 and the bearing member 446. The bearing member 446 can be compressible or resiliently mounted such that the nip 447 is at least partially a function of bearing member deflection during use or the bearing member can be a rigidly mounted, incompressible part. The bearing member 446 can be an immobile skid or bushing which the filmstrip 21 slides past. The bearing member 446 can also be a rotary member such as a driven roller or belt or the like, which rotates at the same or a different speed than the mandrel 302. There are disadvantages in driving the bearing member, however, since relative differences in the speed of the film and the bearing member present a risk of scuffing or other wear on the filmstrip 21. It is thus preferred that the bearing member be an unpowered rotary member, such as an idler roller 446 that freely rotates with the passage of the filmstrip 21 and presents a low frictional load to the filmstrip 21. For the same reason, it is preferred that the idler roller 446 rotate about an axis parallel to the axis of the mandrel 302.

The width of the bearing member 446 in a direction parallel to the mandrel axis 388 is not critical, however, a relatively narrow bearing member presents less spatial constraints for other components of the apparatus, ancillary equipment and the like. A convenient width for the bearing member 446 is less than about one-half the width of the filmstrip 21. In the embodiment of FIGS. 71–75, the bearing member or idler roller 446 has a width that is about one-quarter of the width of the filmstrip 21.

The idler roller 446 can have a flange (not shown) that extends outward from the rest of the roller radial to the roller axis. The flange can help maintain alignment of the leading portion 28 of the filmstrip 21 and the mandrel 302 by limiting both lateral movement and torqueing of the filmstrip 21 about its longitudinal axis. The flange may be superfluous if the front end of the film roll chamber 16 is closed.

Figure 75:
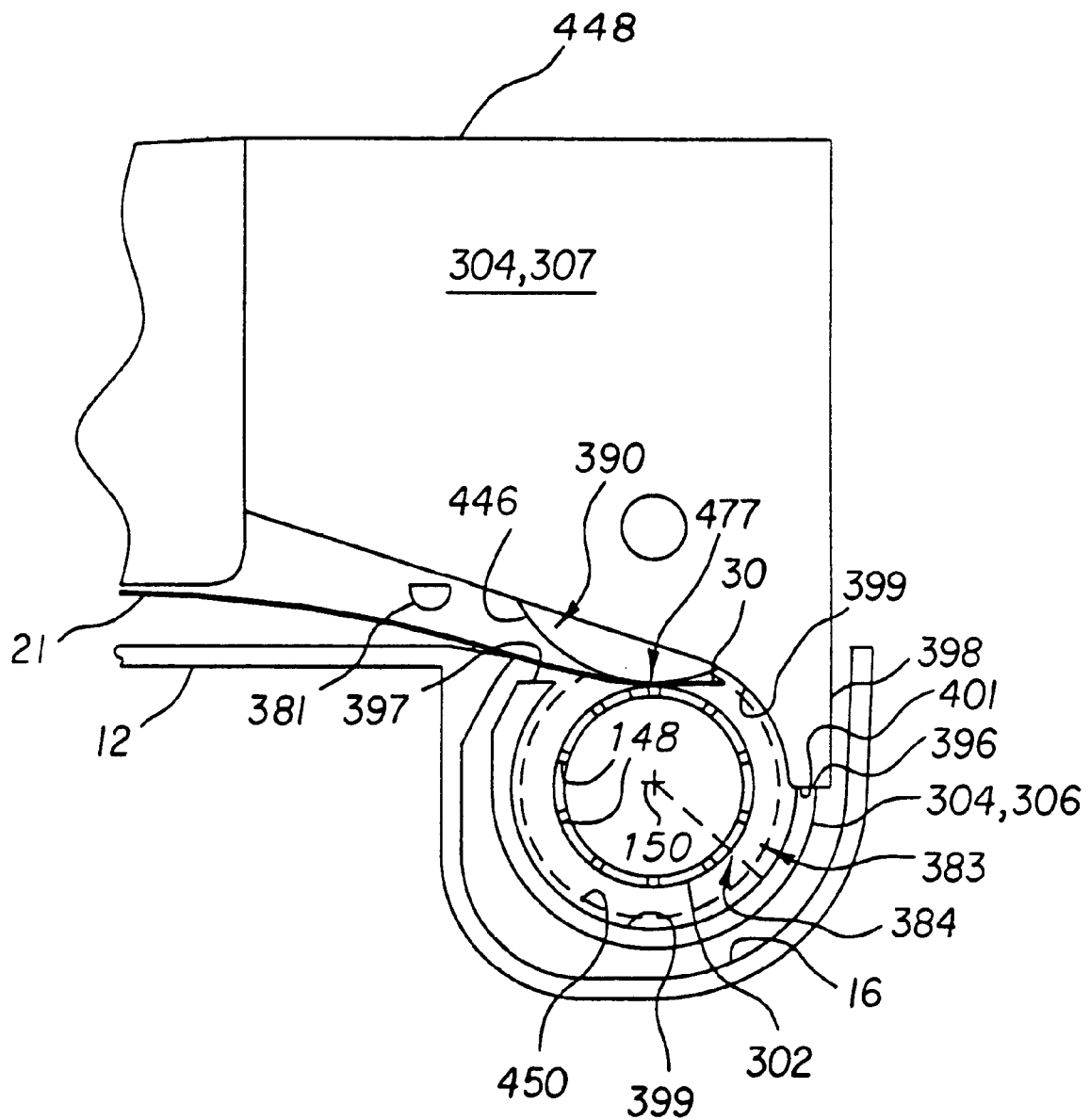
FIG. 75 is a semi-diagrammatical partial cross-sectional view of the winding station of FIGS. 71–74. Part of a film transport is also shown.

The guide shoe 392 includes a support portion 448 that provides physical support for the arm 398 and bearing member 446. For example, the support portion in FIGS. 71–75, carries the axle of the bearing member 446. The support portion 448 is preferably configured so as to avoid any possibility of unintended contact with the filmstrip 21. As shown in FIG. 75, in particular embodiments the support portion 448 can be joined to another component, such as a film bridge or film guiding member, as a single unit.

The assemblage of guides can include a film stripper 450. The stripper 450 has a shoulder 452 (best seen in FIG. 18) that defines a lateral boundary for the film roll. The stripper 450 can have a dimension in directions radial to a stripper axis, that is smaller, the same as, or larger than the dimensions of the film roll chamber 16 in the same directions. In a particular embodiment, the stripper 450 is a complete sleeve that is coaxial with the mandrel 302 and is separated from the mandrel 302 by less than the thickness of the filmstrip 21 and, preferably, about one-half the thickness of the filmstrip 21. In this embodiment, the dimensions of the stripper 450 in directions radial to the stripper axis (which is coextensive with the mandrel axis 388), are less than the dimensions of the preliminary roll space 383 in the same directions and the partial sleeve 392 is coaxial with the stripper 450. This permits the mandrel 302, partial sleeve 392, and the stripper 450 to move along a common axis, independent of each other and without interference; and, at the same time, keeps overall apparatus and film roll chamber 16 dimensions small.

In the embodiment shown in FIGS. 71–75, the guide assemblage is utilized in the following manner. The leading portion 28 of the filmstrip 21 is advanced into the film roll chamber 16 until the free end 30 is detected by a sensor (not illustrated in these figures) which can be mounted in the guide shoe 392. The stripper 450 is then moved by a linear actuator 120 toward the film roll chamber 16 until the shoulder 452 of the stripper 450 contacts the edge of the filmstrip 21. The stripper 450 is then stopped. The partial sleeve 394 is then moved along the stripper 450 and into the film roll chamber 16. The medial edge 397 of the partial sleeve 394 is preferably chamfered from a forward end 453 toward the base of the sleeve. As the partial sleeve 394 is extended into the film roll chamber 16, the free end 30 of the filmstrip 21 is lifted by a distance sufficient to avert the free end 30 clear the mandrel 302, when the mandrel 302 is extended into the chamber. The mandrel 302 is then extended into the film roll chamber 16. The rotation of the mandrel 302 is initiated and the vacuum source is switched on, when the mandrel 302 has entered the film roll chamber 16 or before. The guide shoe 392 is then lowered relative to the film roll chamber site until the guide shoe 392 contacts the partial sleeve 394 and the predetermined nip 447 is defined between the idler roller 446 and the mandrel 302. As this occurs, the free end 30 of the filmstrip 21 is directed into the nip 447. (The free end 30 of the filmstrip 21 is illustrated as being partially cut back to form an angled tip. This is a typical film feature, but is not a mandatory requirement for the method and apparatus.) The mandrel 302 continues to rotate. The idler roller 446 pinches the leading portion 28 of the filmstrip 21 against the mandrel 302 and the vacuum pulls the filmstrip 21 radially toward the mandrel axis 388. After about one and one-half revolutions, the leading portion 28 of the filmstrip 21 is cinched onto the mandrel 302. A vacuum sensor (not shown) positioned in the vacuum line detects the drop in air flow or decrease in air pressure resulting from the cinching. The vacuum sensor signals a control, which in response withdraws the guide shoe 392 and partial sleeve 394. The main portion 32 of the filmstrip 21 is then pulled into the chamber 16 by the mandrel 302 and wound over the leading portion 28 producing the film roll 50. Referring now to FIG. 75, the film roll 50 has an outermost turn 455 (indicated in FIG. 75 by a dashed line) that defines a first film roll radius 384 that is larger than the preliminary radius 384.

Winding of the film roll continues until the main portion 32 of the filmstrip 21 has reached the film roll 50. This is ordinarily the major portion of the filmstrip 21. The trailing portion 34 of the filmstrip 21 necessarily remains attached to the spool 27 of the film cartridge 24 and extends to the film roll 50. The rotation of the mandrel 302 is stopped before an excessive strain is placed on the trailing portion 34. This may be done in a variety of ways. For example, a sensor can detect an increased load on the mandrel 302 due to reaching the trailing portion 34; or a detector can count rotation of the film spool or another rotating part; or a detector can track the length or area of filmstrip 21 traveling to the film roll; or film can be wound for a predetermined time. With any of these approaches a slip clutch can be provided in the mandrel 302 to accommodate excessive strain.

After winding is completed, the mandrel 302 is removed from the film roll chamber 16. The vacuum is first turned off and compressed air of other gas may be blown back through the mandrel 302 to encourage release of the film roll. At this time, the mandrel 302 can be rotated backwards a revolution or so to further encourage the film roll to release. The combination of these effects allows the film roll to loosen and expand such that the outermost turn 455 defines a second film roll radius larger than the first film roll radius 384. In a preferred embodiment, the film roll does not expand substantially beyond the throat 19 of the film roll chamber 16. This can be accomplished in different ways. For example, the film roll chamber 16 can include a vacuum port (not shown) through which a vacuum can be applied to the film roll in the manner disclosed in U.S. Pat. No. 5,608,482, which is hereby incorporated herein by reference. The frame 12 can alternatively have wedges 200 at the medial margin of the throat 19, that narrow the throat 19 to a width less than the width of the widest portion of the film roll chamber 16 and thus limit clock-springing of the film roll.

The mandrel 302 is next removed from the film roll chamber 16 by retracting the mandrel 302 into the stripper 450, while leaving the stripper 450 in place against the edge of the filmstrip 21. Because the radial gap between the mandrel 302 and stripper 450 is less than the thickness of the filmstrip 21, telescoping is at least substantially prevented.

In a currently non-preferred embodiment, the mandrel 302 is detachable from the apparatus in the manner of a spool. Although the spool can be relatively simple this still adds an additional part to the camera and the complexity of a release mechanism for detaching the spool.

In an embodiment in which a film bridge 134 is used, the film bridge 134 is displaced relative to the camera frame assembly 10, prior to removal of the mandrel 302; so slack in the filmstrip 21 can be taken up by rolling a final portion of the filmstrip 21 onto the film roll or retracting that part of the filmstrip 21 back into the cartridge 24.

The rear opening 28 of the camera frame assembly 10 is next closed and the camera frame assembly 10 is rendered light-tight. This can be a single step in which a light-tight back cover 40 is attached to the frame 12 or can involve multiple steps. For example, a back can be attached over the rear opening followed by the plugging of a bottom opening to render the assembly light-tight. The resulting camera assembly can be a completed camera or can be a camera subunit requiring additional assembly operations for completion. In addition to the features already discussed, including a film cartridge 24 and film roll, the camera assembly can also include other conventional camera features well known to those of skill in the art.

Figure 76:
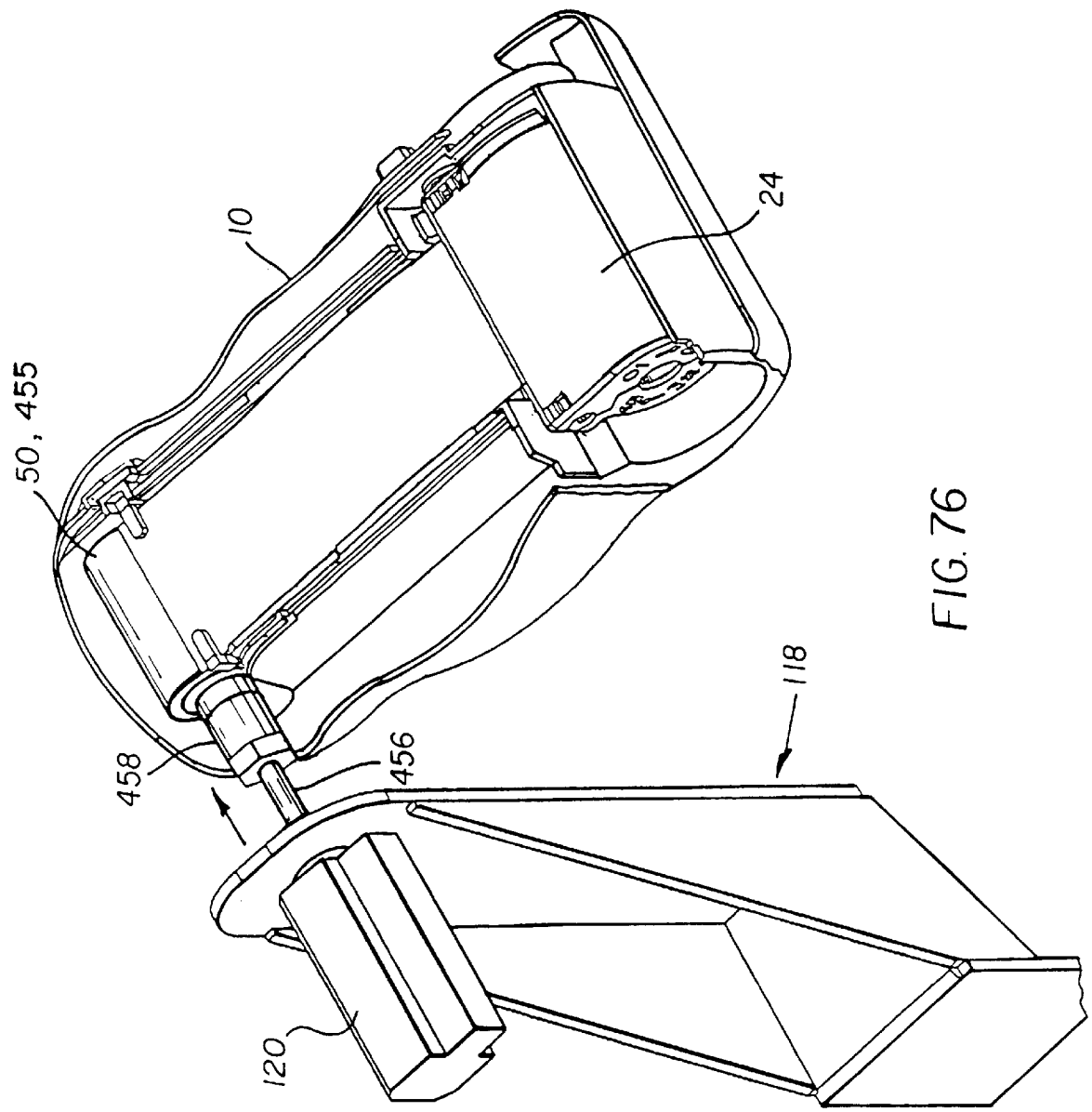
FIG. 76 is a semi-diagrammatical view of a tamper of a mandrel and guide film loader. The direction of axial lodging is indicated by an arrow.

The film roll 50 can telescope outward during mandrel 302 removal or after mandrel 302 removal if the camera frame assembly 10 is vibrated. A distended portion of the film roll 50 presents a grave risk of pinching or other damage when the camera is rendered light-tight. It is thus highly desirable, at least once before installing the back cover 40 or otherwise closing the camera, to lodge the film roll 50 fully within the film roll chamber 16 axially (in a direction parallel to the film space axis 51). The stripper 450 can provide axial lodging during removal of the mandrel 302, as previously discussed. The stripper 450 can also be replaced or supplemented by one or more tampers 456. Each tamper 456 is included in the apparatus 300 in a separate station 118, as shown in FIG. 76, or as a part of the previously described station 118 at which the film roll 50 was formed, or a succeeding station 118. Like the stripper 450, the tamper or tampers 456 secure the film roll 50 within the film roll chamber 16 during or after removal of the mandrel 302. Each tamper 456 includes a linear actuator 120, such as an air cylinder, which tamps a tamp head 458 against the end of the film roll 50 to drive any outwardly telescoped portion of the film roll back into the remainder of the film roll and axially lodge the entire film roll 50 in the film roll chamber 16. The tamp head 458, in the tamper 456 shown in FIG. 21, is fixed to its linear actuator 120.

Referring to FIGS. 77–79, the axial lodging can also be accomplished by providing a prepositioned partial wall 460 or a post-loading wall 462 on the bottom of the chamber 16. The partial wall 460 is provided as a part of the camera frame assembly 10 and can replace the stripper 450. This is less desirable than the use of the stripper 450, because the partial wall 460 is subject to frame assembly tolerances and presents a greater risk of inaccurate positioning and incomplete axial lodging of the film roll 50 in the film roll chamber 16. The postloading wall 462 is installed on the camera frame assembly 10 after mandrel 302 removal. The post-loading wall 462 can be partial, but is preferably full; that is, the post-loading wall 462, after installation, preferably occludes the entire end opening of the film roll chamber 16. The post-loading wall 462 can be installed in a direction radial to the film space axis 51, as shown in FIG. 78, in which case, a stripper 450 or tamper 456 is needed to initially secure the film roll 50 in the film roll chamber 16. The post-loading wall 462 can also be installed in a direction parallel to the film space axis 51, as shown in FIG. 24. In this case, the post-loading wall 462 and wall installation tool 463 together comprise a tamper 456 and the use of the stripper 450 is optional.

The invention has been described in detail with particular reference to certain preferred embodiments thereof, but it will be understood that variations and modifications can be effected within the spirit and scope of the invention.

What is claimed is:

1. A method for loading a filmstrip, said method comprising the steps of:

propelling the filmstrip into a cylindrical film space;

curling the filmstrip into a film roll within said film space, said film roll defining a roll axis;

during said curling, constraining said roll between a pair of opposed contact surfaces;

during said constraining, rotating said contact surfaces about a pivot axis transverse to said roll axis.

2. The method of claim 1 wherein said pivot axis is perpendicular to said roll axis.

3. The method of claim 1 further comprising, during said rotating, maintaining a constant separation between said contact surfaces.

4. The method of claim 1 wherein said contact surfaces are rotated through an angle of less than 90 degrees.

5. The method of claim 1 further comprising limiting clock-springing of said roll.

6. The method of claim 1 further comprising following said curling, traversing said contact surfaces beyond said film roll.

7. The method of claim 6 further comprising restraining axial movement of said film roll during said traversing.

8. The method of claim 6 further comprising limiting clockspringing of said film roll following said traversing.

9. A method for loading a filmstrip, said method comprising the steps of:

propelling the filmstrip into a cylindrical film space;

curling the filmstrip into a film roll within said film space, said film roll defining a roll axis;

during said curling, constraining said roll between a first pair of opposed contact surfaces and between a second pair of opposed contact surfaces;

during said constraining, rotating said first pair of contact surfaces about a first pivot axis and rotating said second pair of contact surfaces about a second pivot axis, said pivot axes being spaced apart, said pivot axes each being perpendicular to said roll axis.

10. The method of claim 9 wherein said rotating further comprises rotating said pairs of said contact surfaces in synchrony.

11. The method of claim 9 wherein said rotating further comprises rotating one said pair of said contact surfaces in a clockwise direction and rotating the other said pair of said contact surfaces in a counterclockwise direction.

12. A method for loading a filmstrip comprising the steps of:

interposing a pair of hooks in a chamber, said hooks together defining a curling zone;

propelling the filmstrip to said curling zone;

during said propelling, curling the filmstrip against said hooks into a roll, said roll defining a roll axis;

during said curling, rotating each said hook relative to said roll about a pivot axis to expand said curling zone, said pivot axes each being transverse to said roll axis.

13. The method of claim 12 wherein said rotating further comprises rotating said hooks in synchrony.

14. The method of claim 12 further comprising, following said curling, traversing said hooks axially outward from said roll.

15. The method of claim 14 further comprising withdrawing said hooks from said chamber following said traversing.

16. The method of claim 14 further comprising restraining axial movement of said roll during said traversing.

17. The method of claim 14 further comprising limiting clock-springing of said roll following said traversing.

18. An apparatus for loading a filmstrip into a film roll chamber, said apparatus comprising:

at least one rigid hook interposable in said film roll chamber, said hook having a bell and a support, said bell defining a cylindrical curling zone, said hook being rotatable to enlarge said curling zone; and a film transport disposed to deliver said filmstrip to said curling zone.

19. An apparatus for loading a filmstrip into a film roll chamber, said apparatus comprising:

a pair of hooks interposable in said film roll chamber, said hooks each having a support and a bell extending from said support, said bells defining a cylindrical curling zone, said supports being rotatable in synchrony to rotate said bells and enlarge said curling zone; and a film transport disposed to deliver said filmstrip to said curling zone.

20. The apparatus of claim 19 wherein said bells each define a plane and each said hook is rotatable about a pivot axis extending along a respective said plane.

21. The apparatus of claim 19 further comprising a hook rotator pivoting said hooks proportional to said delivering of said filmstrip.

22. The apparatus of claim 19 wherein said hooks are rigid.

23. An apparatus for loading a filmstrip into a housing having a film roll chamber, said film roll chamber defining a film space, said film space having an axis, said apparatus comprising:

at least two hooks, said hooks each having a support and a bell extending from said support; said hooks being disposable in said housing with said supports extending outward from said housing, said bells defining a curling zone aligned with said axis, and said hooks each being pivotable within said chamber, relative to said axis; and a film transport disposed to deliver said filmstrip to said curling zone.

24. The apparatus of claim 23 further comprising a hook couple synchronizing said pivoting of said hooks.

25. The apparatus of claim 24 wherein said hook couple pivots said hooks proportional to said delivering of said filmstrip.

26. The apparatus of claim 25 further comprising a traverse unit connected to said supports, said traverse unit moving each said shank axially outward from said film space.

27. An apparatus, for loading a filmstrip into a housing, said housing having a film roll chamber, said film chamber having a chamber axis, said apparatus comprising:

a pair of hooks, each of said hooks having a bell and a shank, said bells defining a substantially cylindrical curling zone, said hooks being disposable relative to said chamber such that said bells are disposed in said chamber and said shanks extend outward from said chamber, said shanks defining a pair of shank axes disposed transverse to said chamber axis, said hooks being rotatable about said shank axes;

a film transport disposable adjacent said film roll chamber; said film transport delivering said filmstrip to said curling zone; and a hook rotator pivoting said hooks during said delivery of said filmstrip.

28. The apparatus of claim 27 wherein said film transport includes a curling guide disposable over said roll chamber, said curling guide directing said filmstrip toward said curling zone.

29. The apparatus of claim 27 wherein said hooks are movable within said roll chamber in directions parallel to said chamber axis.

30. The apparatus of claim 29 wherein said hooks are movable in a direction parallel to said shank axes to a position exterior to said roll chamber.

31. The apparatus of claim 27 wherein said hooks are rotatable about said shank axes to a first position wherein said hooks define a pair of intersecting planes.

32. The apparatus of claim 27 further comprising a pair of film roll restraints disposable adjoining opposite ends of said curling zone.

33. The apparatus of claim 32 wherein said hooks are movable to a position exterior to said film roll restraints.

34. The apparatus of claim 33 wherein said film transport includes an curling guide disposable over said roll chamber, said curling guide directing said filmstrip toward said curling zone, and said film roll restraints are connected to said curling guide.

35. A method for loading a filmstrip comprising the steps of:

- interposing a pair of rigid hooks in a chamber, said hooks together defining a curling zone;
- propelling the filmstrip to said curling zone;
- during said propelling, curling the filmstrip against said hooks into a roll;
- during said curling, rotating said hooks relative to said roll to expand said curling zone.

36. The method of claim 35 wherein said rotating further comprises rotating said hooks in synchrony.

37. A method for loading a filmstrip comprising the steps of:

- interposing a pair of hooks in a chamber, said hooks together defining a curling zone;
- propelling the filmstrip to said curling zone;
- during said propelling, curling the filmstrip against said hooks into a roll;
- during said curling, rotating said hooks relative to said roll to expand said curling zone;
- following said curling, traversing said hooks axially outward from said roll.

38. The method of claim 37 further comprising withdrawing said hooks from said chamber following said traversing.

39. The method of claim 37 further comprising restraining axial movement of said roll during said traversing.

40. The method of claim 37 further comprising limiting clock-springing of said roll following said traversing.

\* \* \* \* \*